United States Patent
Jacobson et al.

(10) Patent No.: US 7,158,523 B2
(45) Date of Patent: Jan. 2, 2007

(54) MULTI-LINK SEGMENTATION AND REASSEMBLY SUBLAYER FOR BONDING ASYNCHRONOUS TRANSFER MODE PERMANENT VIRTUAL CIRCUITS

(75) Inventors: Gary Jacobson, San Jose, CA (US); Kamila Kraba, Santa Clara, CA (US); Chien-Chou Lai, Sunnyvale, CA (US); Jeremy Sommer, Mountain View, CA (US); Jining Yang, Sunnyvale, CA (US); Kishan Shenoi, Saratoga, CA (US)

(73) Assignee: Symmetricom, Inc., San Jose, CA (US)

( * ) Notice: Subject to any disclaimer, the term of this patent is extended or adjusted under 35 U.S.C. 154(b) by 1022 days.

(21) Appl. No.: 10/145,247

(22) Filed: May 14, 2002

(65) Prior Publication Data
US 2003/0099261 A1   May 29, 2003

Related U.S. Application Data

(60) Provisional application No. 60/344,542, filed on Nov. 7, 2001.

(51) Int. Cl.
*H04L 12/00* (2006.01)

(52) U.S. Cl. .................. 370/395.1; 370/538; 370/540; 370/543

(58) Field of Classification Search .............. 370/391, 370/538, 540, 543, 544
See application file for complete search history.

(56) References Cited

U.S. PATENT DOCUMENTS

| 6,574,191 B1* | 6/2003 | Usukura et al. | 370/216 |
| 6,621,794 B1* | 9/2003 | Heikkinen et al. | 370/235 |
| 6,775,305 B1* | 8/2004 | Delvaux | 370/535 |
| 2003/0048802 A1* | 3/2003 | Shenoi | 370/458 |
| 2003/0128706 A1* | 7/2003 | Mark et al. | 370/395.1 |

* cited by examiner

*Primary Examiner*—Huy D. Vu
*Assistant Examiner*—Roberta A. Shand
(74) *Attorney, Agent, or Firm*—John Bruckner PC

(57) ABSTRACT

Systems and methods are described for bonding asynchronous transfer mode permanent virtual circuits using a multi-link segmentation and reassembly sublayer. A method includes: transforming a stream of asynchronous transfer mode cells into a stream of bonded asynchronous transfer mode cells; demultiplexing the stream of bonded asynchronous transfer mode cells into a plurality of streams of inverse multiplexed bonded asynchronous transfer mode cells; and transmitting the plurality of streams of inverse multiplexed bonded asynchronous transfer mode cells to a remote location via a plurality of permanent virtual circuits, characterized in that the transmitted plurality of streams of inverse multiplexed bonded asynchronized transfer mode cells can be multiplexed into a multiplexed stream of asynchronized transfer mode cells after transmission via at least two permanent virtual circuits, which compose the plurality of permanent virtual circuits, that do not have an identical bit-rate.

23 Claims, 54 Drawing Sheets

MULTI-LINK SEGMENTATION AND REASSEMBLY SUBLAYER FOR BONDING ASYNCHRONOUS TRANSFER MODE PERMANENT VIRTUAL CIRCUITS

CROSS-REFERENCE TO RELATED APPLICATION

This application is related to, and claims a benefit of priority under 35 U.S.C. 119(e) 120 from, copending U.S. Ser. No. 60/344,542, filed Nov. 7, 2001, now pending, the entire contents of which are hereby expressly incorporated by reference for all purposes.

BACKGROUND OF THE INVENTION

1. Field of the Invention

The invention relates generally to the field of networks. More particularly, the invention relates to asynchronous transfer mode networks. Specifically, a preferred implementation of the invention relates to a multi-link segmentation and reassembly sublayer for bonding asynchronous transfer mode permanent virtual circuits.

2. Discussion of the Related Art

Asynchronous transfer mode (ATM) is a popular technology for providing secure and reliable virtual private network (VPN) arrangements. The use of ATM technology allows the sharing of access and inter-machine trunks by multiple logical links. The underlying premise of ATM is that a data stream can be segmented into, cells. The ATM standard calls out for cells that contain 48 bytes of user data. Appended to each cell are 5 bytes of overhead that include an identifier of the destination. This identifier is encapsulated as a combination of Virtual Path Identification (VPI) and Virtual Channel Identification (VCI). Connections are performed by the ATM Switches on a cell-by-cell basis, using the VPI/VCI as a pointer to match the ingress and egress trunks from an ATM switch. A permanent virtual circuit (PVC) is established by provisioning the intervening ATM switches between the two (or more) points of customer (end-user) access into an ATM cloud. All ATM cells have a prescribed VPI/VCI in the cell-overhead when launched from a given location. The 48 bytes of user-data are transported across the ATM cloud, though the overhead may be modified. Cells associated with a specific PVC traverse the same route.

Problems associated with current ATM technology includes bandwidth constraints, which can represent a significant limitation. A point-to-point bandwidth increase with an inherent flexibility in data volume transfer is what is needed.

One unsatisfactory approach, in an attempt to solve this bandwidth constraint problem involves a method for inverse multiplexing over ATM (IMA). IMA is a standardized method that provides bonding of multiple low-speed physical links to emulate a high-speed logical link. A drawback of the IMA approach is that it requires that all of the low-speed physical links to have the same bit-rate. However, especially during times of network congestion, low-speed physical links may not present the same bit-rates. A network may often have available multiple physical links of different bit-rate capacities. What is needed is a solution that bonds multiple low-speed physical links that do not have the same bit-rate capacities. Heretofore, the requirement of bonding multiple low-speed physical links where the multiple low-speed physical links do not have the same bit-rate capacities has not been fully met.

SUMMARY OF THE INVENTION

There is a need for the following embodiments. Of course, the invention is not limited to these embodiments.

According to an aspect of the invention, a method comprises: transforming a stream of asynchronous transfer mode cells into a stream of bonded asynchronous transfer mode cells; demultiplexing the stream of bonded asynchronous transfer mode cells into a plurality of streams of inverse multiplexed bonded asynchronous transfer mode cells; and transmitting the plurality of streams of inverse multiplexed bonded asynchronous transfer mode cells to a remote location via a plurality of permanent virtual circuits, characterized in that the transmitted plurality of streams of inverse multiplexed bonded asynchronized transfer mode cells can be multiplexed into a multiplexed stream of asynchronized transfer mode cells after transmission via at least two permanent virtual circuits, which compose the plurality of permanent virtual circuits, that do not have an identical bit-rate. According to another aspect of the invention, a method comprises: multiplexing a plurality of streams of inverse multiplexed bonded asynchronous transfer mode cells received from a plurality of permanent virtual circuits, into a stream of bonded asynchronous transfer mode cells; and transferring the stream of bonded asynchronous transfer mode cells into a stream of asynchronous transfer mode cells, characterized in that the received plurality of streams of inverse multiplexed bonded asynchronous transfer mode cells can be multiplexed into the stream of bonded asynchronous transfer mode cells after reception via at least two permanent virtual circuits, which compose the plurality of permanent virtual circuits, that do not have an identical bit-rate. According to another aspect of the invention, an apparatus comprises: an asynchronous transfer mode network switch coupled to a plurality of permanent virtual circuits; a bus coupled to the asynchronous transfer mode network switch; and a bonding engine coupled to the bus, characterized in that a bi-directional transformation between a plurality of streams of inverse multiplexed bonded asynchronous transfer mode cells and a stream of asynchronous transfer mode cells can be performed when at least two permanent virtual circuits, which compose the plurality of permanent virtual circuits, do not have an identical bit-rate. According to another aspect of the invention, a bonded ATM cell comprises: a plurality of header octets; a plurality of control octets coupled to the plurality of header octets; and a plurality of information octets coupled to the plurality of control octets.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
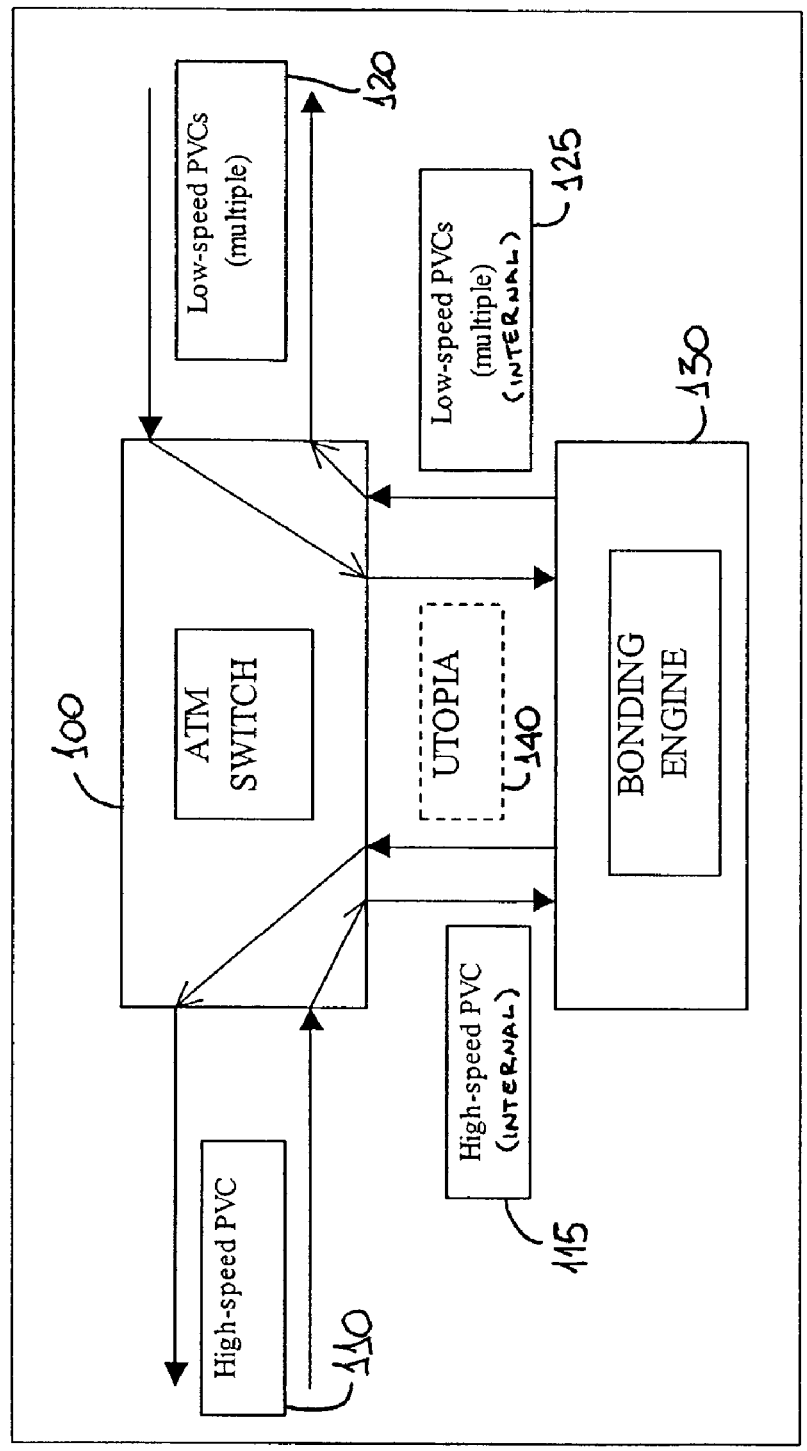
FIG. 1 illustrates block diagrams of a typical bonding engine deployment environment, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Full citations for several publications may be found at the end of the specification immediately preceding the claims in the section heading References. The disclosures of all these publications in their entireties are hereby expressly incorporated by reference herein for the purpose of indicating the background of the invention and illustrating the state of the art.

The following U.S. Patents and Application(s) disclose useful approaches. U.S. Pat. No. 6,222,858 Method of inverse multiplexing for ATM, filed Apr. 24, 2001. U.S. Pat. No. 6,134,246 Inverse multiplexing within asynchronous transfer mode communications networks, filed Oct. 17, 2000. U.S. Pat. No. 5,970,067 Asynchronous transfer mode communication with inverse multiplexing over multiple communication links, filed Oct. 19, 1999. U.S. Pat. No. 5,875,192 ATM Inverse multiplexing system, filed Feb. 23, 1999. U.S. Pat. No. 5,617,417 Asynchronous transfer mode communication with inverse multiplexing over multiple communication link, filed Apr. 1, 1997. U.S. Pat. No. 5,608,733, ATM inverse multiplexing, filed Mar. 4, 1997. U.S. patent application Ser. No. 09/974,177: Multi-link Segmentation and Reassembly for Bonding Multiple PVCs in an Inverse Multiplexing Arrangement, Shenoi et., al., filed Oct. 10, 2001. The entire contents of all these U.S. Patents and Application(s) are hereby expressly incorporated by referenced for all purposes In general, the context of the invention can include networks. The context of the invention can include asynchronous transfer mode networks. The context of the invention can also include a multi-link segmentation and reassembly sublayer for bonding asynchronous transfer mode permanent virtual circuits.

The invention relates generally to the field of networks. More particularly, the invention relates to asynchronous transfer mode networks. Specifically, the invention relates to a multi-link segmentation and reassembly sublayer for bonding asynchronous transfer mode permanent virtual circuits.

A preferred embodiment of the invention relates to a multi-link segmentation and reassembly sublayer for bonding asynchronous transfer mode permanent virtual circuits including permanent virtual circuits of different bit-rates.

The invention can provide a method and/or apparatus for implementing a bilateral conversion between a single high-speed permanent virtual circuit (PVC) and a multiplicity of (bonded) low-speed PVCs. The number of bonded, low-speed PVCs may be eight. The invention, however, is scalable and not limited to eight low-speed PVCs. A nominal cell-rate of the single high-speed PVC may be less than the aggregate cell-rate of the bonded low-speed PVCs, the difference being related to an overhead introduced by a bonding algorithm.

A bonding engine can be implemented in a field programmable gate array (FPGA) and appear to the ATM layer as a two-port physical layer (PHY) device on a bus, for example, a utopia Bus. The high-speed PVC can be addressed as a first utopia port and the low-speed PVC conglomerate can be addressed as a second utopia port.

Referring to FIG. 1, a block diagram of an exemplary bonding engine deployment environment is depicted. An ATM layer switch 100 can interface with a high-speed PVC 110 (source/destination device) and a plurality of low-speed PVCs 120 (source/destination devices). A cell stream coming from the high-speed PVC 110 is routed to a bonding engine 130 which can return bonded cells to the plurality of low-speed PVCs 120. Cells from the plurality of low-speed PVC's 120 are switched to the bonding engine 130 where a high-speed cell stream can be assembled and returned to the ATM layer switch 100 for transmittal to a high-speed destination. The method of interconnection can utilize an Utopia Level 2 Bus 140 architecture, and the bonding engine 130 may appear as a physical layer (PHY) device with two utopia ports, one for an internal high-speed PVC 115 and the other for a plurality of internal low-speed PVCs 125.

Still referring to FIG. 1, a VPI/VCI associated with the high-speed PVC 110 is, in general, programmable. However, since the PVCs associated with a bonding engine can be entirely internal to a system, it may be advantageous to pre-assign a VPI/VCI for the high-speed PVC 110. In most cases the ATM layer switch 100 can connect the internal high-speed PVC 115 with the high-speed PVC 110 (contained in a DS3, ATM) stream in a bilateral manner.

Still referring to FIG. 1, VPIs/VCIs associated with the low-speed PVCs are, in general, programmable. Again, it may be advantageous to preassign the VPI/VCI for the plurality of low-speed PVCs 120. In a preferred embodiment, all low-speed PVCs of the plurality of low-speed PVC's 120 are assigned the same VPI as well as the same higher-order bits of the VCI. The four least significant bits of the VCI can be of the form 0bbb (b=0/1) to ascertain the identity of a low-speed PVC, and can be inserted by the bonding engine 130. Furthermore, it may be advantageous if the choices of VPI/VCI of the plurality of low-speed PVCs 120 and the high-speed PVC 110 are coordinated to minimize the hardware complexity of an FPGA. In most cases the ATM layer switch 100 can connect an internal low-speed PVC of the plurality of internal low-speed PVCs 125 to a low-speed PVC of the plurality of low-speed PVCs 120 (contained in a G.shdsl link or another link).

Still referring to FIG. 1, the header octets of an ATM cell contain the VPI/VCI of a PVC with which the cell is associated. In particular, it can be advantageous to have header octets 1, 2, and 3 (H1, H2, and H3) of an ATM header identical, for both the plurality of low-speed PVCs 120 and high-speed PVC 110. Header octet 5 (H5) is the HEC (Header Error Check) octet which, in the case where PVCs are all internal, may not be necessary. Header octet 4 (H4) contains the low-order four bits of the VCI and is thus important for the plurality of low-speed PVCs 120 in a high-speed-to-low-speed (or splitting) direction, and it can be inserted by the bonding engine 130. Header octet 4 also contains a payload type indicator and cell loss priority (PTI and CLP) information and is thus it can be important in the splitting direction for the high-speed PVC 110 (the PTI identifies an ATM adaptation layer 5 cell as being within the body or the last cell associated with a packet) because it can be transported as part of a low-speed PVC cell across an ATM network to a remote bonding engine.

As noted earlier, a method for inverse multiplexing over ATM (IMA) has been standardized. IMA achieves the bonding of multiple physical links to emulate a high-speed logical link. IMA requires, however, that the low-speed links have the same bit-rate. The invention provides a method and/or apparatus for bonding multiple physical links to emulate a high-speed logical link, wherein the low-speed links may have different bit-rates. It may be advantageous to have the ratio of speeds between the highest and lowest bit rates as factor of 4. This ratio is related to the complexity of the implementation.

Conventional IMA, for example IMA over (multiple) T1s, requires that identical bit-rate low-speed links be delivered transparently between two IMA end-points, and relegates the intervening network to pure transport. In contrast to conventional IMA, the invention can include a method, data and/or apparatus that provides a network with the ability to establish a plurality of PVCs (of which at least two can be of different bit-rates) between two or more end-points, optionally together with the ability to rearrange a network topology on demand.

Figure 2:
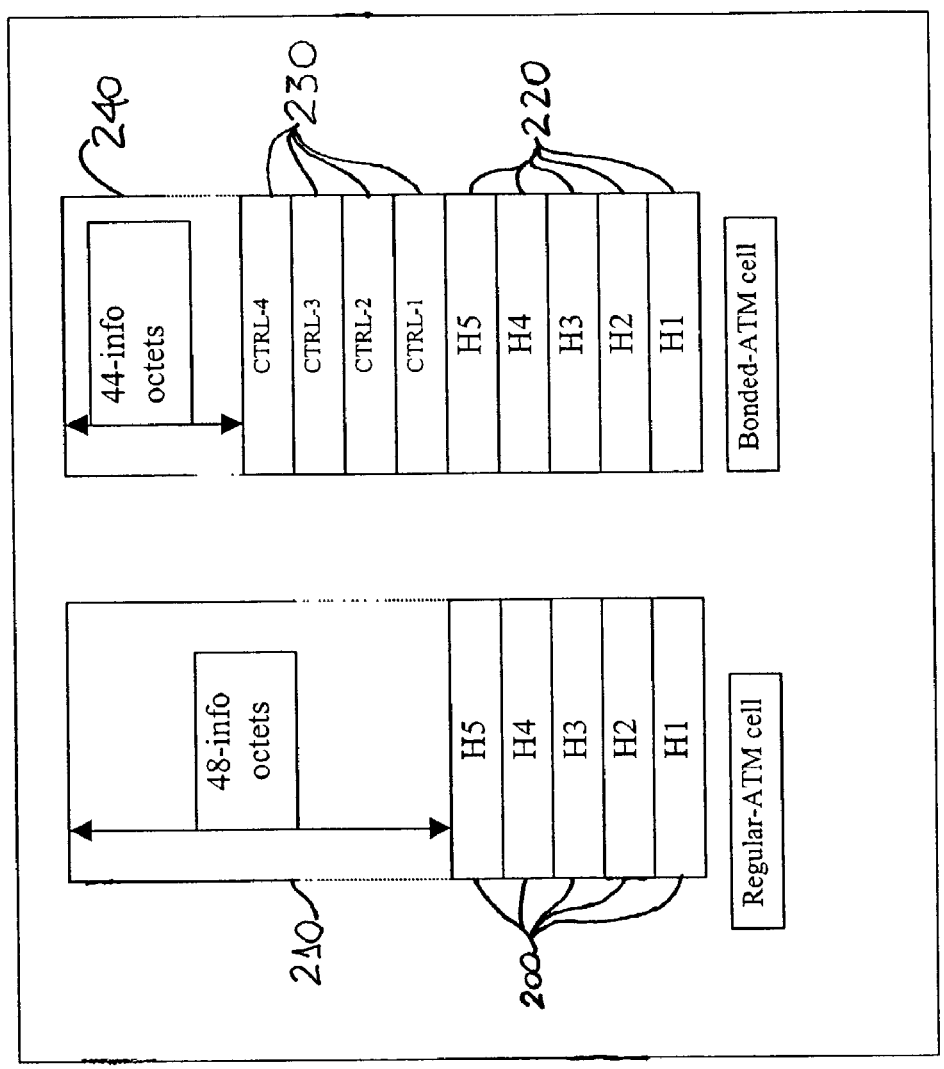
FIG. 2 illustrates block diagrams of a structure of a regular ATM cell and a bonded-ATM cell, representing an embodiment of the invention.

Referring to FIG. 2, block diagrams of a structure of a regular ATM cell and a bonded ATM cell are depicted. A regular ATM cells comprises 5 header octets 200 and a 48-octet protocol data unit (PDU) 210. Payload octets of a regular ATM cell can be regarded as info octets since these are typically related to resulting transferred debonded information. A bonded ATM cell can mimic a regular ATM cell in its structure, in the sense that there may be 5 header octets 220, 4 control octets 230 and 44 info octets 240. The control octets 230 are important to the bonded ATM cell and can be a part of a bonding algorithm. A transmitting end can insert the control octets 230 in each cell of a stream of bonded ATM cells so that a receiving end can recreate an appropriate regular ATM cell stream.

A bonding engine can convert cells from the regular ATM structure to the bonded ATM structure in a high-speed to low-speed direction at a transmitter. At a receiver, the bonding engine can convert the bonded ATM cells back to the regular ATM format. Bonded ATM cells can be distributed evenly over a plurality of low-speed PVCs.

Figure 3:
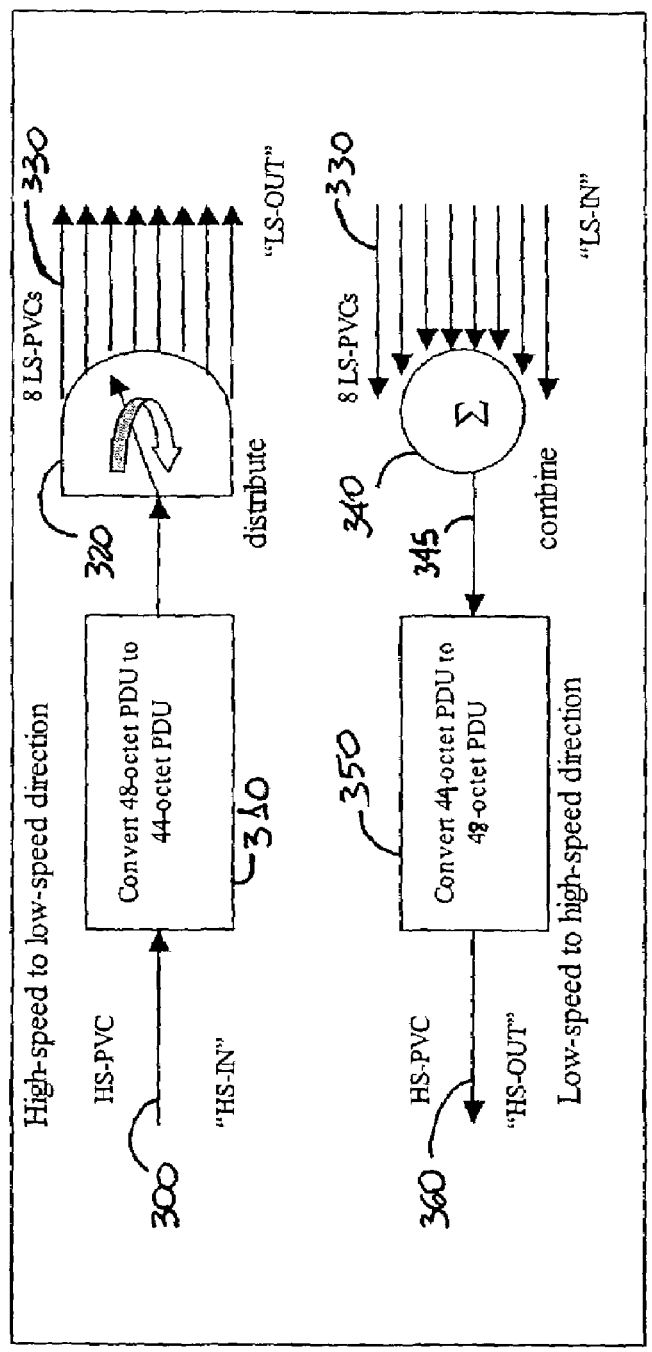
FIG. 3 illustrates a block diagram of an underlying principle of the bonding engine, representing an embodiment of the invention.

Referring to FIG. 3 block diagrams of an underlying principle of the bonding engine are depicted. In a high-speed to low-speed direction, a plurality of ATM cells 300 is converted from a regular 48-octet PDU format to a 44-octet bonded ATM format via a conversion block 310. Cells can be distributed over a set of eight low-speed PVCs 330 and control octets can be added to make up the bonded ATM cell format via a distribution block 320.

In general, cells in the high-speed to low-speed direction follow a first-in-first-out (FIFO) rule. To account for speed variations, a double-buffer arrangement may be desirable. Incoming cells can be written into one buffer and the outgoing cells can be read out of a second buffer.

Still referring to FIG. 3, in a low-speed to high-speed direction, a plurality of streams of bonded ATM cells from the set of eight low-speed PVC's 330 is combined via a combination block 340. A single stream of bonded ATM cells 345 is converted from the 44-octet bonded ATM format to the regular 48-octet PDU format via another conversion block 350, resulting in a single high-speed stream of ATM cells 360.

In the low-speed to high-speed direction, the incoming cells are not necessarily in-order and can be written into a buffer in a non-sequential fashion. The additional octets that convert a 44-PDU into a 48-PDU can allow re-ordering of the cells. A double buffer arrangement may be desirable so that outgoing cells can be read out in order.

Figure 4:
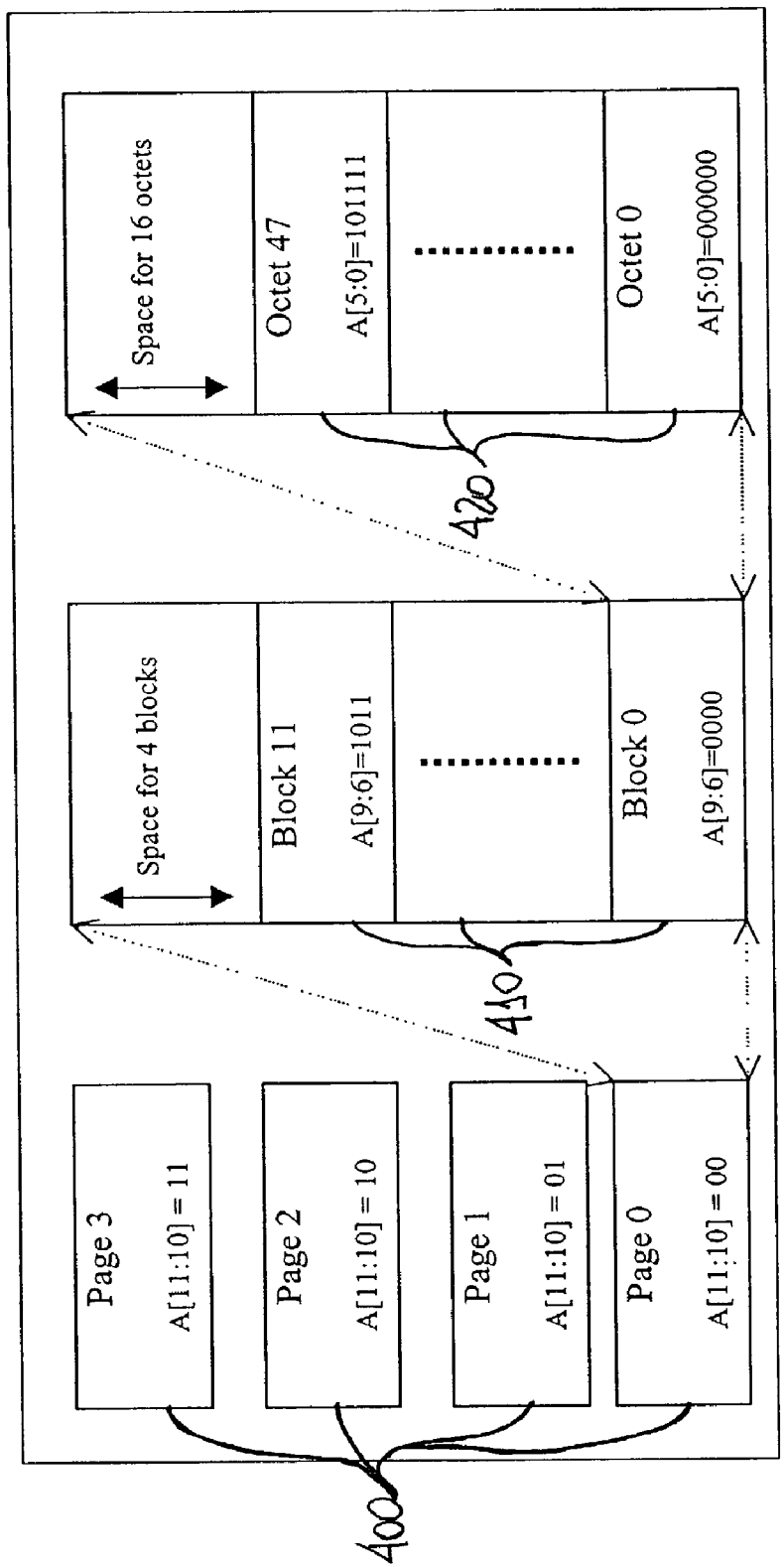
FIG. 4 illustrates a block diagram of a memory organization, representing an embodiment of the invention.

Referring to FIG. 4, a block diagram of a memory organization is depicted. In order to achieve a double-buffer (or multiple-buffer) arrangement and to provide a simple structure to allow for reassembly/re-sequencing of cell flows, a memory arrangement including pages may be used. In a preferred embodiment, a memory can contain 4 pages 400. The number of pages may be selected to be related to the differential delay experienced by the low-speed PVC cells traversing an ATM network between end-points. Each page can contain 12 blocks 410 (12 bonded ATM format cells, equivalent to 11 regular-ATM-format cells). Thus, each page can contain 528 information octets 420 (the memory is created in terms of addressable octets (byte-wide RAM), and to allow for independent reading and writing a dual-port-RAM (DPR) can be utilized. At a given end point, there may be two DPRs, one for each direction, each containing 4 pages.

A memory addressing method is preferably binary in nature. This may entail some wastage in memory (several unused memory locations). However, this inefficiency can be compensated for by the use of a binary addressing mechanism. Each DPR may require a twelve-bit address, denoted by A [11:0]. That is, each DPR can be equivalent to a 4K×8 memory. In a preferred embodiment, the two most significant bits A [11] and A [10] can identify a page (pages 0 through 3; or A through D). The 4 middle bits, A [9] through A [6], can identify a block (equivalent to a cell) within the page. Since there are only 12 cells (bonded ATM format) in a page, four blocks may be unused. Each block is a sub-unit of 64 octets. The 6 least-significant bits, A [5] through A [0], can identify the octets (of a bonded ATM format cell) within the block. Since only 48 octets are stored for each cell, 16 octets of each block may be unused.

In order to go sequentially through the memory, a 12-bit counter arrangement of the following form can be used: the six least significant bits count in a modulo-48 format; the 4 middle bits are from a modulo-12 counter; and the 2 most significant bits form a regular 2-bit binary counter (modulo-4). In this manner, four pages can be viewed as a circular buffer of 48 bonded ATM cells.

Figure 5:
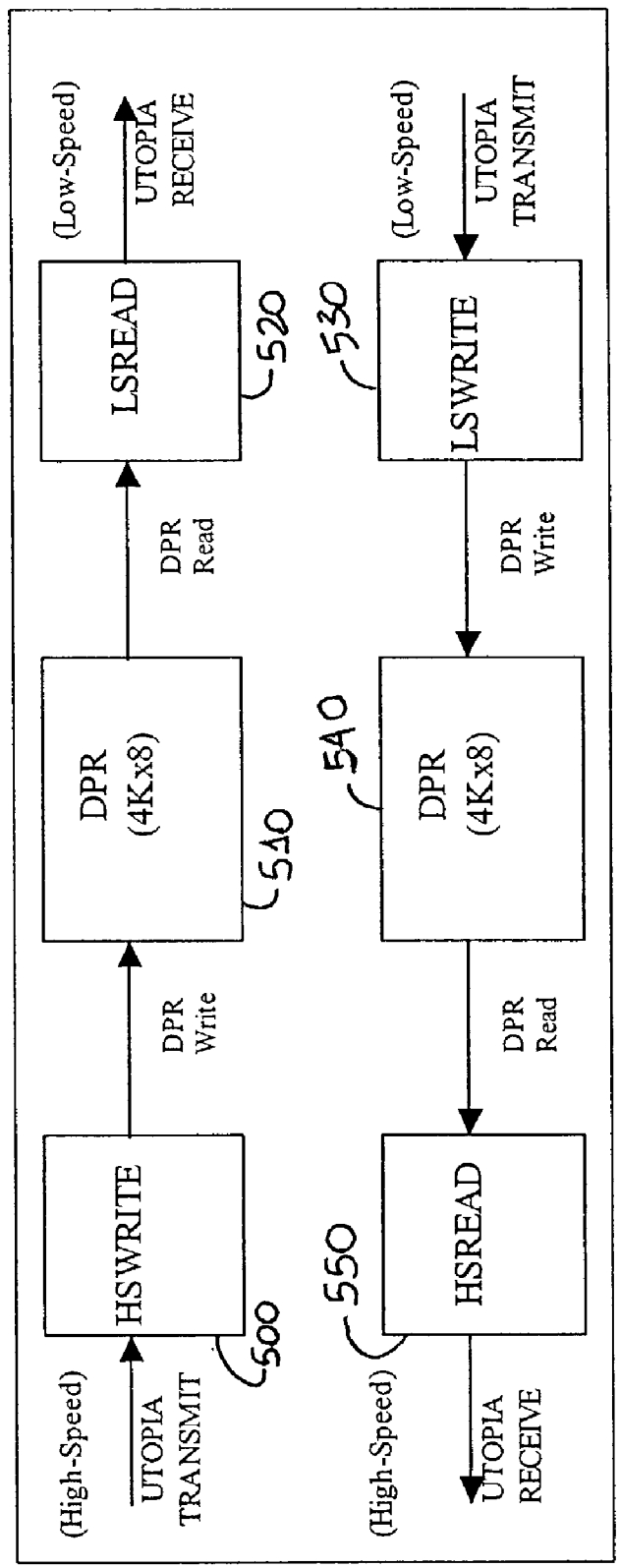
FIG. 5 illustrates a block diagram of a dual-port RAM (DPR) utilized as a buffer between a high-speed PVC and low-speed PVCs, representing an embodiment of the invention.

Referring to FIG. 5, a block diagram of a dual-port RAM (DPR) utilized as a buffer between a high-speed PVC and low-speed PVCs is depicted. In a high-speed-to-low-speed direction, an HSWRITE block 500 receives ATM cells from a ATM switch via an utopia bus, re-formats the cells into a bonded ATM format, and writes these cells in a sequential manner into a DPR 510 (dual-port-RAM) following a methodology of paged memory. An LSREAD block 520 reads out the cells sequentially, assigns the appropriate VCI, and provides the complete cells to the ATM switch via the utopia bus.

Still referring to FIG. 5, in a low-speed-to-high-speed direction, an LSWRITE block 530 receives ATM cells from the ATM switch via the utopia bus. These cells are in the bonded ATM format and include the relevant information to allow the LSWRITE block 530 to re-order the cells into another DPR 540. Implicit in the re-ordering process is that writes into the other DPR 540 are not necessarily sequential. An HSREAD block 550 reads cells out of the another DPR 540, re-formats cells into regular ATM format and provides the complete cells to the ATM switch via the utopia bus.

Still referring to FIG. 5, the paged architectures of the DPR 510 and the DPR 540 are suitable for preventing over-runs. By ensuring that the HSREAD block 550 and the LSWRITE block 530 are operating in different pages, and that the LSREAD block 520 and the HSWRITE block 500 are also operating in different pages, memory location contention can be avoided. The paged architectures also permits simple mechanisms for generating a cell available signal(s), that in turn may control the cell-rate across the utopia bus.

As mentioned above, a set of 4 control octets is included with 44 information octets in the bonded ATM cell format to make up a 48-octet PDU. These octets can facilitate the re-sequencing of cells at a receiver. Since cells traversing the ATM network can be in different PVCs, even though they leave the transmitter (roughly) in sequence, they can arrive at the destination in an out-of-order sequence, the extent of disorder being dependent on the differential delay between PVCs and also the nominal cell-rates (bit-rates) of different PVCs. A DPR in a low-speed-to-high-speed direction can provide a buffering (i.e., delay) required to put the cells back in sequence as the high-speed PVC.

The control octets can also be utilized to identify partial cells. A high-speed PVC may carry information formatted as ATM Adaptation Layer 5 (AAL5) cells. That is, packetized data is reformatted into ATM cells using the AAL5 methodology. This high-speed cell stream can be disassembled into information octets and segmented into the bonded ATM format. Eleven high-speed cells (regular ATM format) are converted into twelve bonded ATM cells. Consequently, if a data packet is comprised of (11n+m) regular-ATM cells, (12n+k) bonded ATM cells would be generated but the last bonded-ATM cell would be a partial cell.

For example, if a high-speed stream has only one cell, or 48 information octets (and then a lull in data), two bonded ATM cells may be created. The first bonded ATM cell may have 44 information octets and the second bonded ATM cell may have the remaining 4 information octets. Rather than wait until additional high-speed cells arrive, the second bonded ATM cell can be flagged as partial and both first and second bonded ATM cells may be transmitted over the low-speed PVC assembly. Although this would mean that the second cell has 40 irrelevant octets, it may be more efficient than waiting for additional high-speed cells to arrive. Table I indicates the relationship between m and k and indicates how many irrelevant ("don't care") octets are present as well as the address within the block of the last valid information octet.

TABLE I

| M | K | Last-block ID (4-bit binary) | # of valid octets in last block (partial cell) | Last-valid-octet ID (in block) (6-bit binary) |
|---|---|---|---|---|
| 1 | 2 | 0001 | 4 | 000011 |
| 2 | 3 | 0010 | 8 | 000111 |
| 3 | 4 | 0011 | 12 | 001011 |
| 4 | 5 | 0100 | 16 | 001111 |
| 5 | 6 | 0101 | 20 | 010011 |
| 6 | 7 | 0110 | 24 | 010111 |
| 7 | 8 | 0111 | 28 | 011011 |
| 8 | 9 | 1000 | 32 | 011111 |
| 9 | 10 | 1001 | 36 | 100011 |
| 10 | 11 | 1010 | 40 | 100111 |
| 11 | 12 | 1011 | 44 (complete cell) | 101011 |

The notion of partial pages can be important as well. In a high-speed-to-low-speed direction, a local DPR can be filled with bonded ATM cells on a page-by-page basis. These cells may be output for transmission over a multiplicity of low-speed PVCs across an ATM network to a distant end. At the distant end, a remote DPR can be filled with bonded ATM cells received over the multiplicity of low-speed PVCs. It may be desirable that the remote DPR mimics the local DPR on a page-by-page basis.

Still referring to FIG. 5, when the HSWRITE block 500 senses a lull in incoming high-speed cells, it can declare the last bonded ATM cell as partial and the current page as full, even though it may not have 12 bonded ATM cells present. The need to declare a page as full may arise from a mechanism chosen to prevent address contention between the write operation of the HSWRITE block 500 and the read operation of the LSREAD block 520. Such a partial page can have associated with it the identification (ID) of the last bonded ATM cell and this is also specified in the last-valid-octet ID column of table I.

Figure 6:
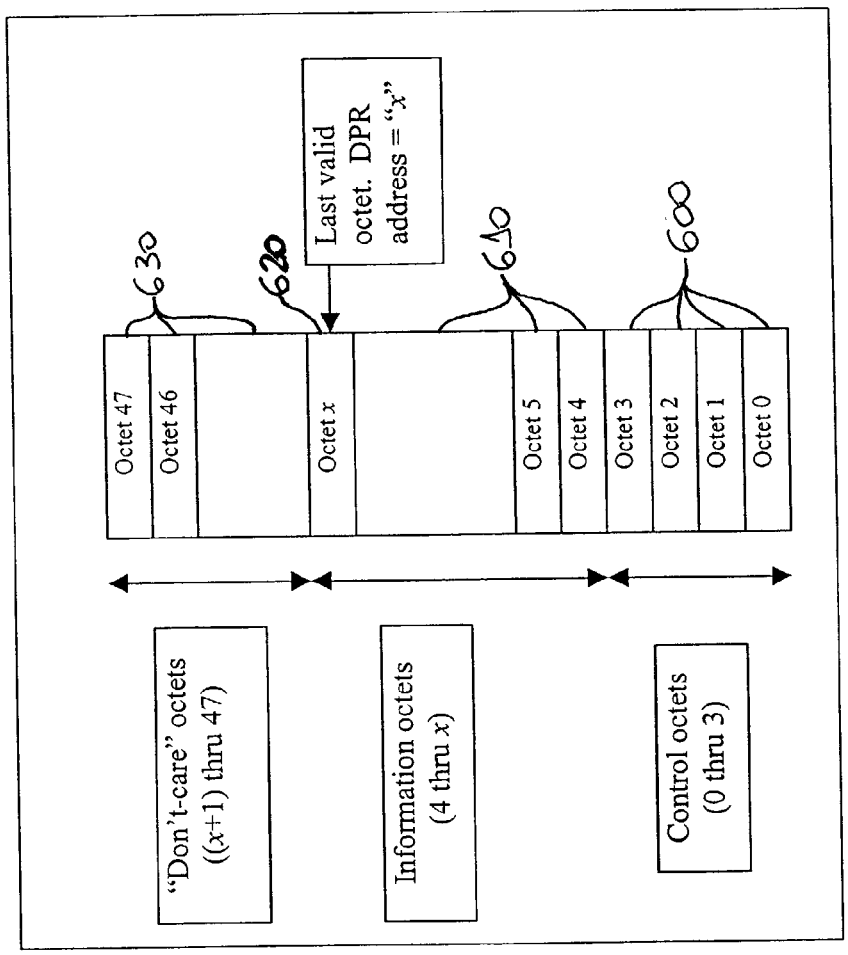
FIG. 6 illustrates a block diagram of a structure of a bonded ATM cell in memory showing a location of a last valid octet, representing an embodiment of the invention.

Referring to FIG. 6, a block diagram of a structure of a bonded ATM cell in memory showing a location of a last valid octet is depicted. A set of four control octets 600 is coupled to a set of information octets 610. The set of information octets 610 is coupled to a last valid information octet 620. The last valid information octet 620 is coupled to a set of irrelevant octets 630.

Note that if a cell is complete, i.e., not partial, then the last valid octet in the block (bonded ATM cell) would have an ID corresponding to 101011 (43 in binary). Since the information octets are stored in a DPR above the 4 control octets, the DPR address of the last valid octet of a complete cell would have 6 least-significant bits equal to 101111 (47 in binary). In the case of partial cells, the DPR address (6 least-significant bits) of the last valid octet can be obtained by adding 4 to the ID provided in Table I.

Control octets can be used to facilitate the reconstruction at the distant end of a copy of a local DPR on a page-by-page basis. Another function of the control octets can include transferring status information over a bonded ATM link(s).

Figure 7:
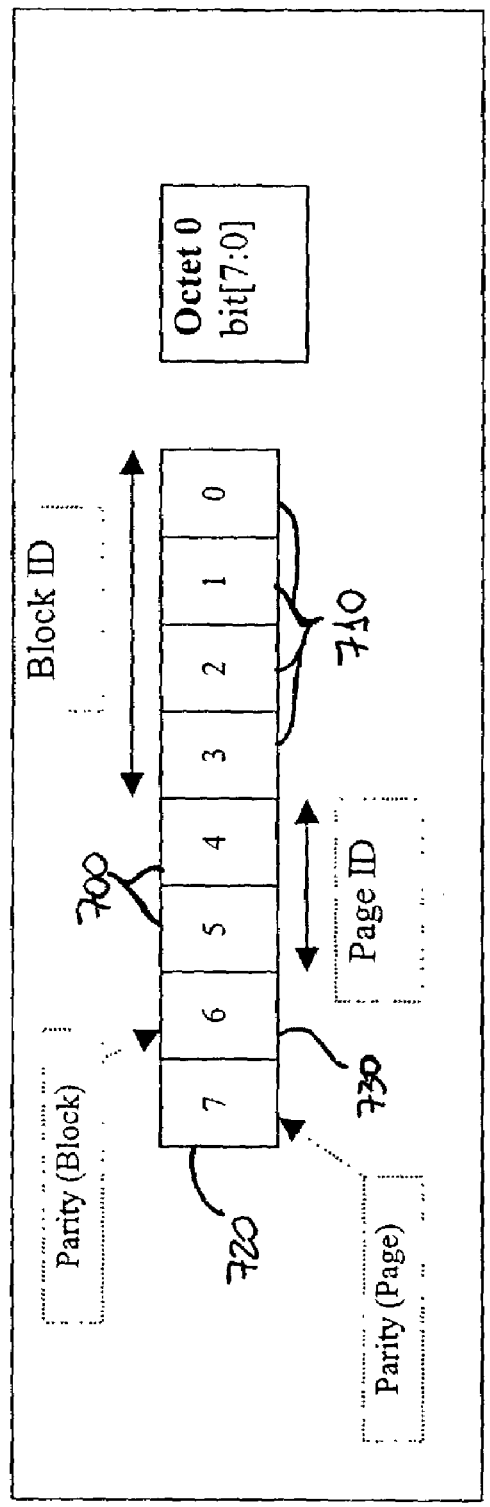
FIG. 7 illustrates a block diagram of a control octet 0, representing an embodiment of the invention.

Referring to FIG. 7, a block diagram of a control octet 0 is depicted. A page identifier 700 and a block identifier 710 of a bonded ATM cell can be written into octet 0 by a transmitting side. This can help a receiving side position the storage of a cell in memory in the appropriate location. Specifically, bits [3:0] can provide the block identifier 710 and bits [5:4] can provide the page identifier 700. Remaining bits can be used for establishing parity checks. In particular, a bit [7] 720 together with the page identifier 700 can have even parity, and a bit [6] 730 together with the block identifier 710 can have even parity (either even or odd parity can be chosen).

Still referring to FIG. 7, a transmit side can put a cell-address (page identifier 700 and block identifier 710) into control octet 0. A receive side (at another end of a bonded ATM link) can use this information to place a cell into memory. A memory at the receive side can be made identical in content to a memory at the transmit side. The use of two bits as parity bits can be made optional. An alternative use of the two bits includes a memory implementation organized into more than 4 pages (for example 8 pages or 16 pages).

Figure 8:
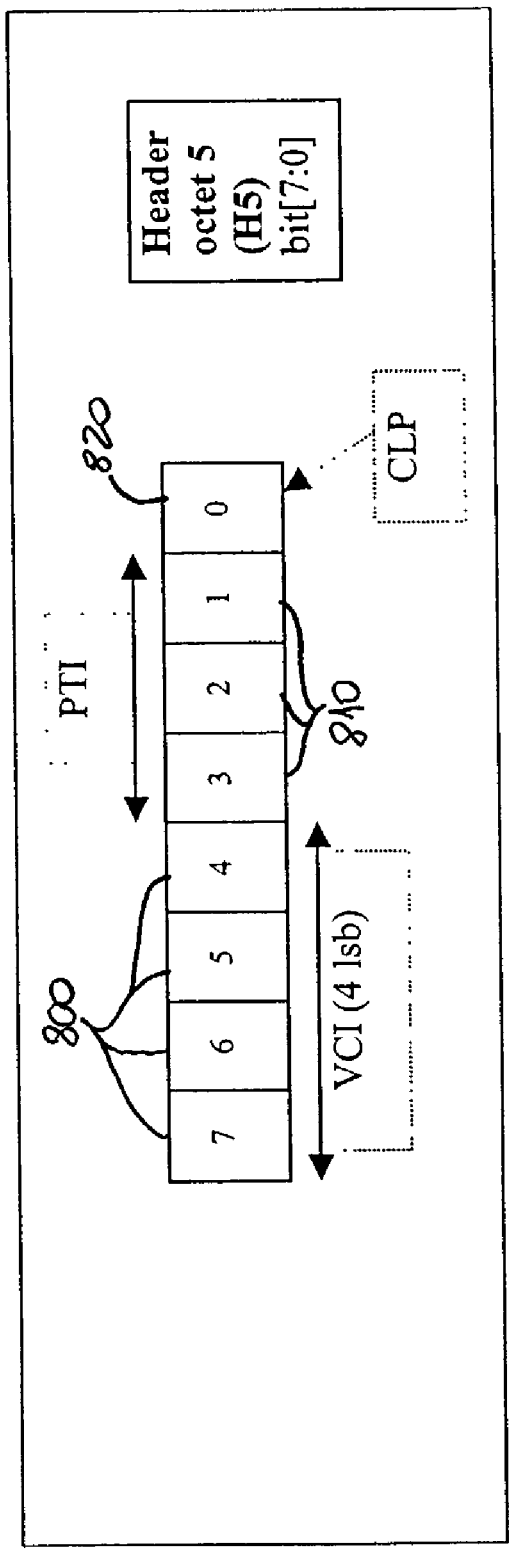
FIG. 8 illustrates a block diagram of a content of an H5 in an ATM cell, representing an embodiment of the invention.

Referring to FIG. 8, a block diagram of a content of an H5 in an ATM cell is depicted. In some situations, such as when the cell traffic is based on ATM Adaptation Layer 5 (AAL5), the 4 least significant bits of header octet 5 (H5), may contain information pertinent to the cell. A set of bits [7:4] 800 may correspond to the 4 least significant bits of the VCI and since an ATM switch can modifies the VPI/VCI, this part of the H5 may be purely local. A payload type indicator 810 (PTI) and a cell loss priority 820 (CLP) can provide information pertinent to a regular ATM cell. Consequently, it may be advantageous to deliver this information across a bonded link. This transmittal can be achieved via the use of another control octet.

Figure 9:
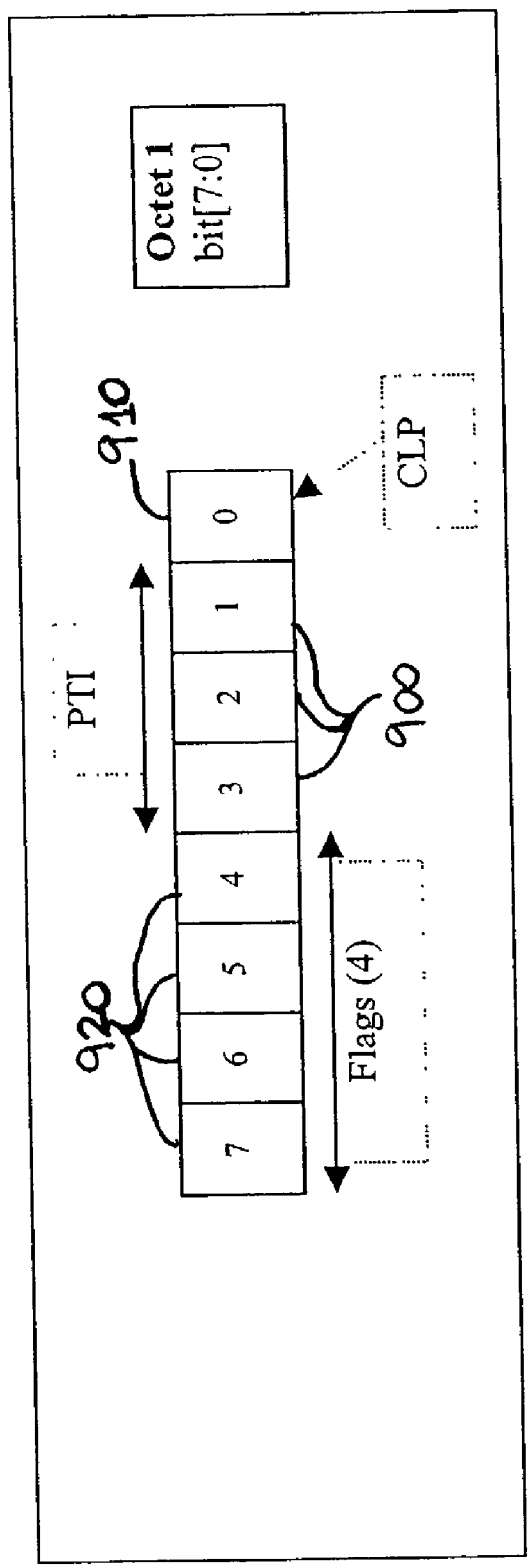
FIG. 9 illustrates a block diagram of a control octet 1, representing an embodiment of the invention.

Referring to FIG. 9, a block diagram of a control octet 1 is depicted. Since regular ATM cell contents may span two bonded ATM cells, the control octet 1 of a bonded ATM cell can contains a PTI 900 and a CLP 910 associated with a regular ATM cell. Control octets 1 of a cell number 10 and of a cell number 11 (the 11-th and 12-th bonded ATM cells) in a given page may carry duplicate information. The remaining 4 bits of control octet 1 can be used for other purposes including flags 920. Flags 920 can include: ALM-HIN, defined as an inadequate supply of regular-ATM cells from the ATM switch (the memory in the high-speed-to-low-speed direction is essentially empty); ALMLIN, defined as an inadequate supply of bonded-ATM cells from the ATM switch (the memory in the low-speed-to-high-speed direction is essentially empty); ALMHOU, defined as an inadequate demand of regular-ATM cells by the ATM switch (the memory in the low-speed-to-high-speed direction is essentially full, congestion indicator); and ALMLOU defined as an inadequate demand of bonded-ATM cells from the ATM switch (the memory in the high-speed-to-low-speed direction is essentially full, congestion indicator).

Figure 10:
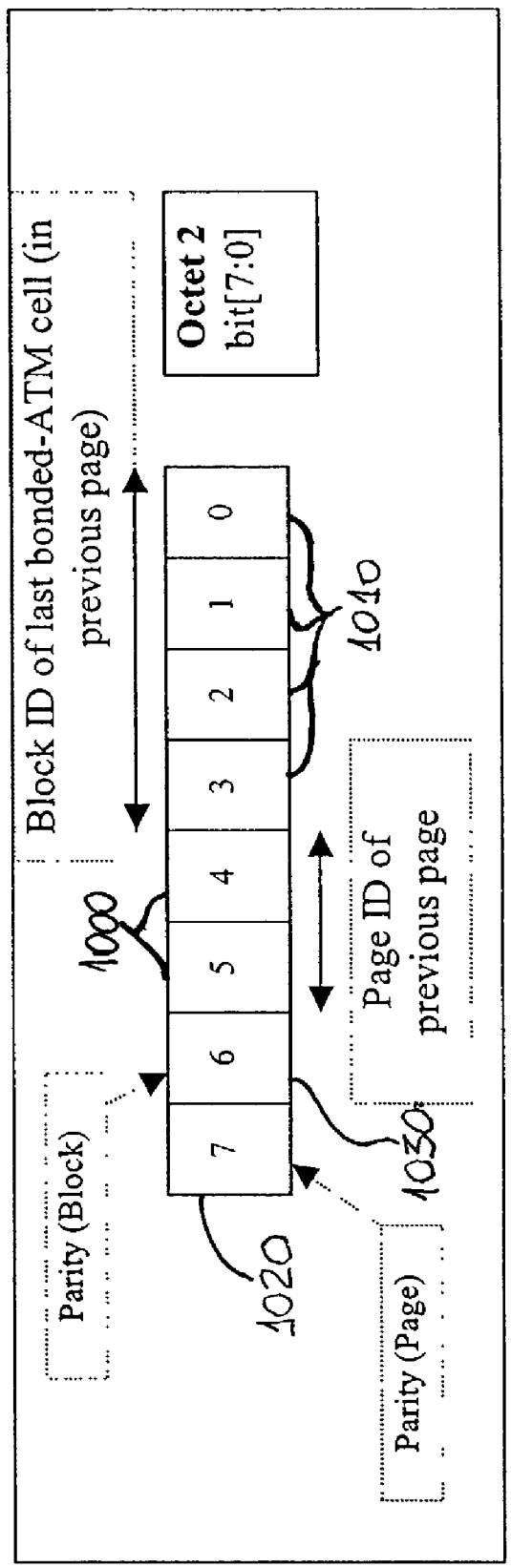
FIG. 10 illustrates a block diagram of a control octet 2, representing an embodiment of the invention.

Referring to FIG. 10, a block diagram of a control octet 2 is depicted. To help the receiving end determine that a page has been completely received, a page address 1000 and a block address 1010 of a last bonded ATM cell of page#n can be written into octet 2 by the transmitting side into all bonded ATM cells of page#(n+1) (where the page count is modulo-4). This may help the receiving side determine whether a page is complete or whether some cells required to complete the page are still in transit. Because of the possible differential transmission delay between disparate low-speed PVCs, it is possible for cells destined for page# (n+1) arrive prior to cells destined for page#n. Specifically, bits [3:0] can provide the block address 1010 and bits [5:4] can provide the page address 1000. The remaining two bits can be used for establishing a parity check. In particular, a bit [7] 1020 together with the page address 1000 can have even parity and a bit [6] 1030 together with the block address 1010 can have even parity (either even or odd parity can be chosen).

Still referring to FIG. 10, a transmit side can put a cell address (page address 1000 and block address 1010) into the control octet 2. A memory at a receive side can be made identical in content to a memory at the transmit side, and if there is an incomplete page (less than 12 bonded-ATM cells), such a determination can be made. The use of two bits as parity bits can be made optional. An alternative use of the two bits includes a memory implementation organized into more than 4 pages (for example, 8 pages or 16 pages).

Figure 11:
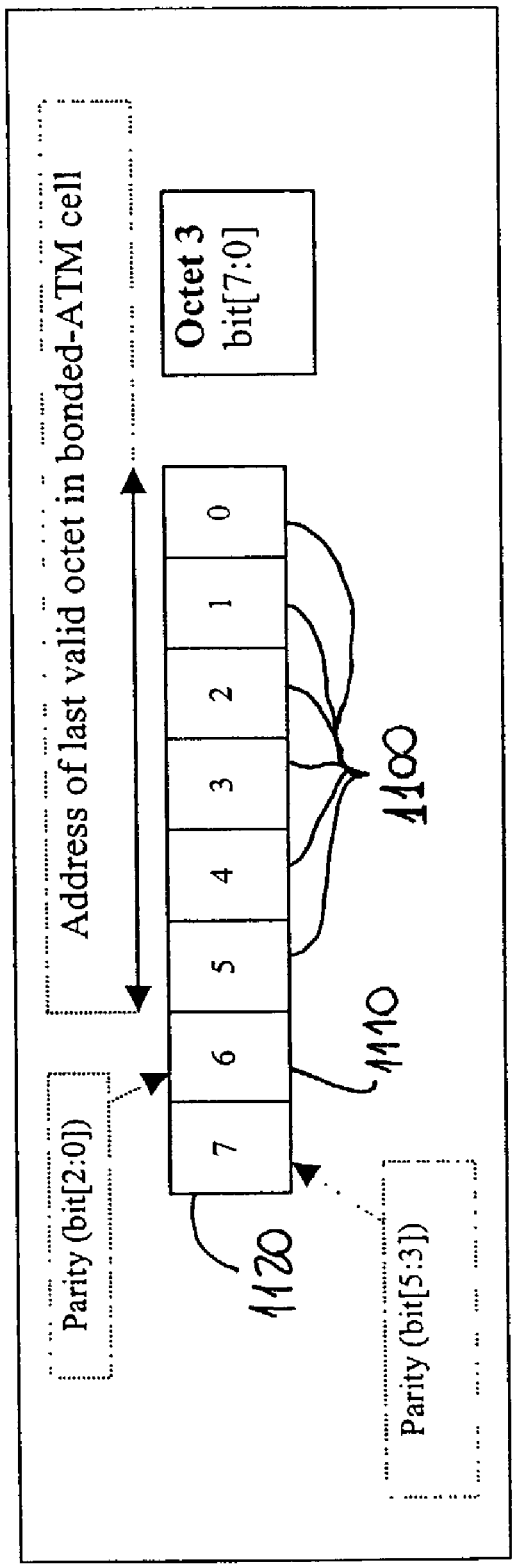
FIG. 11 illustrates a block diagram of a control octet 3, representing an embodiment of the invention.

Referring to FIG. 11, a block diagram of a control octet 3 is depicted. Octet 3 can also be utilized to help the receiver make a memory at a receive side identical to a memory at a transmit side, and help with the identification of incomplete cells. In particular, an address of a last valid octet in a bonded ATM cell 1100 can be transmitted in control octet 3 and it can be a 6-bit quantity. The remaining two bits 1110, 1120 of control octet 3 can be used for parity checks, wherein the 6 address bits can be considered as two 3-bit units.

An interaction between a bonding engine and an ATM switch can be achieved using an utopia bus architecture. When a cell is transferred over the utopia bus, 53 octets are transferred, 48 comprising PDU and 5 comprising the header. The bonding engine must insert appropriate octets for the header. This is especially important for the low-speed PVCs sent to the switch since the header contains the VPI/VCI information for relaying the cell to the appropriate output. The assignment of VPI/VCI for the output bonded ATM cells can be important in allocating cells to the various low-speed PVCs.

In a preferred embodiment, the invention can include, for example, 8 low-speed PVCs and the ATM switch management layer is aware of the (relative) capacities of the 8 PVCs. As part of the bonding engine implementation, a microprocessor port can be made available for the management layer to provision the bit-rate identification of each of the 8 low-speed PVCs (among other control and configuration items).

Each low-speed PVC can be associated with a bit-rate octet (byte). The number of ones in the bit-rate octet can be a measure of the relative speed of a low-speed PVC. If a PVCn has twice the bit-rate capacity of a PVCm, then the bit-rate octet for the PVCn may have twice as many ones as the bit-rate octet for the PVCm. If a PVC is not being used, then every bit of the associated bit-rate octet can be set to zero.

The VPI/VCI identifiers for the 8 low-speed PVCs may be hard-coded. The VPI/VCI assignment for the low-speed PVCs entering the bonding engine via the utopia bus can be arbitrary. The bonding engine does not need to use this information as part of its operation. However, for purposes of performance monitoring, the VPI/VCI assignment information can be helpful. The VPI/VCI assignment can also be hard-coded.

The VPI/VCI assignment is depicted below by showing the 5-octet header arrangement and the pattern that can be hard coded, as illustrated in Table II.

Eight PVCs can be identified by the 3 bits (B2, B1, B0). The other entries may be either 0 or (a3, a2, a1, a0). This allows some flexibility in choosing an internal VPI and a range for internal VCIs. It may be advantageous to make the entries of the first 3 octets identical (all octets the same). If these octets are identical, then some simplification is possible in the hardware. This is especially true for the 8 PVCs constituting the bonding engine output.

For input low-speed PVCs, the first three octets can be arbitrary. The eight low-speed PVCs may be identified via (B2, B1, B0). The bonding engine does not need to do an HEC check, thus the HEC can also be arbitrary. For the low-speed PVCs, PTI:[2:0] and CLP can be 0. For the high-speed-PVC, the PTI[2:0] may be carried over the bonded link and reproduced at the other side. In an preferred embodiment, the values of a0–a3 can be: a0=1 and a1=a2=a3=0. Thus the VPI/VCI for low-speed PVCs can be: VPI=0×10/VCI=0×1010–0×1017.

The VPI/VCI identifiers for the high-speed PVCs can be hard-coded. The VPI/VCI assignment for the high-speed PVCs entering the bonding engine (via the utopia bus) can be arbitrary. The bonding engine does not need to use this information as part of its operation. The VPI/VCI assignment may have the same format as low-speed PVCs, and be hard-coded. In a preferred embodiment, the values of a0–a3 can be: a0=1 and a1=a2=a3=0. The values of B0~B2 are: B0=B1=B3=0. Thus the VPI/VCI for high-speed PVC can be: VPI=0×10VCI=0×1010.

A bonded ATM cell can be sent over any of the low-speed PVCs since adequate information may be provided in the control octets to position the cell in a memory of a receive end. If all the low-speed PVCs have exactly the same cell rate capacity (bit-rate capacity) then a simple round-robin scheme can be used to distribute the cells over the various PVCs. However, if the capacities of the PVCs are not the same, then it is appropriate to distribute the cells between the PVCs in a manner that is commensurate with the bit-rate capacities of each of the PVCs.

The distribution of cells can be achieved in the following manner. The ATM switch management layer can be made aware of the capacities of the PVCs and may provide the bonding engine with a measure of these (relative) capacities. A bit-rate octet associated with each low-speed PVC can contain a number of "1s" that is proportional to the PVC bit-rate capacity. Thus a set of eight bit-rate octets (one for each of a set of eight PVCs) can be viewed as a 64-bit array of ones and zeroes, where there are eight entries (bits) for each PVC.

The capacities of the PVCs may be characterized once, multiple times, periodically and/or on a rolling basis. In the latter three cases, the frequency of characterization may be inversely proportional to the actual over all bit-rate performance achieved with the stream of asynchronous transfer made cells, thereby providing an intelligent tuning capability.

TABLE II

| Header | bit 7 | bit 6 | bit 5 | bit 4 | bit 3 | bit 2 | bit 1 | bit 0 |
|---|---|---|---|---|---|---|---|---|
| H1 | 0 | 0 | 0 | 0 | 0 / a3 | 0 / a2 | 0 / a1 | 0 / a0 |
| H2 | 0 | 0 | 0 | 0 | 0 / a3 | 0 / a2 | 0 / a1 | 0 / a0 |
| H3 | 0 | 0 | 0 | 0 | 0 / a3 | 0 / a2 | 0 / a1 | 0 / a0 |
| H4 | 0 | B2 | B1 | B0 | PTI-2 | PTI-1 | PTI-0 | CLP |
| H5 | HEC-7 | HEC-6 | HEC-5 | HEC-4 | HEC-3 | HEC-2 | HEC-1 | HEC-0 |

A VCI for a PVC can be identified via a 6-bit word of which the 3 most-significant-bits are those actually used for a header (B2, B1, B0) and the 3 least-significant bits used by an assignment circuitry. The task of the assignment circuitry can include establishing what the VCI should be for the next bonded ATM output cell. The 6-bit VCI of the most recent output cell can be written as: [(B2, B1, B0);(b2, b1, b0)], where the upper and lower significant portions of the 6-bit identifier are separated for convenience.

Figure 12:
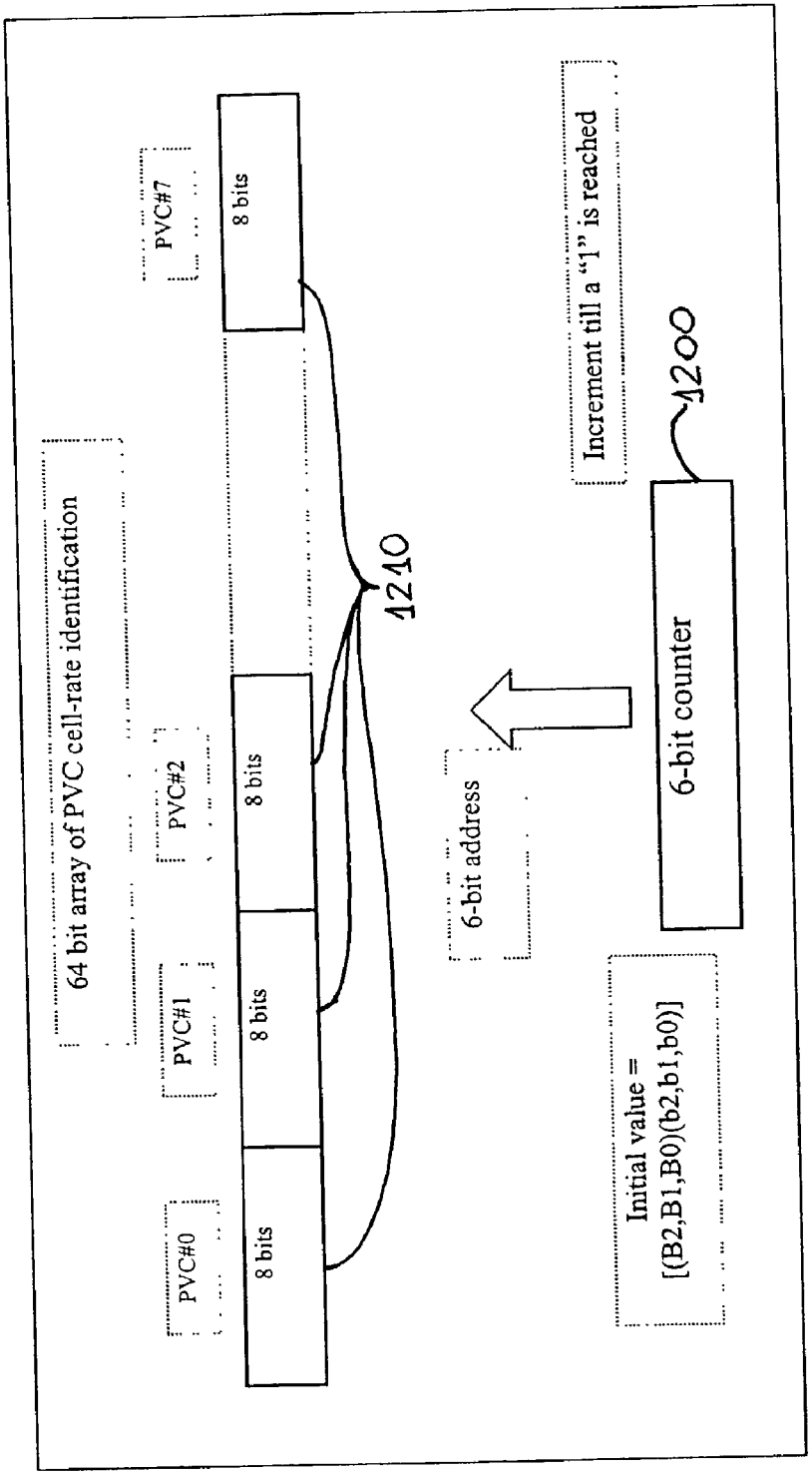
FIG. 12 illustrates a block diagram of a counter method to determine a NEXT-VCI, representing an embodiment of the invention.

Referring to FIG. 12, a block diagram of a counter method to determine a NEXT-VCI is depicted. Using a value of [(B2, B1, B0);(b2, b1, b0)] as the initial state for a 6-bit counter 1200, and using a counter state (between 0 and 63) as a pointer into a 64-bit array of bit-rate bits 1210 (eight bit-rate octets), the counter can be incremented until the array content is one "1." The counter state may then become (indicate) the next VCI. In some instances, there may be no one "1" to be found in the 64-bit array of bit-rate bits 1210. The incrementing can be terminated when the counter state returns to [(B2, B1, B0),(b2, b1, b0)] and that is used for the next VCI.

The allocation of cells to PVCs done in this fashion may distribute cells to a PVC in a manner proportional to the number of ones "1s" in its bit-rate octet and, therefore, proportionally to the bit-rate capacity of the PVC. If a control byte includes only zeros, indicating a PVC with zero capacity, (i.e. unused) no cells are allocated. The counter can then be advanced to the state corresponding to the first bit of the next bit-rate octet.

A drawback to this method, wherein the counter increments sequentially through the memory array, is that cells may be assigned to PVCs in large groups. For example, if all 8 bits of all 8 control bytes (bit-rate octets) of each PVCs are ones, indicating all PVCs have the same rate, eight cells can be assigned to PVC#0, the next 8 cells to PVC#1, and so on. It may be an administrative burden on the ATM switch management layer to assign just the right number of ones to each control byte such that the cells are uniformly distributed.

The allocation of cells to PVCs can be made more uniform by changing the counter. In particular, a counter that sequenced through the 64 states in a pseudo-random manner can achieve this goal. Such a counter can be based on the notion of linear feedback shift registers with minor modifications.

Figure 13:
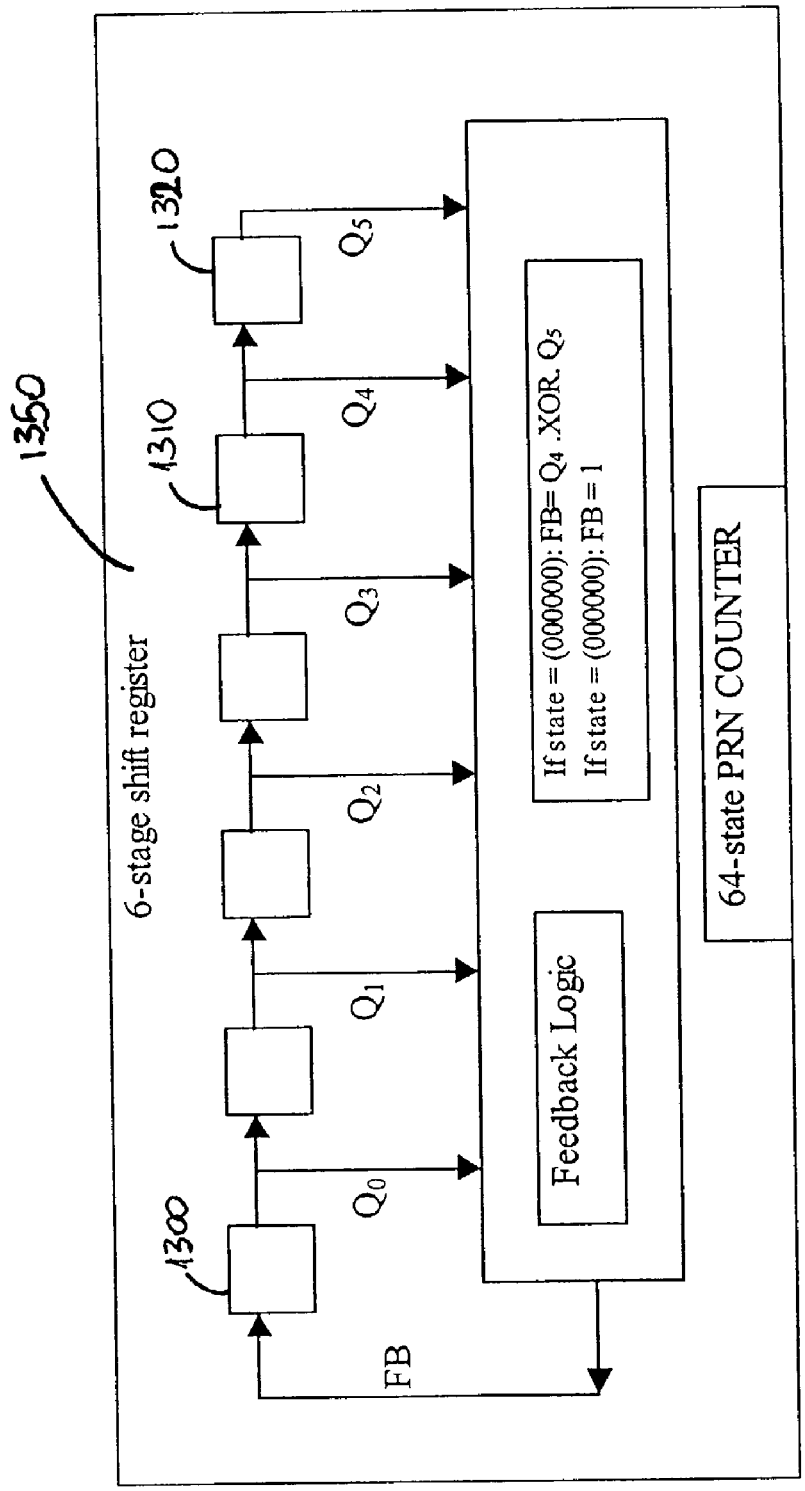
FIG. 13 illustrates a block diagram of a 64-state PRN counter using a 6-bit shift register with feedback, representing an embodiment of the invention.

Referring to FIG. 13, a block diagram of a 64-state PRN counter using a 6-bit shift register with feedback is depicted. A 63-state pseudo-random binary sequence (PRBS) counter can be obtained by making the input to a first element 1300 in a 6-stage shift register 1350 equal to an exclusive-or function of the outputs of a fifth element 1310 and a sixth element 1320 of the 6-stage shift register 1350. In the PRBS mode, the state (000001) precedes the state (100000). In this way, the all-zero state can be avoided. A PRBS counter can be transformed into a 64-state (often called a PRN or pseudo-random-noise) counter by introducing logic that inserts the all-zero state between (000001) and (100000) states.

Still referring to FIG. 13, a clock signal that causes an increment is not shown. The clock signal is implied and may be of high enough frequency to cycle through all 64 states in a time interval less than the transfer of a cell across the utopia bus. The PRN counter cycles through all 64 states (000000) through (111111) in a non-sequential manner. Consequently, using the PRN counter instead of the conventional counter can facilitate an uniform distribution across a plurality of low-speed PVC's. In this way, the allocation of cells to PVCs is proportional to the capacity as indicated by the number of ones, but the allocation is random.

In a preferred embodiment, a bonding engine can be implemented in a field programmable gate array (FPGA). Vendors of readily, commercially available, suitable FPGAs include Xilinx Inc. and several macros provided by Xilinx along with different design tools can be utilized. The design method for the FPGA can include utilizing Innoveda software (formerly ViewLogic) for design entry and Xilinx Libraries for the macros.

An FPGA can includes several functions that are not directly related to the bonding engine. FIGS. 16–28 depict top-level schematics. Individual blocks pertaining to the operation of the bonding engine (i.e. the bonding application) are illustrated in FIGS. 29–54.

Figure 16:
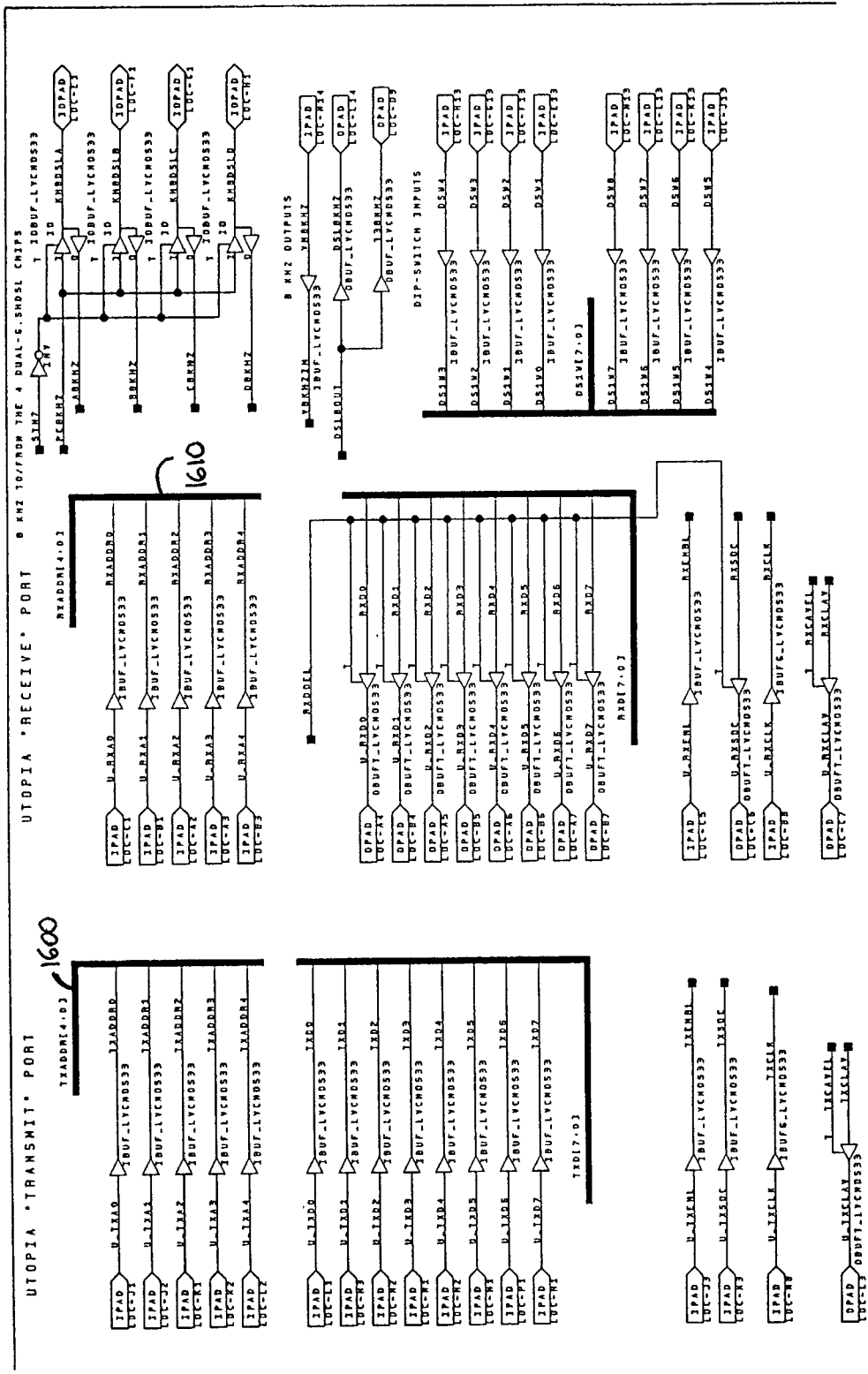
FIGS. 16–18 illustrate block diagrams of internal signals, representing an embodiment of the invention.
Figure 17:
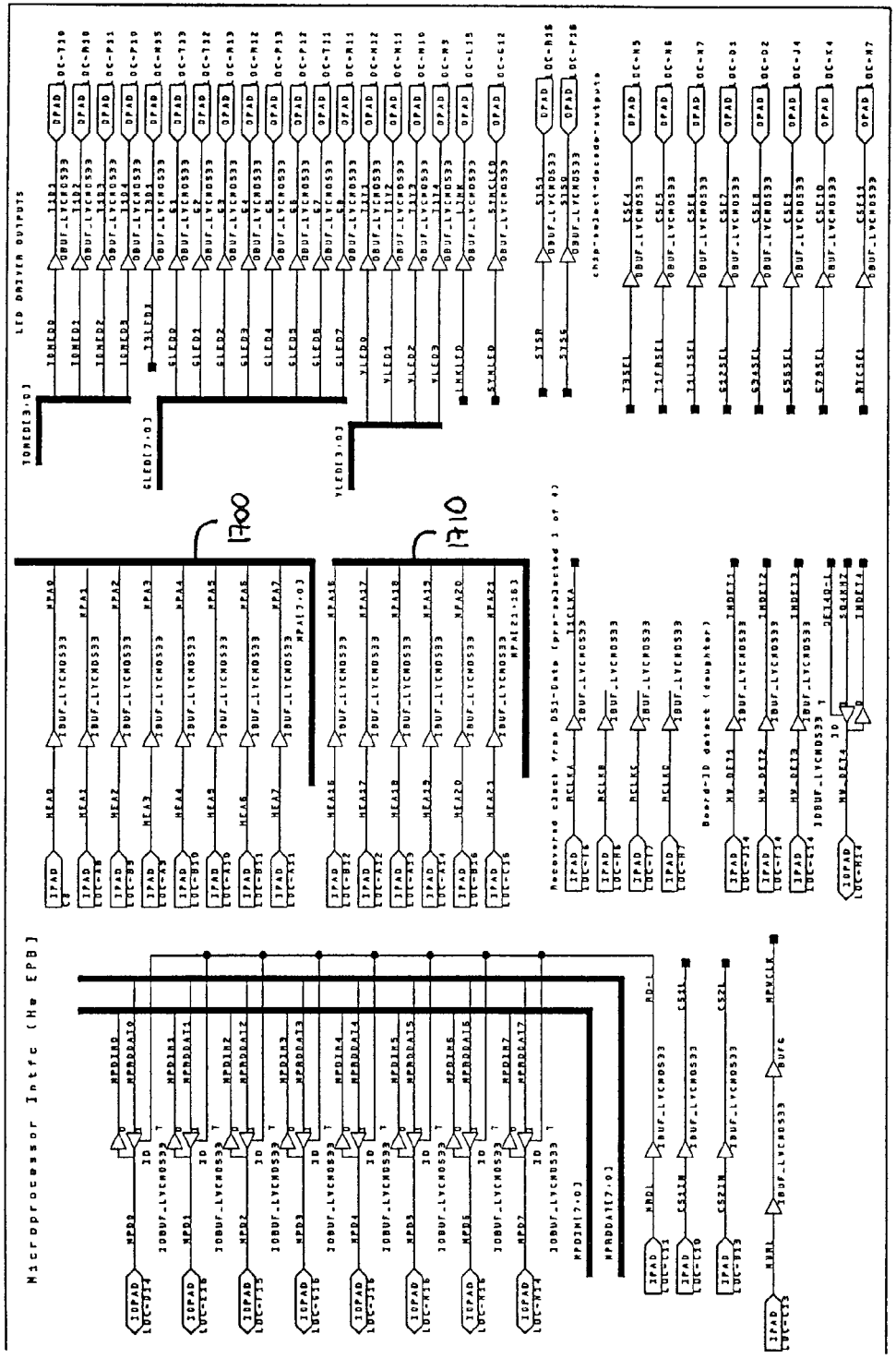
Figure 18:
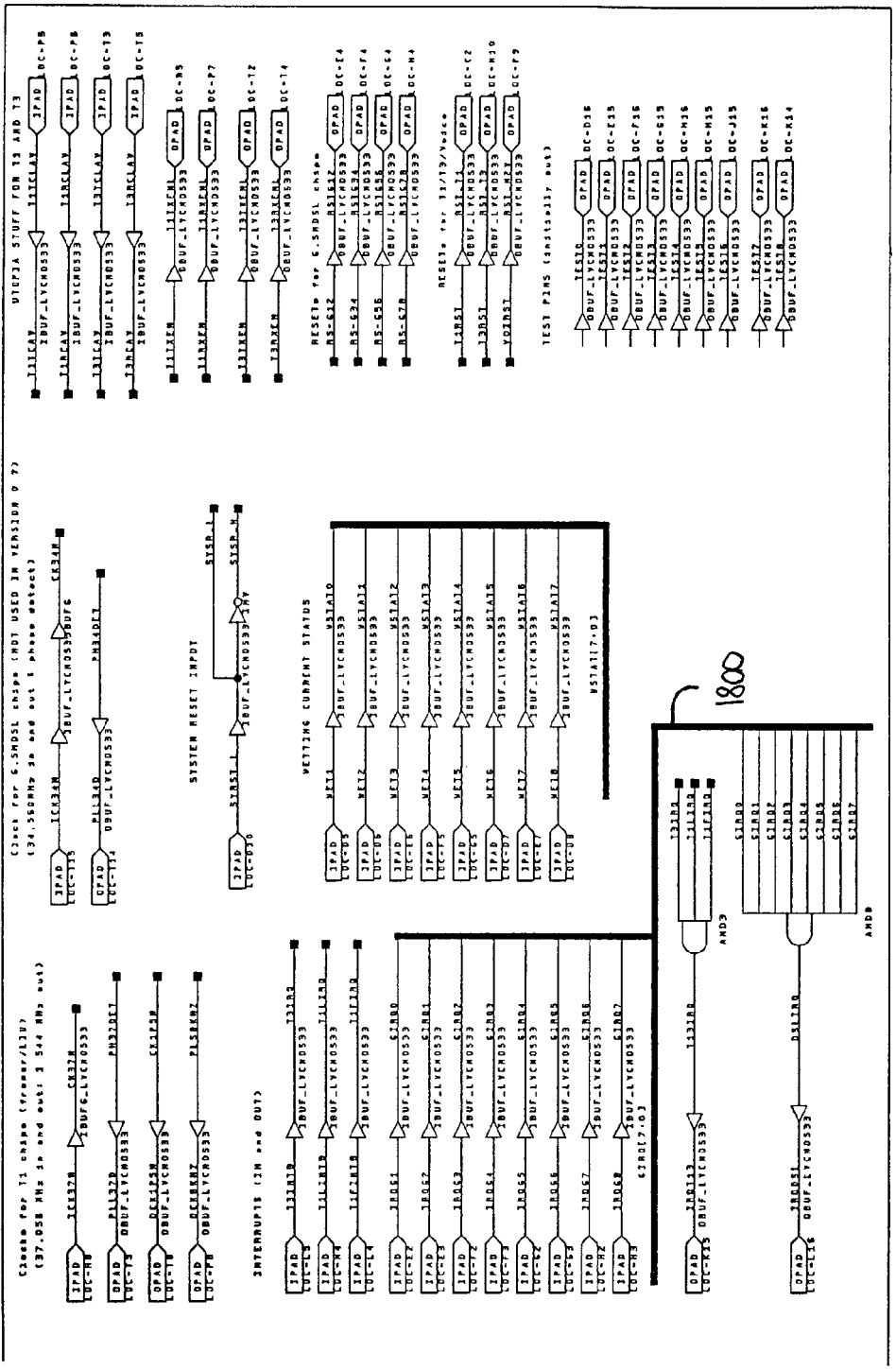

Referring to FIGS. 16–18, block diagrams of internal signals are depicted. FIGS. 16–18 illustrate how internal signals can connect to input/output buffers and input/output pads. A TXADDR[4,0] signal 1600 is coupled to an utopia transmit port, and an RXADDR[4,0] signal 1610 is coupled to an utopia receive port. An MPA[7, 0] signal 1700 and an MPA [21, 16] signal 1710 are coupled to a microprocessor interface. A GIRQ[7, 0] signal 1800 is coupled to an interrupt.

Figure 19:
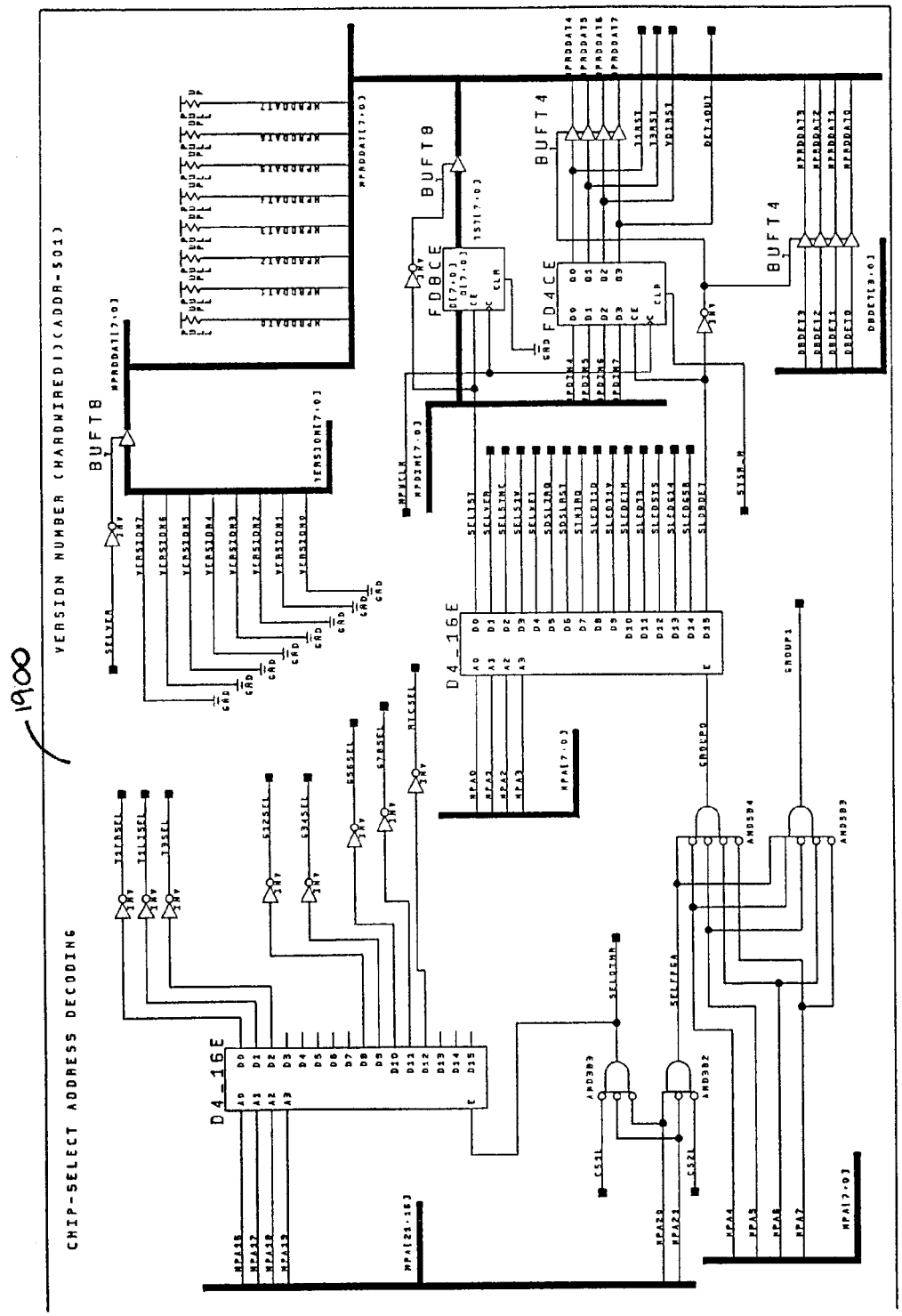
FIG. 19 illustrates a block diagram of address decoding, representing an embodiment of the invention.

Referring to FIG. 19, a block diagram of an address decoding 1900 is depicted. It illustrates some the address decoding associated with a microprocessor interface provided in the FPGA. Some of the address decoding required for other devices in a network (other than the bonding engine) can also be done in the FPGA.

Figure 20:
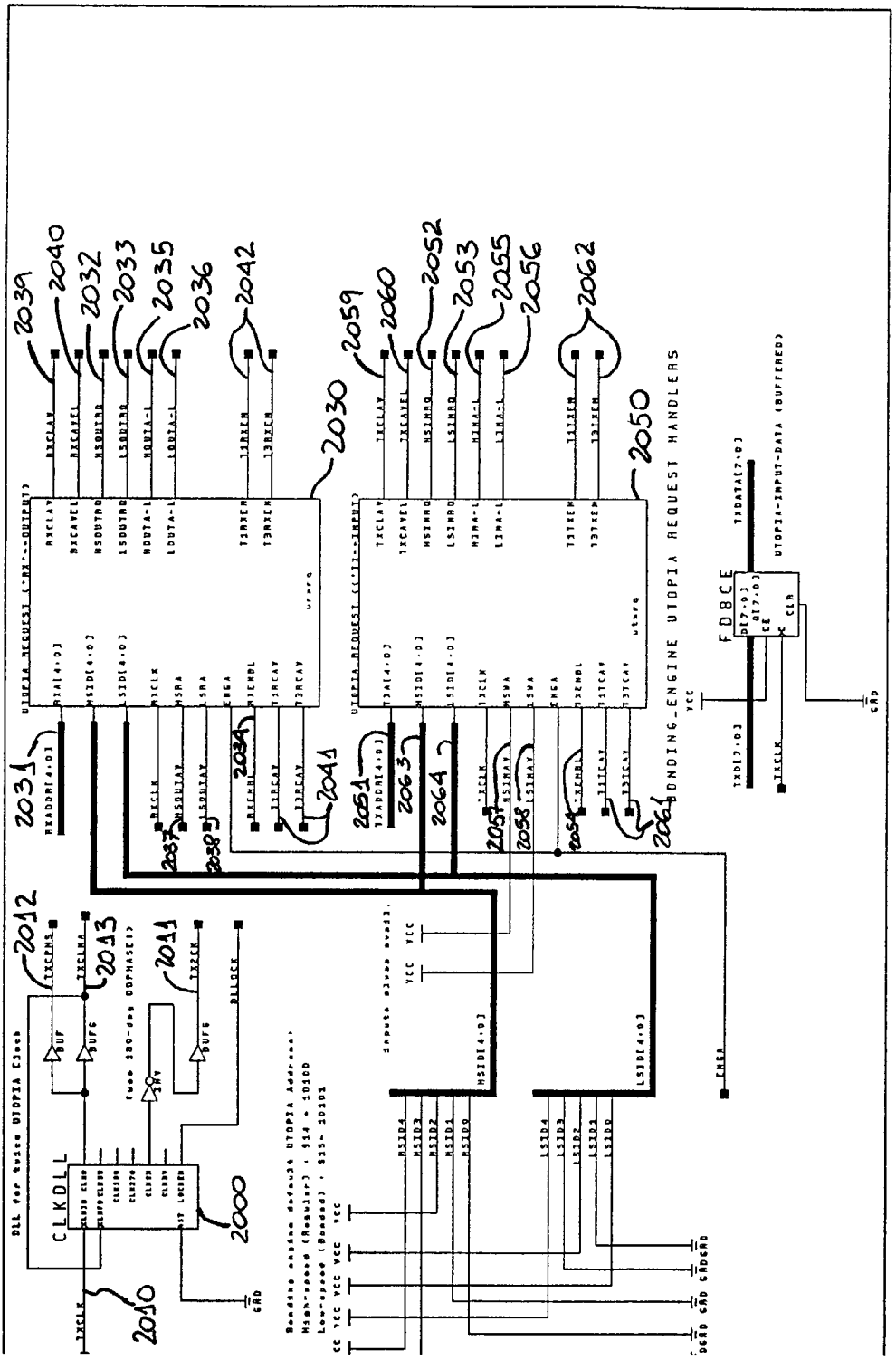
FIG. 20 illustrates a block diagram of bonding engine elements, representing an embodiment of the invention.

Referring to FIG. 20, a block diagram of bonding engine elements is depicted. A CLKDLL block 2000 is a macro provided by Xilinx and can develop a 2X clock (in phase with an input to the block). An utopia interface can provide a transmit clock TXCLK 2010 which can be nominally 25 MHz. The transmit clock TXCLK 2010 is coupled to the CLKDLL block 2000. The CLKDLL block 2000 can develop a 50 MHz clock signal (TX2CK 2011 is the inverted version, effectively 180 degrees out-of-phase with the transmit clock TXCLK 2010) and copies of the transmit clock TXCLK 2010, including a TXCPHS signal 2012 and a TXCLKA signal 2013.

Still referring to FIG. 20, an urxrq block 2030 (also, "UTOPIA REQUEST ("RX"=OUTPUT)") can service an utopia interface. The urxrq block 2030 can control the output from a bonding engine. The bonding engine can determine whether there is a request for cells based on an address presented on the utopia bus via a RXADDR[4:0] signal 2031 which is a 5-bit value. The urxrq block 2030 can compare the utopia bus address with 10100 to determine if there is a request for a high-speed regular ATM cell; if so, an HSOUTRQ signal 2032 can be asserted. Similarly, for low-speed bonded ATM cells, the urxrq block 2030 can compare the RXADDR[4:0] signal 2031 with 10101; if the result is true, then an LSOUTRQ signal 2033 can be asserted. In conjunction with an utopia enable signal RXENBL 2034 and the address matching circuitry, a HOUTA-L signal 2035 can be asserted when the bonding engine needs to output high-speed cells onto the utopia receive data bus. Likewise, a LOUTA-L signal 2036 can be asserted when low-speed cells must be output onto the utopia receive data bus. An input HSOUTAV signal 2037 (high-speed cell available for output) and an input LSOUTAV signal 2038 (low-speed cell available for output) can inform the urxrq block 2030 whether a cell is available for delivery to the utopia bus and these, in conjunction with an address matching circuitry, may generate an utopia bus RXCLAV signal 2039 (cell available) and a tri-state control RXCAVEL signal 2040 for controlling the RXCLAV signal 2039 output buffer. A T1RCAV and T3RCAV signal 2041, and a T1RXEN and T3RXEN signal 2042 may be associated with functions other than bonding engine functions.

Still referring to FIG. 20, an utxrq block 2050 (also, "UTOPIA REQUEST ("TX"=INPUT)") can service the utopia interface. The utxrq block 2050 can control the input to the bonding engine. The bonding engine can determine whether there is a request for cell acceptance based on the address presented on the utopia bus via a TXADDR[4:0] signal 2051 which is a 5-bit value. The utxrq block 2050 can compare the utopia bus address with 10100 to determine if there is a request for the bonding engine to accept a high-speed regular ATM cell; if so a HSINRQ signal 2052 may be asserted. Similarly, for the low-speed bonded ATM cells, the urxrq block 2050 can compare the TXADDR[4:0] signal 2051 with 10101; if true, then a LSINRQ signal 2053 can be asserted. In conjunction with an utopia enable TXENBL signal 2054 and the address matching circuitry, an HINA-L signal 2055 can be asserted when the bonding engine must accept high-speed cells from an utopia transmit data bus. Likewise, an LINA-L signal 2056 can be asserted when low-speed cells needs to be accepted from the utopia transmit data bus. An HSINAV input signal 2057 (high-speed cell available for output) and a LSINAV input signal 2058 (low-speed cell available for output) can inform the utxrq block 2050 whether a cell can be accepted from the utopia bus and these, in conjunction with the address matching circuitry can generate an utopia bus TXCLAV signal 2059 (space for cell available) and a tri-state control TXCAVEL signal 2060 for controlling the utopia bus TXCLAV signal 2059 output buffer. A T1TCAV and T3TCAV signal 2061, and a T1TXEN and T3TXEN signal 2062 may be associated with functions other than bonding engine functions.

Still referring to FIG. 20, the utopia addresses of the high-speed and low-speed ports can be hard-wired. This can be modified and put under microprocessor control by having registers that a microprocessor may have access to for storing an identity code HSID[4:0] 2063 and an identity code LSID[4:0] 2064.

Figure 29:
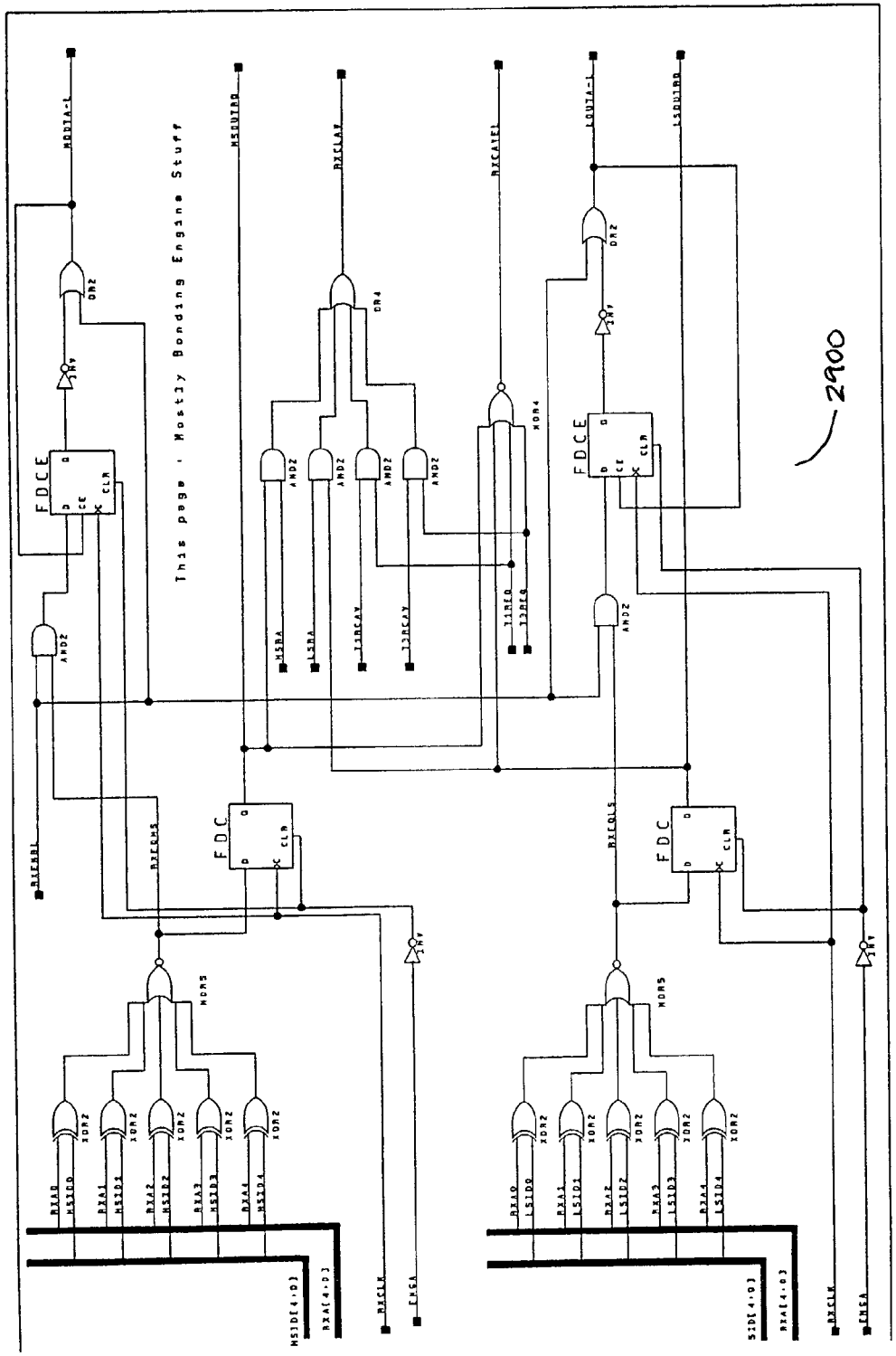
FIGS. 29 and 30 illustrate block diagrams of an urxrq element, representing an embodiment of the invention.
Figure 30:
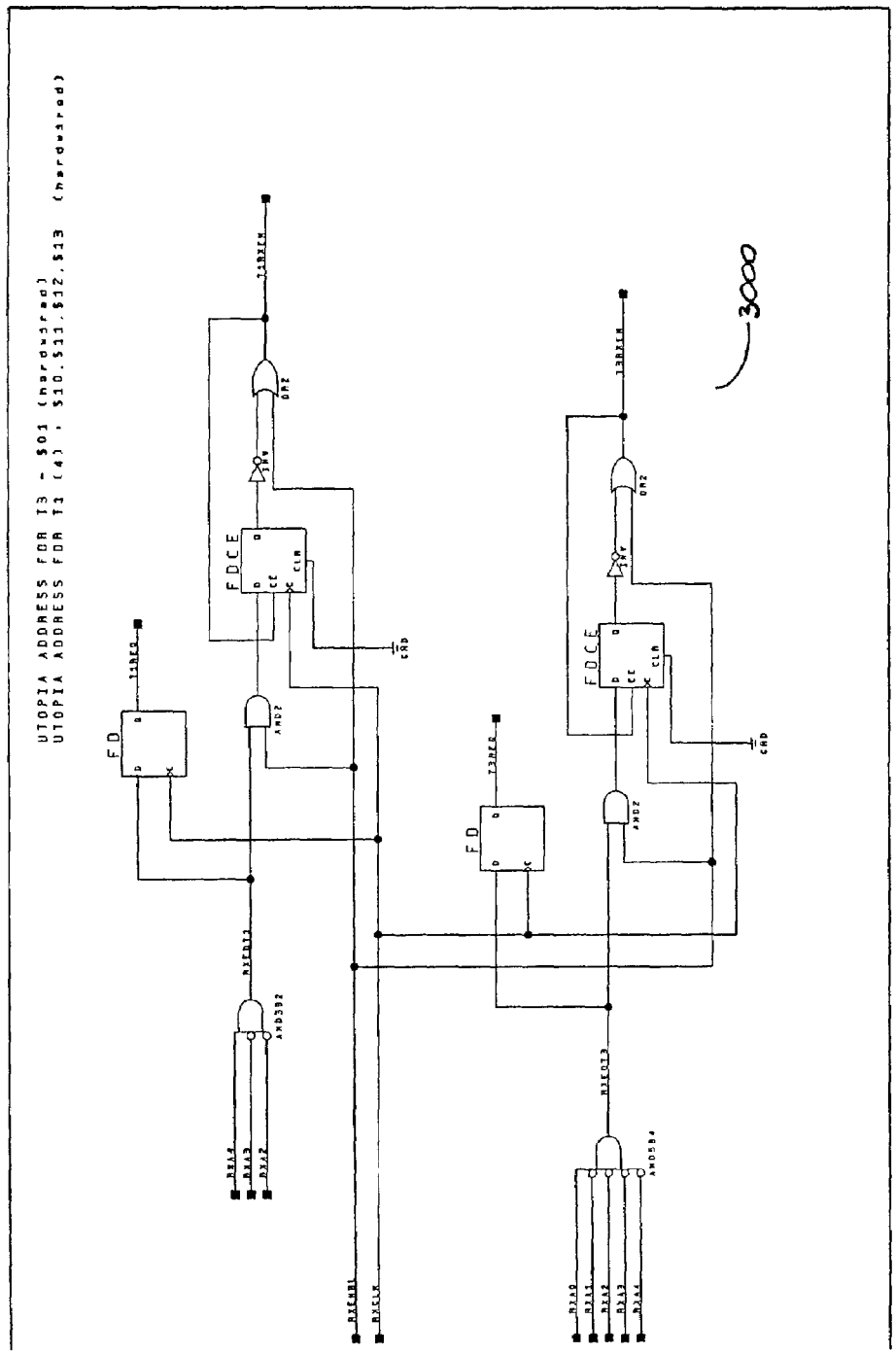

Referring to FIGS. 29 and 30, block diagrams of an urxrq block (element) 2900, 3000 are depicted. The underlying schematics for the urxrq block 2900, 3000 can be easily understood by one skilled in the art and need not be detailed here.

Figure 31:
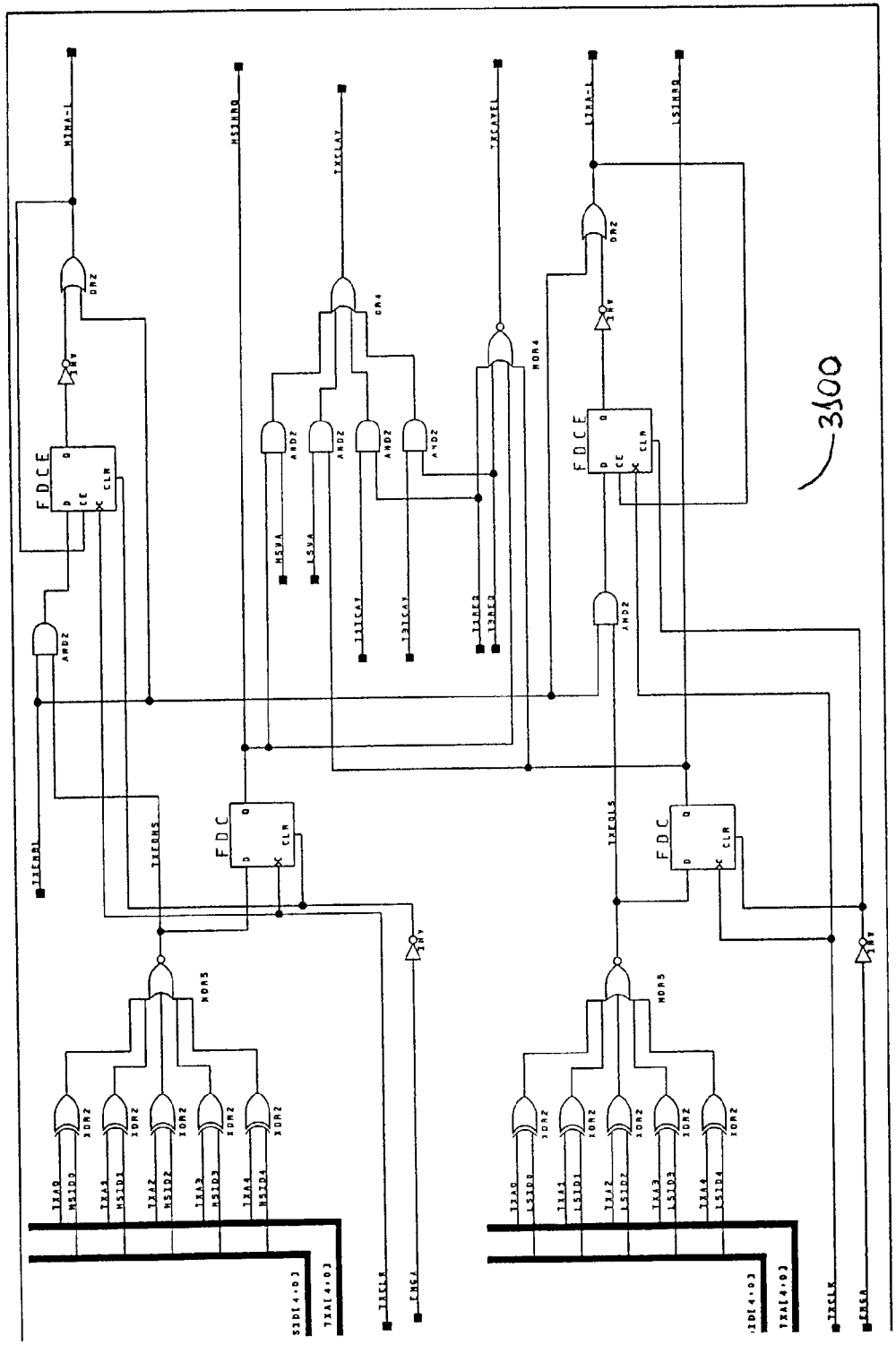
FIGS. 31 and 32 illustrate block diagrams of an utrxq element, representing an embodiment of the invention.
Figure 32:
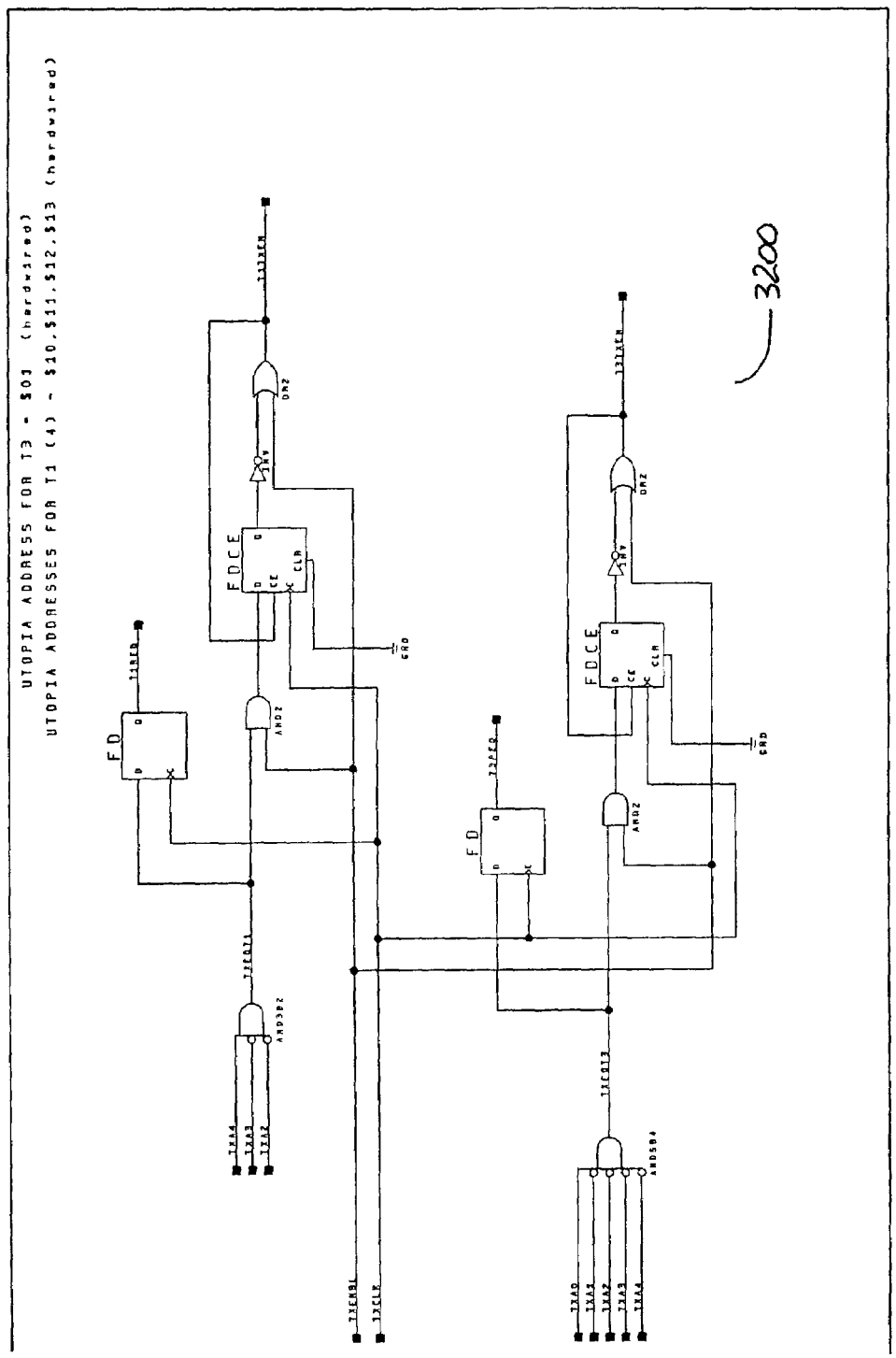

Referring to FIGS. 31 and 32, block diagrams of an utxrq block (element) 3100, 3200 are depicted. The underlying schematics for the utxrq block 3100, 3200 can be easily understood by one skilled in the art and need not be detailed here.

Figure 21:
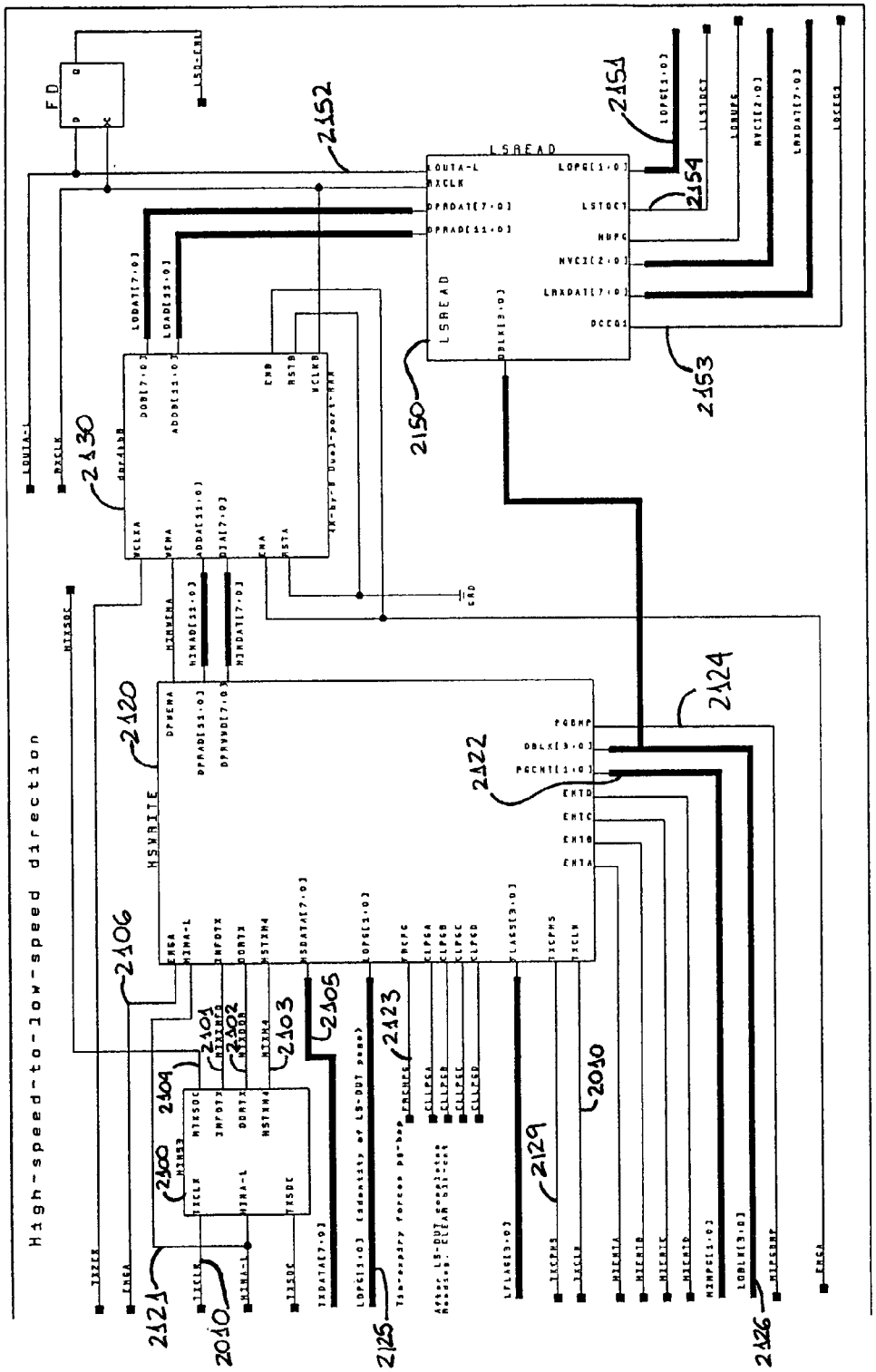
FIG. 21 illustrates a block diagram of high-speed to low-speed direction elements, representing an embodiment of the invention.

Referring to FIG. 21, a block diagram of high-speed to low-speed direction blocks (elements) is depicted. An HIN53 block 2100 can generate a plurality of control signals, including: HTXINFO 2101, HTXOOR 2102, HTXH4 2103 and HTXSOC 2104. The HTXINFO control signal 2101 may allow an HSWRITE block 2120 to identify when a payload of a regular ATM cell is present on the utopia data bus via a TXDATA[7:0] signal 2105. The HTXH4 control signal 2103 can be asserted when an H4 octet of an ATM cell header is present on the bus. The HTXSOC control signal 2104 can identify the start of the cell. The HTXOOR control signal 2103 can check to ensure that only 53 octets are taken from the utopia data bus. The bonding engine is active when an ENGA signal 2106 is asserted and the microprocessor has control of this (bit) signal. The HSWRITE block 2120 can contain a circuitry to accept incoming high-speed regular ATM cells from the utopia bus and write them into a dual-port-RAM 2130.

Figure 22:
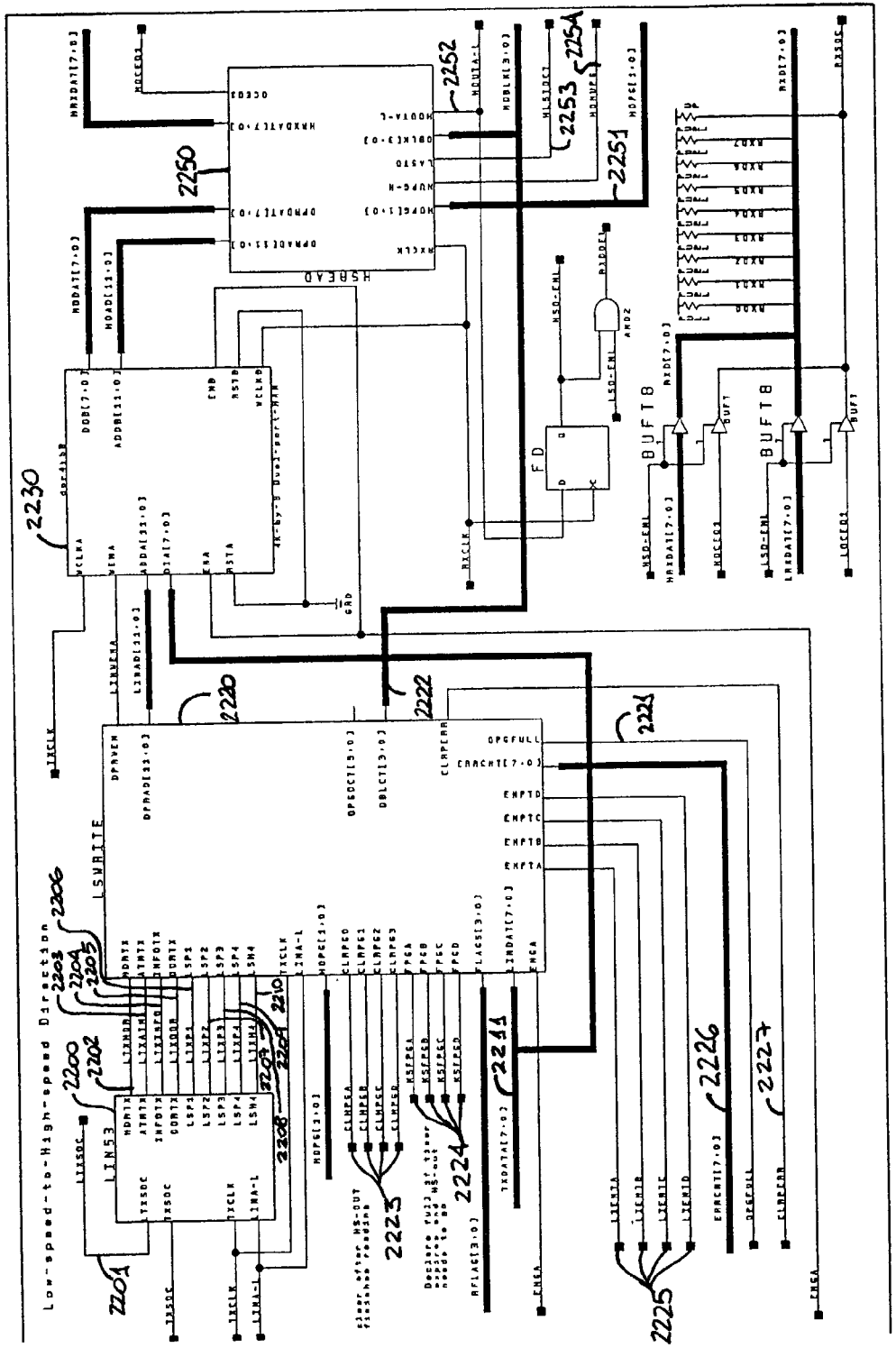
FIG. 22 illustrates a block diagram of low-speed to high-speed direction elements, representing an embodiment of the invention.

Referring to FIG. 22, a block diagram of low-speed to high-speed direction blocks (elements) is depicted. An LIN53 block 2200 can generate a plurality of control signals, including: LTXSOC 2201, LTXHDR 2202, LTXATM 2203, LTXINFO 2204, LTXOOR 2205, LTXP1 2206, LTXP2 2207, LTXP3 2208, LTXP4 2209, LTXH4 2210. These control signals can identify when an incoming cell starts (LTXSOC 2201), whether the octet present on the data bus is part of the header (LTXHDR 2202), part of the 48-octet PDU (LTXATM 2203), or part of the 44-octet information assembly (LTXINFO 2204). The incoming cells may be in the bonded ATM format. The control signals LTXP1 2206, LTXP2 2207, LTXP3 2208, and LTXP4 2209 can identify 4 control octets. An LSWRITE block 2220 can contain the circuitry to accept incoming low-speed bonded ATM cells from the utopia bus and write them into a dual-port-RAM block 2230.

Figure 33:
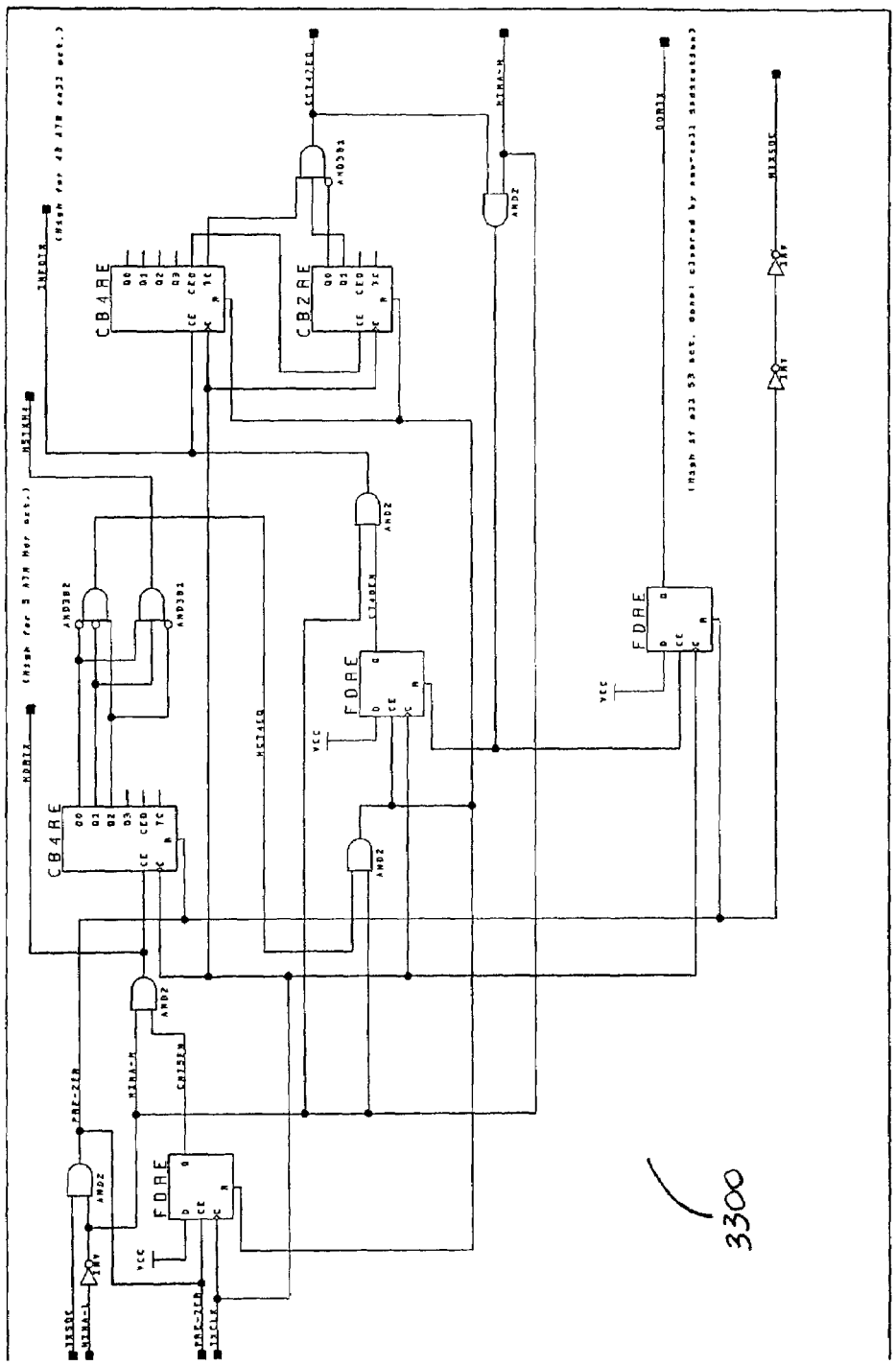
FIG. 33 illustrates a block diagram of a HIN53 element, representing an embodiment of the invention.
Figure 41:
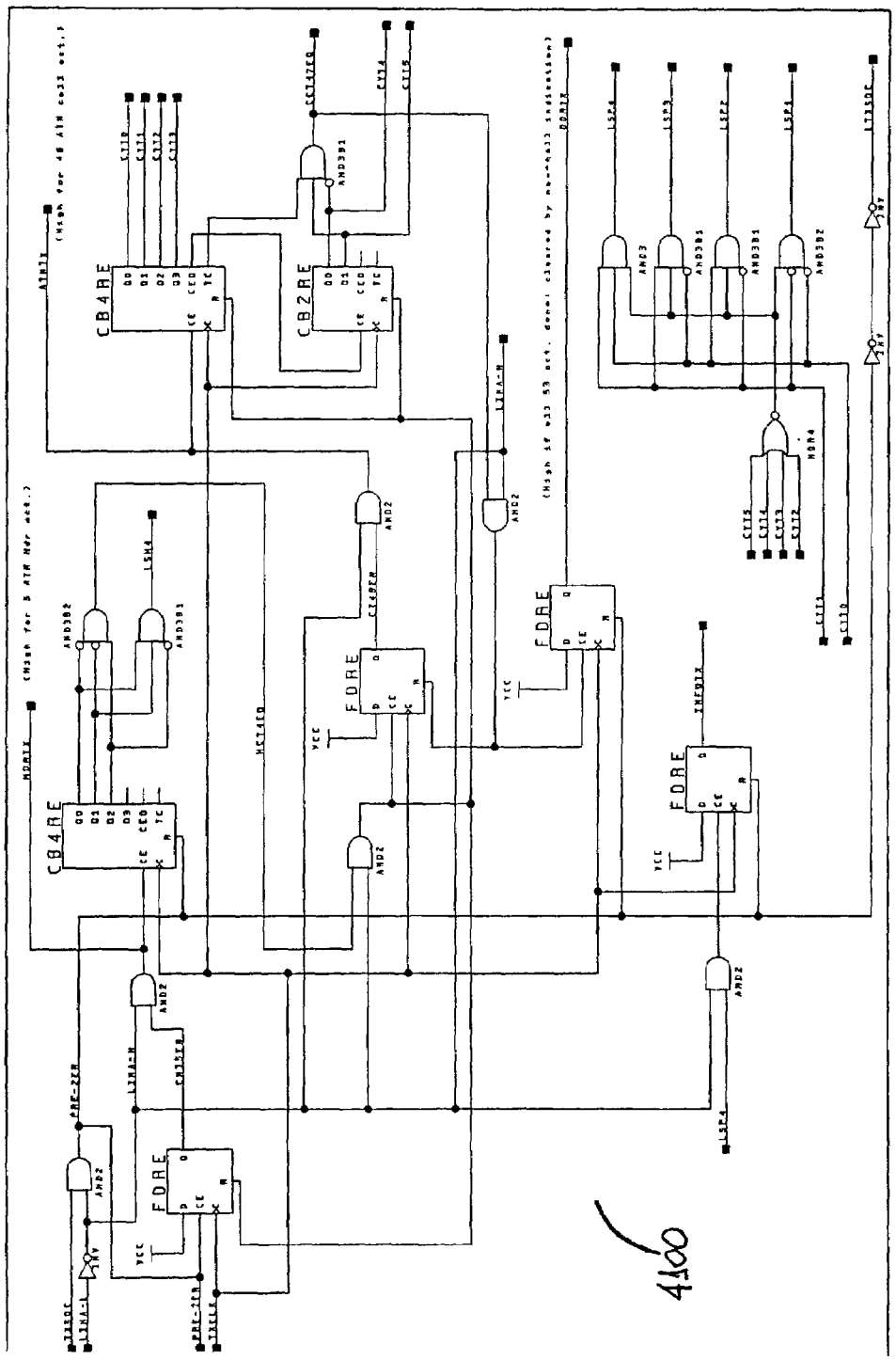
FIGS. 41 illustrates a block diagram of a LIN53 element, representing an embodiment of the invention.

Referring to FIG. 33, a block diagram of a HIN53 block (element) 3300 is depicted. Referring to FIG. 41, a block diagram of a LIN53 block (element) 4100 is depicted.

Figure 23:
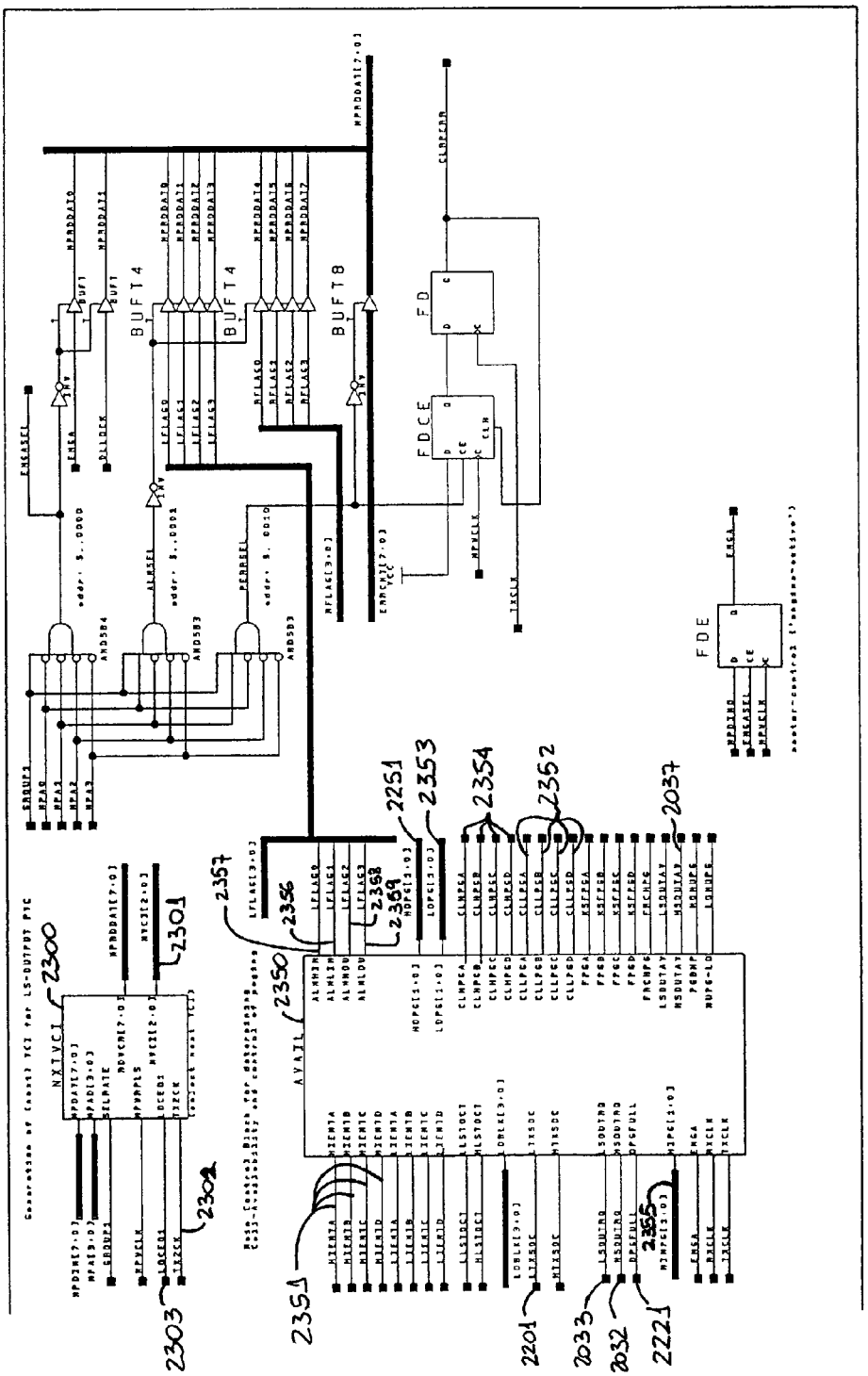
FIG. 23 illustrates a block diagram of two bonding engine elements, representing an embodiment of the invention.
Figure 24:
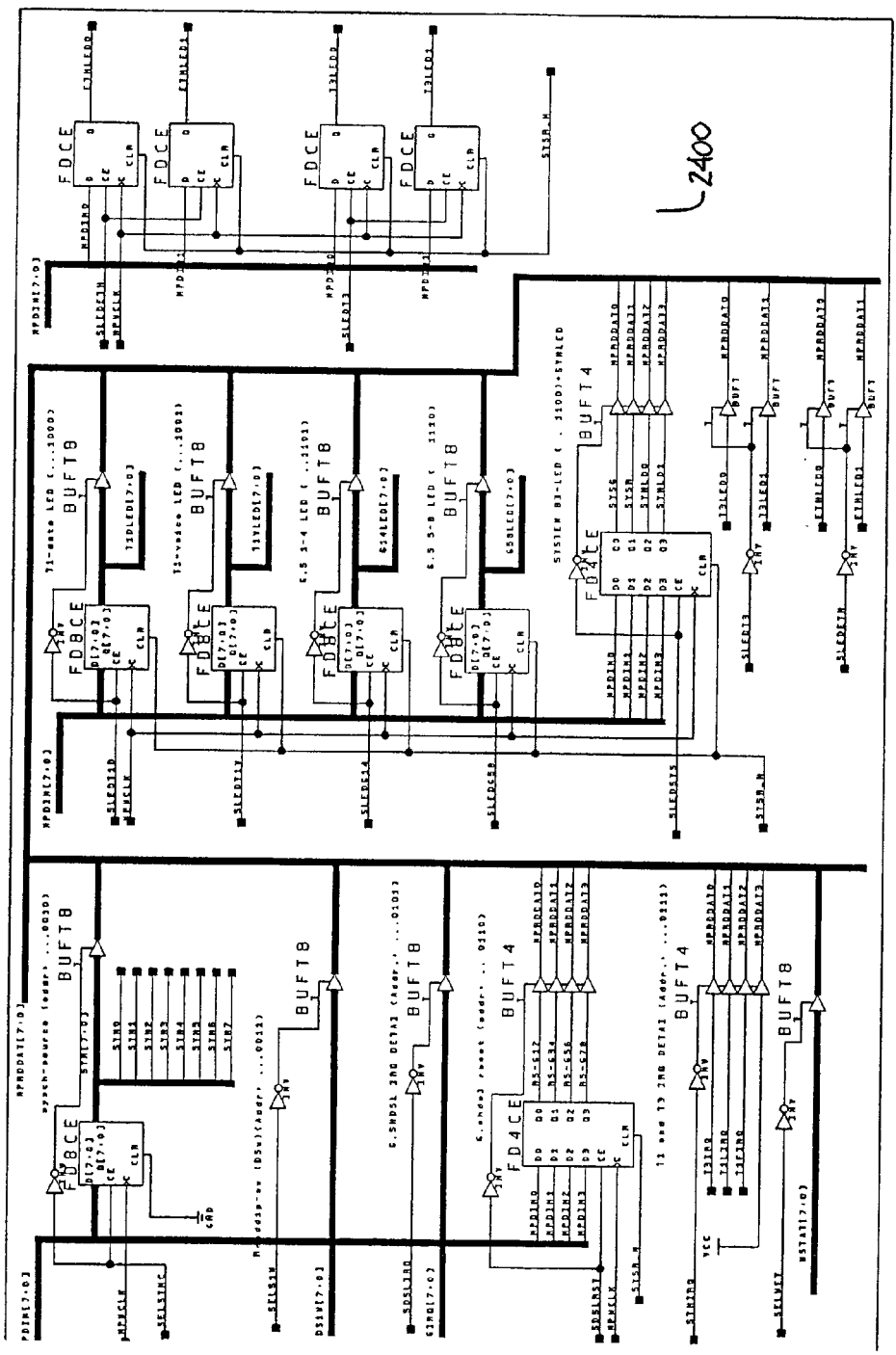
FIGS. 24–28 illustrate block diagrams of circuitry in an FPGA, representing an embodiment of the invention.
Figure 25:
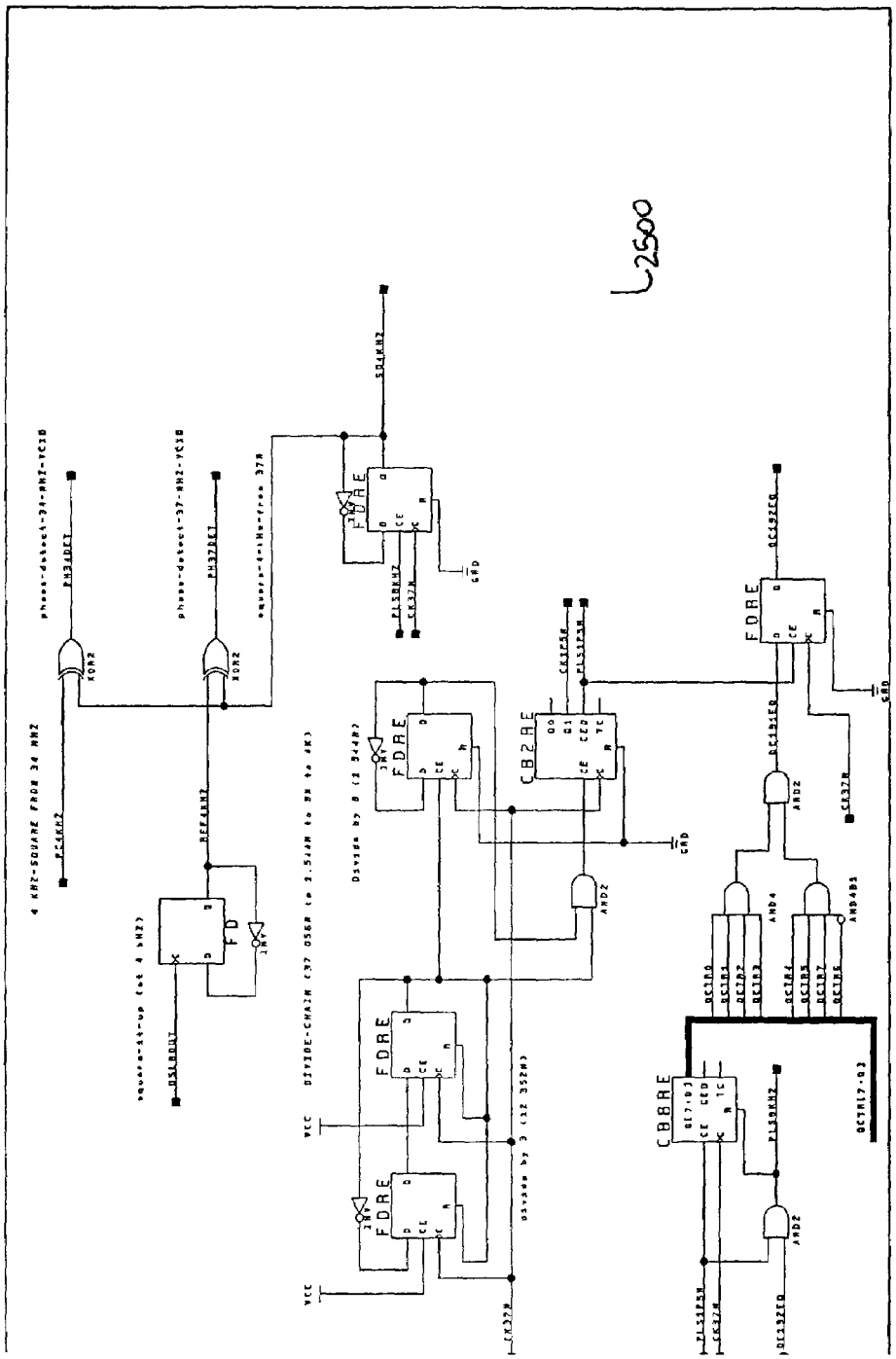
Figure 26:
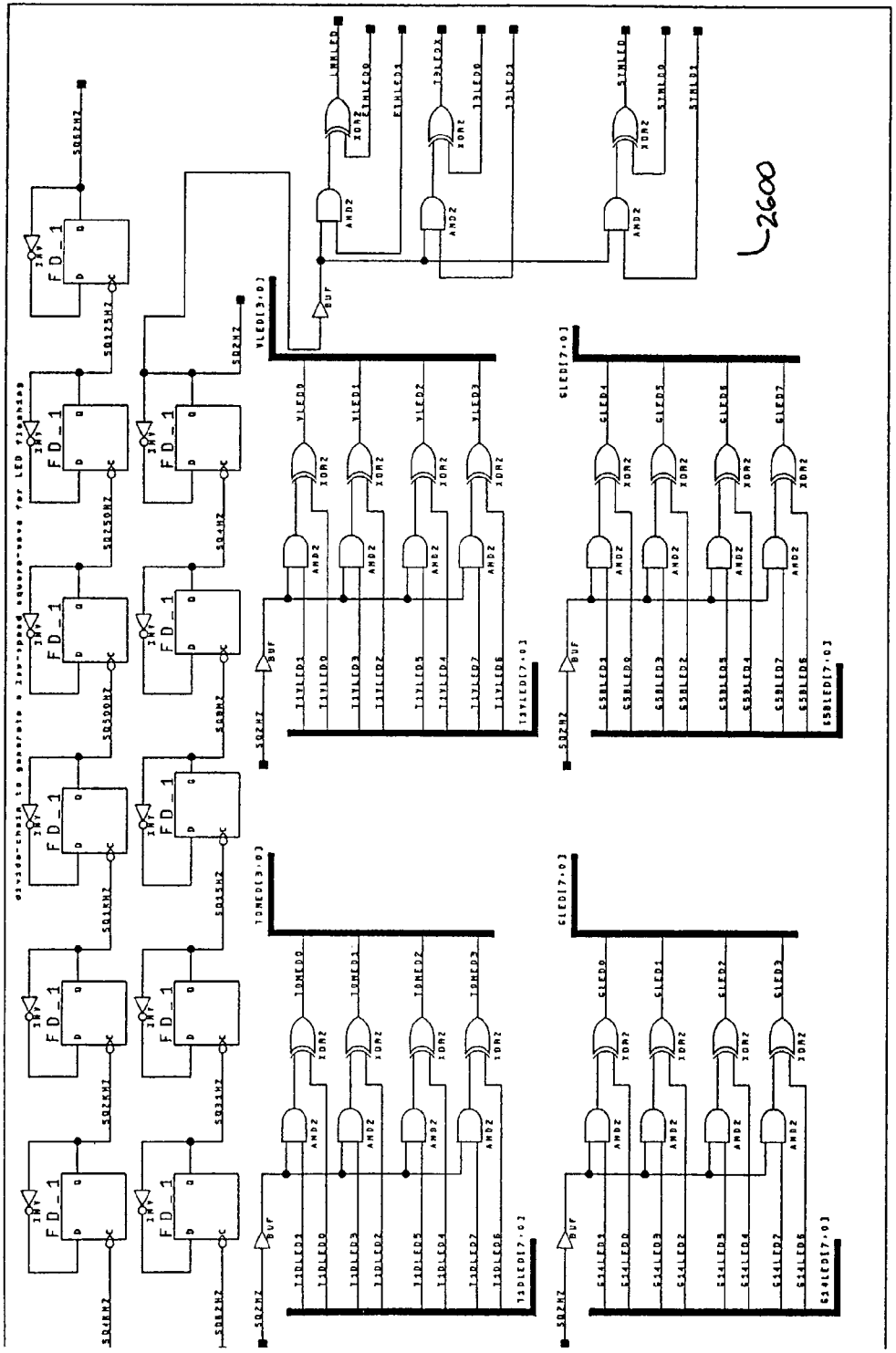
Figure 27:
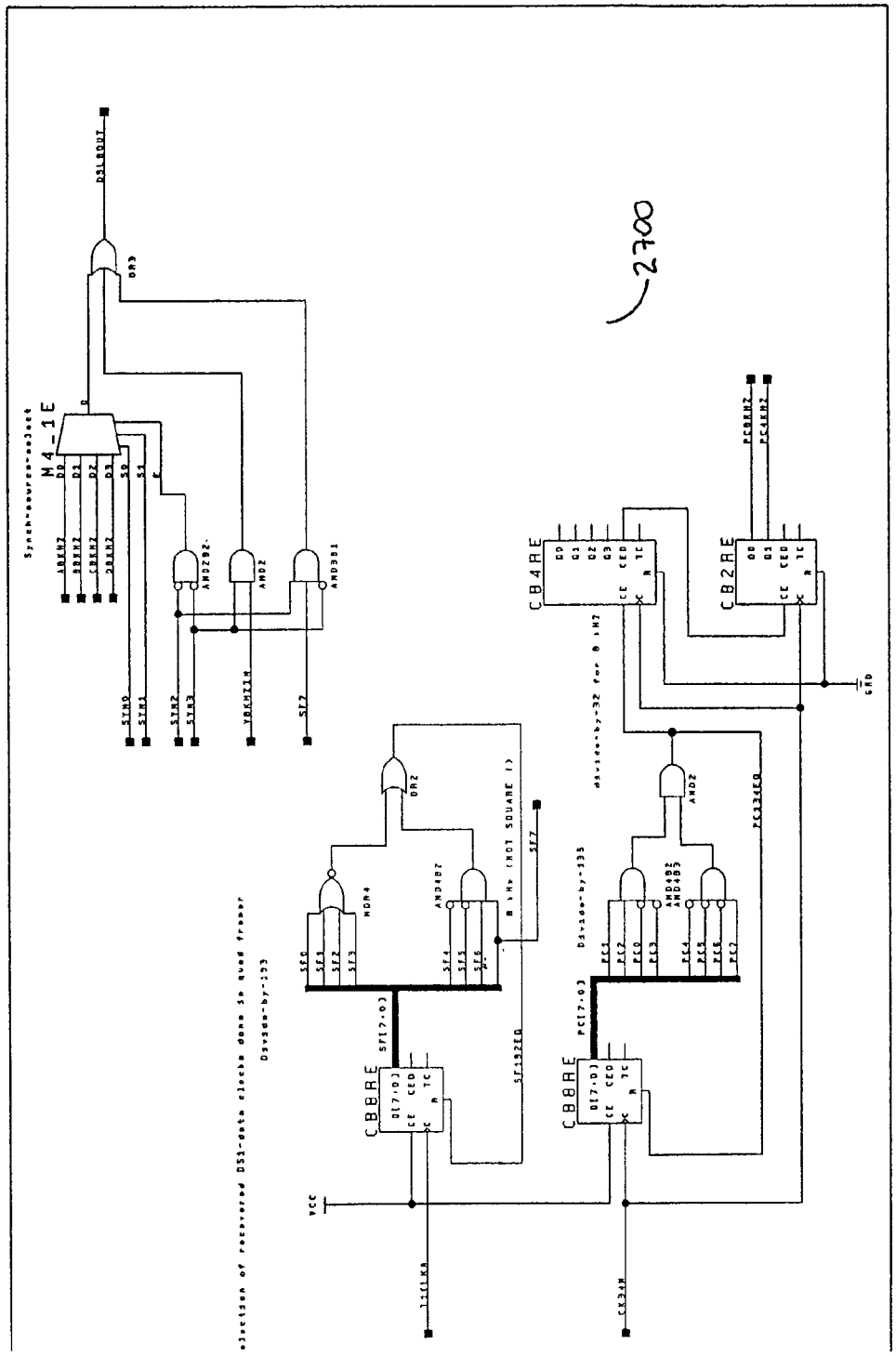
Figure 28:
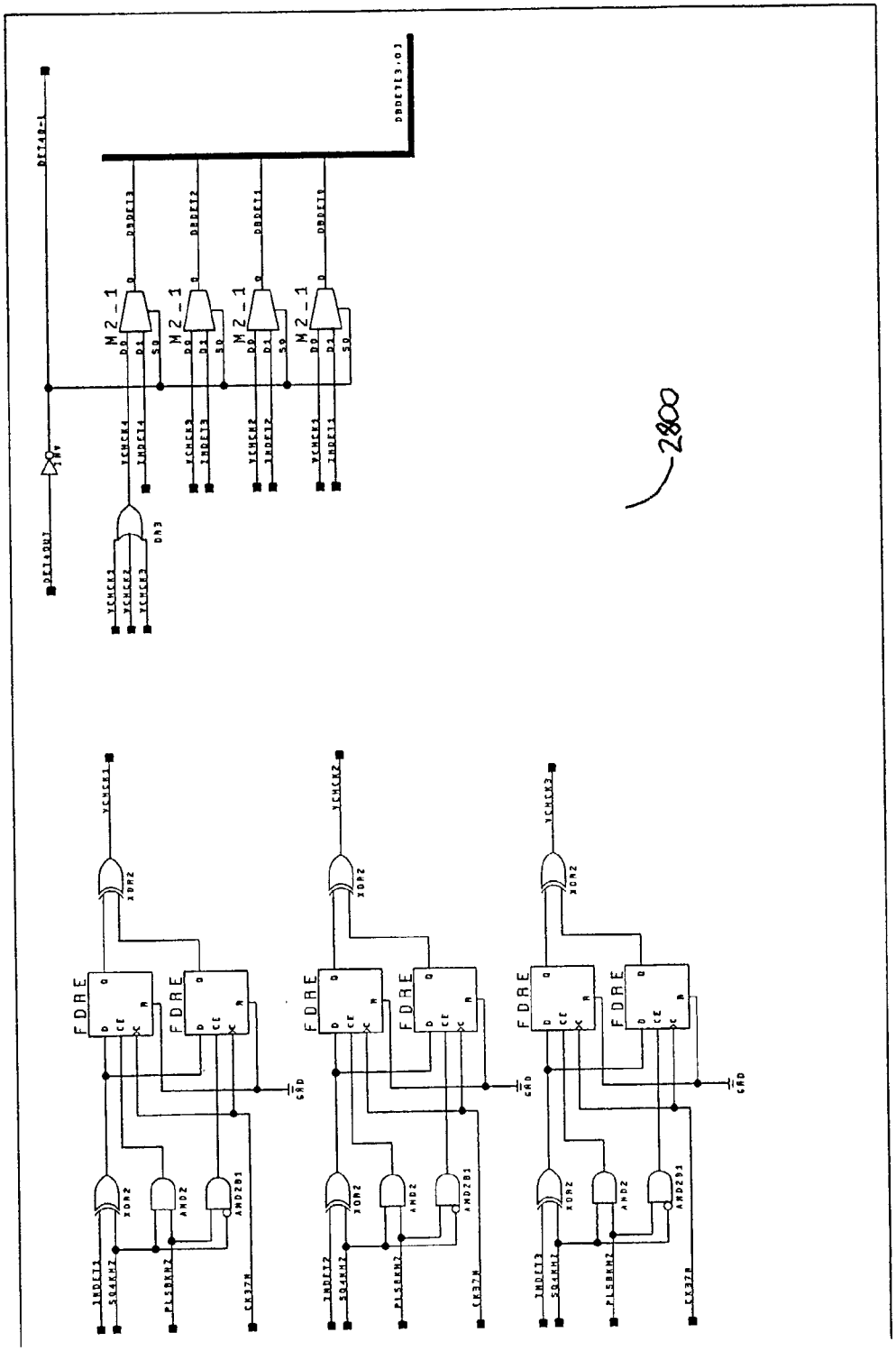

Referring to FIG. 23, a block diagram of two bonding engine blocks is depicted. An NXTVCI block 2300 can implement an algorithm for deciding the VCI for the next low-speed bonded ATM cell. An AVAIL block 2350 can include a logic needed to ascertain whether a cell is available for transmission.

Referring to FIGS. 24–28, block diagrams of circuitry in an FPGA 2400, 2500, 2600, 2700 and 2800 is depicted. These diagrams contain circuitry associated with the microprocessor interface and other functions that are unrelated to the bonding engine.

Figure 34:
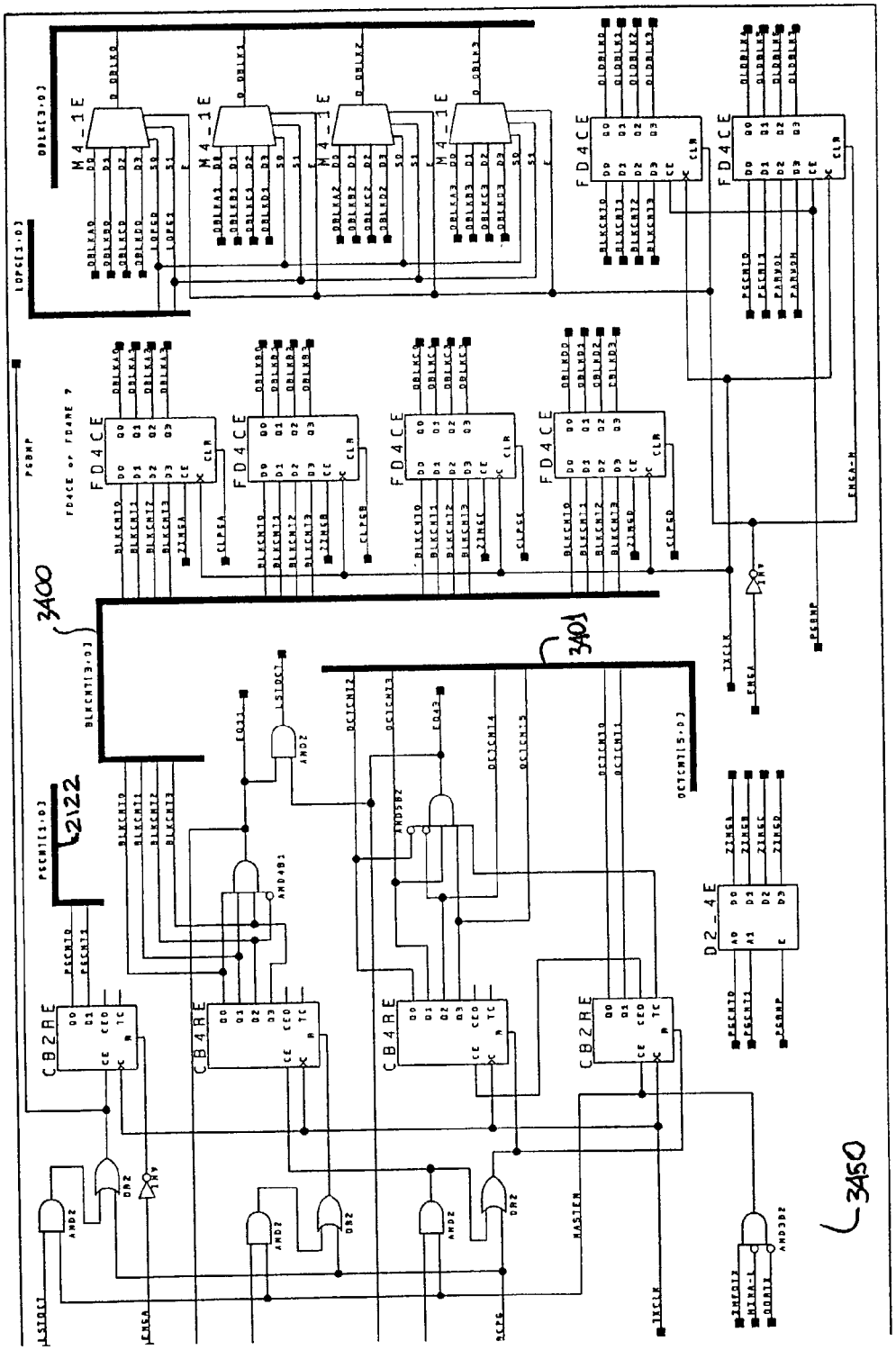
FIGS. 34–36 illustrate block diagrams of an HSWRITE organization, representing an embodiment of the invention.
Figure 35:
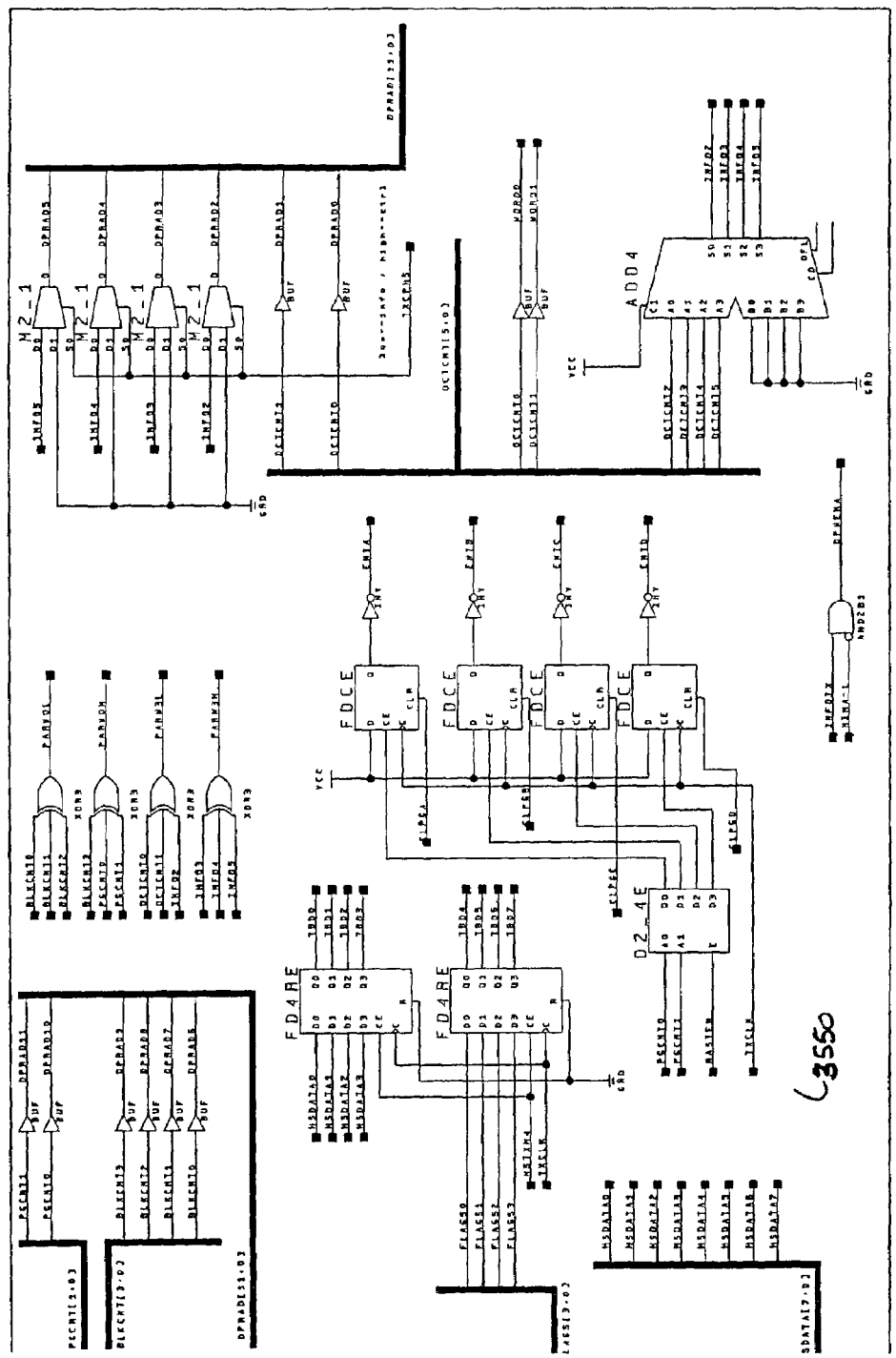
Figure 36:
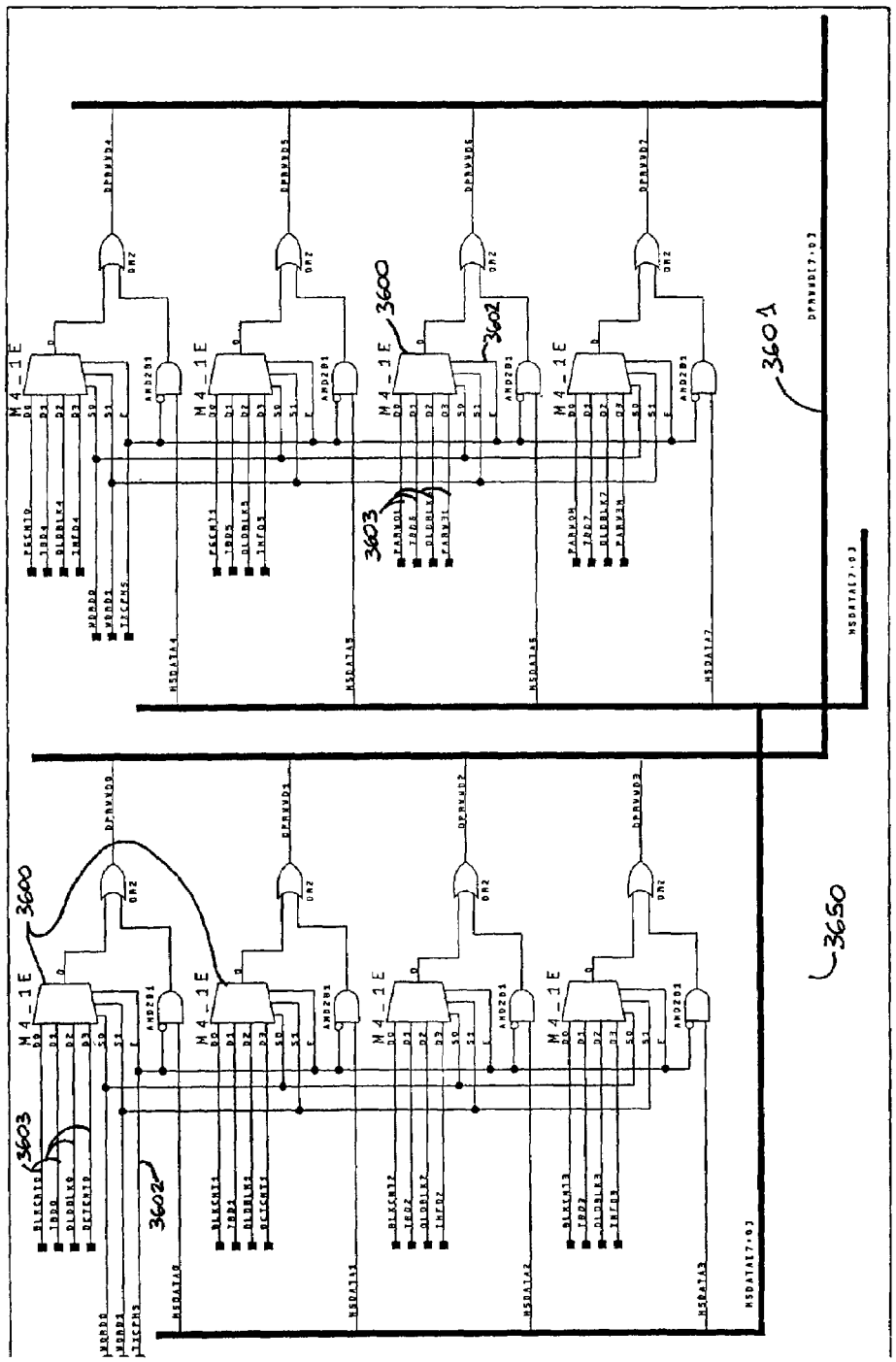

Referring to FIGS. 34–36, block diagrams of an HSWRITE organization 3450, 3550, and 3650 are depicted. Referring to FIGS. 21 and 34–36, the HSWRITE block 2120 can convert a regular ATM (48-octet PDU) cell to a bonded ATM (44-octet PDU) cell. This action can be achieved by suitably generating the address and write signals to the dual-port RAM 2130. The HSWRITE block 2120 can operate when a HINA-L signal 2121 is asserted, i.e., when the utopia interface determines that an input cell regular ATM is being received by the bonding engine.

Still referring to FIGS. 21 and 34–36, a memory is organized as 4 pages and these can be referred to as A, B, C, and D, with two-bit identifiers 00, 01, 10, and 11, respectively. The particular page that is being written into is identified by a PGCNT[1:0] signal 2122 (a two-bit signal) and is provided by the HSWRITE block 2120 as an output. Likewise, the particular page that is being read out of by an LSREAD block 2150 can be identified by a LOPG[1:0] signal 2125 and can provided as an input to the HSWRITE block 2120.

Still referring to FIGS. 21 and 34–36, the HSWRITE block 2120 can include a counter chain comprising a modulo-44 stage (for octets) OCTCNT[5:0] signal 3401 signal, a modulo-12 stage (for blocks) BLKCNT[3:0] signal 3400, and a modulo-2 stage (for pages) PGCNT[1:0] signal 2122. The counter chain may operate when it is enabled (the HINA-L signal 2121 is asserted), and the HIN53 block 2100 indicates that the ATM-cell-PDU is being received over the utopia bus (via the HTXINFO signal 2101). For robustness, the counter chain can be disabled if the HIN53 block 2100 determines that valid octets are not being received from the utopia bus (via the HTXOOR signal 2102). The dual-port RAM address into which a particular information octet is written can be developed from these three counters. Since the dual-port RAM block 2130 can be organized in terms of bonded-ATM cells, and the first 4 octets are control octets, the dual-port RAM address for an information octet involves adding 4 to the value of the OCTCNT[5:0] signal 3401. The dual-port RAM address for an information octet can be viewed as the concatenation of signals:

DPRAD[11:0]=PGCNT[1:0];BLKCNT[3:0];(OCTCNT [5:0]+4)

And, for reference, the addresses for 4 control octets associated with a bonded-ATM cell can be viewed as:

DPRAD[11:0]=PGCNT[1:0];BLKCNT[3:0];[0 0 0 $b_1$ $b_0$]

where ($b_1$ $b_0$) can be either (1 1) or (1 0) or (0 1) or (0 0) depending on which of the 4 control octets is being written into memory.

Still referring to FIGS. 21 and 34–36, within every block, up to 44 information octets can be written at a time, sequentially, at a rate determined by the TXCLK signal 2010. Associated with these 44 octets (or less, in the case of a partial bonded ATM cell), can be 4 control octets that may be written as well. The octet rate is can be determined by the TXCLK signal 2010. One approach to handling the 4 control octets is to add 4 cycles for each bonded ATM cell. The logic for this approach can be complex, considering that the information octets from a single regular ATM cell is written into two bonded ATM cells. Another approach can include utilizing the TX2CK signal 2011 depicted in FIG. 20, which is twice the rate of the TXCLK signal 2010, to control the write operation into the dual-port RAM block 2130. That is, each cycle of the TXCLK signal 2010 can be considered as two phases: an information octet is written during the second phase and a control octet in the first phase.

Figure 14:
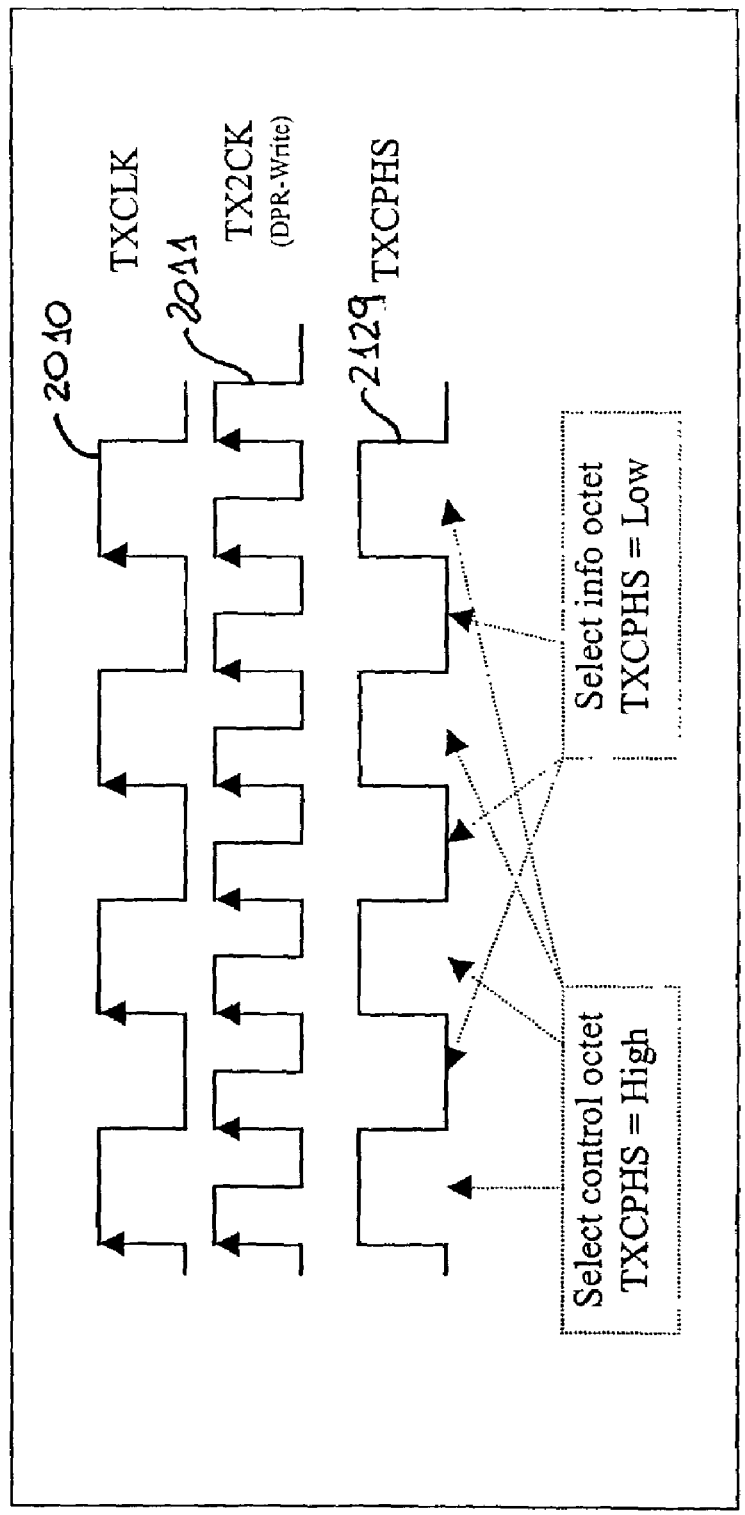
FIG. 14 illustrates a block diagram of a DPR write operation (select control/information), representing an embodiment of the invention.

Referring to FIG. 14, a block diagram of a DPR write operation (select control/information) is depicted. The dual-port RAM chosen can be edge-triggered, and the TX2CK 2011 (twice the rate of the TXCLK signal 2010) can be used as a dual-port RAM write clock. An information octet can be written during the second phase of a TXCPHS signal 2129, and a control octet can be written in the first phase of the TXCPHS signal 2129.

A method for generating a dual-port RAM address for control and information octets is described next. For both phases, the upper address bits are composed of the page-count PGCNT[1:0] signal 2122, and the block-count BLKCNT[3:0] signal 3400. The distinction arises in that the lower significance address bits that are derived from the octet-count OCTCNT[5:0] signal 3401. An octet count can be represented by: [$O_5$ $O_4$ $O_3$ $O_2$ $O_1$ $O_0$].

Figure 15:
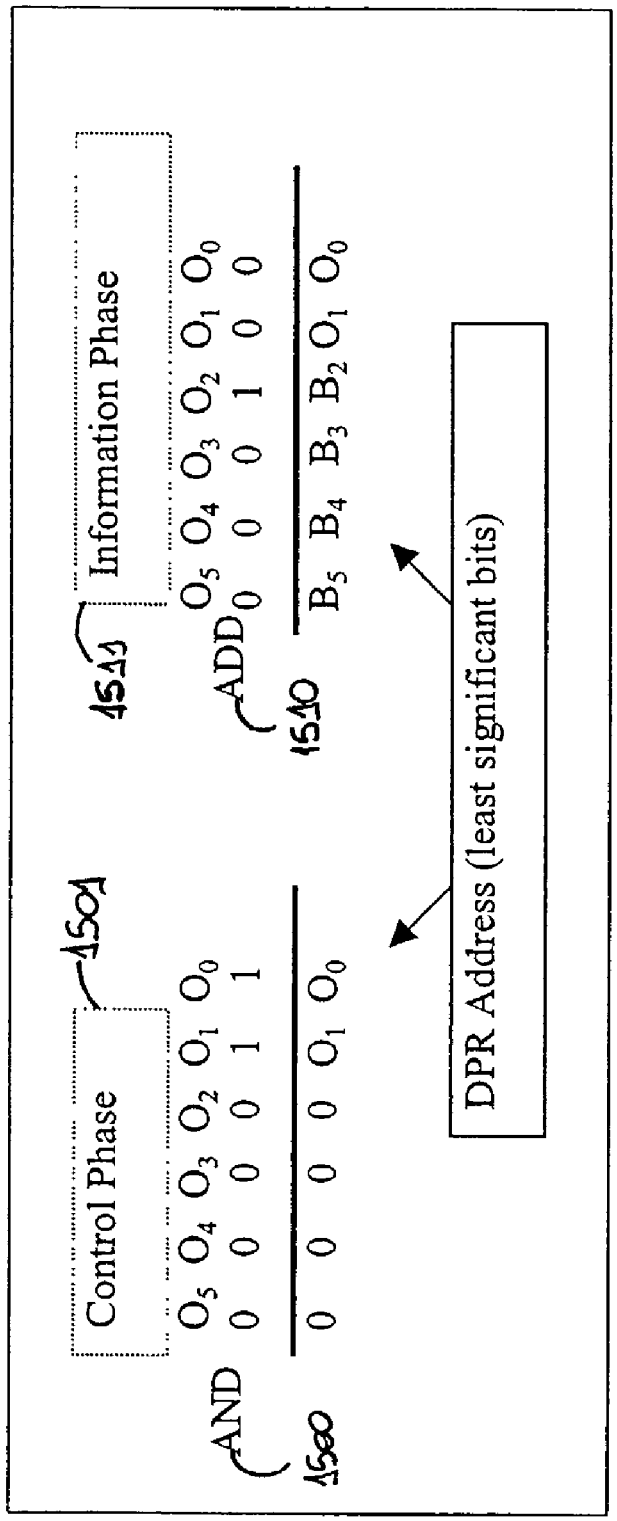
FIG. 15 illustrates a block diagram of an address generation (lsb) for control/information phases, representing an embodiment of the invention.

Referring to FIG. 15, a block diagram of an address generation (lsb) for control/information phases is depicted. The least significant bits of the dual-port RAM address can be obtained via an AND operation 1500 for a control octet phase 1501, and via an ADD operation 1510 for an information octet phase 1511. For the control octet phase 1501, only the two least significant bits of the octet-count are used and the remaining 4 bits set to 0. For the information phase 1511, a 4 is added to the octet-count. A control octet location is accessed (written into) as many as 11 times for a bonded ATM cell, whereas an information octet location is accessed at most once (for each cell that is written into dual-port RAM). This over-writing is not a problem since the control octet location contents can reflect the values of the control octets corresponding to the last 4 information octets written into the bonded ATM cell and these are indeed the correct values for the control octets.

Referring to FIGS. 21 and 23, to avoid address contention, the LSREAD block 2150 and the HSWRITE block 2120 can operate in different regions (pages) of memory. The HSWRITE block 2120 operation is sequential. Incoming regular ATM cells can be written into page A. When page A is full, regular ATM cells can be written into page B, and so on, in a continual rotation (page A after page D). The LSREAD block 2150 does not start accessing a page until it is declared full. If a page contains 12 bonded ATM cells (528 information octets, equivalent to 11 regular ATM cells), after 528 information octets are written into the page, the page is full and the HSWRITE block 2120 moves on to the next page. If there is a lull in the incoming high-speed cell stream, a page may not have 528 valid information octets, but in order for the LSREAD block 2150 to be allowed to extract these (<12) Bonded-ATM cells, the page may also be declared full. In the latter case, the last bonded-ATM cell will be a partial cell. An input FRCHPG signal 2123 is a signal that can force the HSWRITE block 2120 to declare the current page as full and proceed to the next. An output PGBMP signal 2124 can signal the AVAIL block 2350 depicted in FIG. 23 when the HSWRITE block 2120 autonomously moves from one page to the next.

Still referring to FIGS. 21 and 23, when the HSWRITE block 2120 has written information octets into a page, it can be deemed no longer empty. The empty statuses of the four pages are held as signals (and provided to the AVAIL block 2350) as an HIEMTx signal 2351 (wherein "x" can be A/B/C/D, representing each page). When the LSREAD block 2150 has read out all the (valid) information octets from a page, a CLLPGx signal 2352 can be generated, wherein "x" can be A/B/C/D, representing each page, to force the status of that page to empty. The HSWRITE block 2120 can maintains a record of the number of blocks (bonded ATM cells) written into each page. An input LOPG [1:0] signal 2125 can identify the page that the LSREAD block 2150 is reading out of, and the HSWRITE block 2120 can provide an LOBLK[3:0] signal 2126, which represents the number of valid blocks in that page (which may be 12 for truly full, 0 for empty, and between 0 and 11 for pages that are forced full). The LSREAD block 2150 can use this information to decide how many valid bonded-ATM cells there are in the page it is reading out of. The input HTXH4 signal 2103 can indicate when the header octet H4 is present on the utopia bus, and may be necessary to extract the PTI/CLP information (4 bits) that can be transmitted in a control octet 1.

Referring to FIGS. 21 and 36, a plurality of muxing blocks 3600 select the appropriate octet for providing the dual-port RAM 2130 with the appropriate data as a DPRWWD[7:0] signal 3601. The TXCPHS signal 2129 can select between control an information; the plurality of muxing blocks 3600 (4:1 multiplexer units M4_1E) can be Xilinx macros that perform a selection to enable (active output) or disable (output=0) via an E control input 3602. A Dx input 3603 can be used for a control octet x, wherein x=0, 1, 2 and 3.

Figure 37:
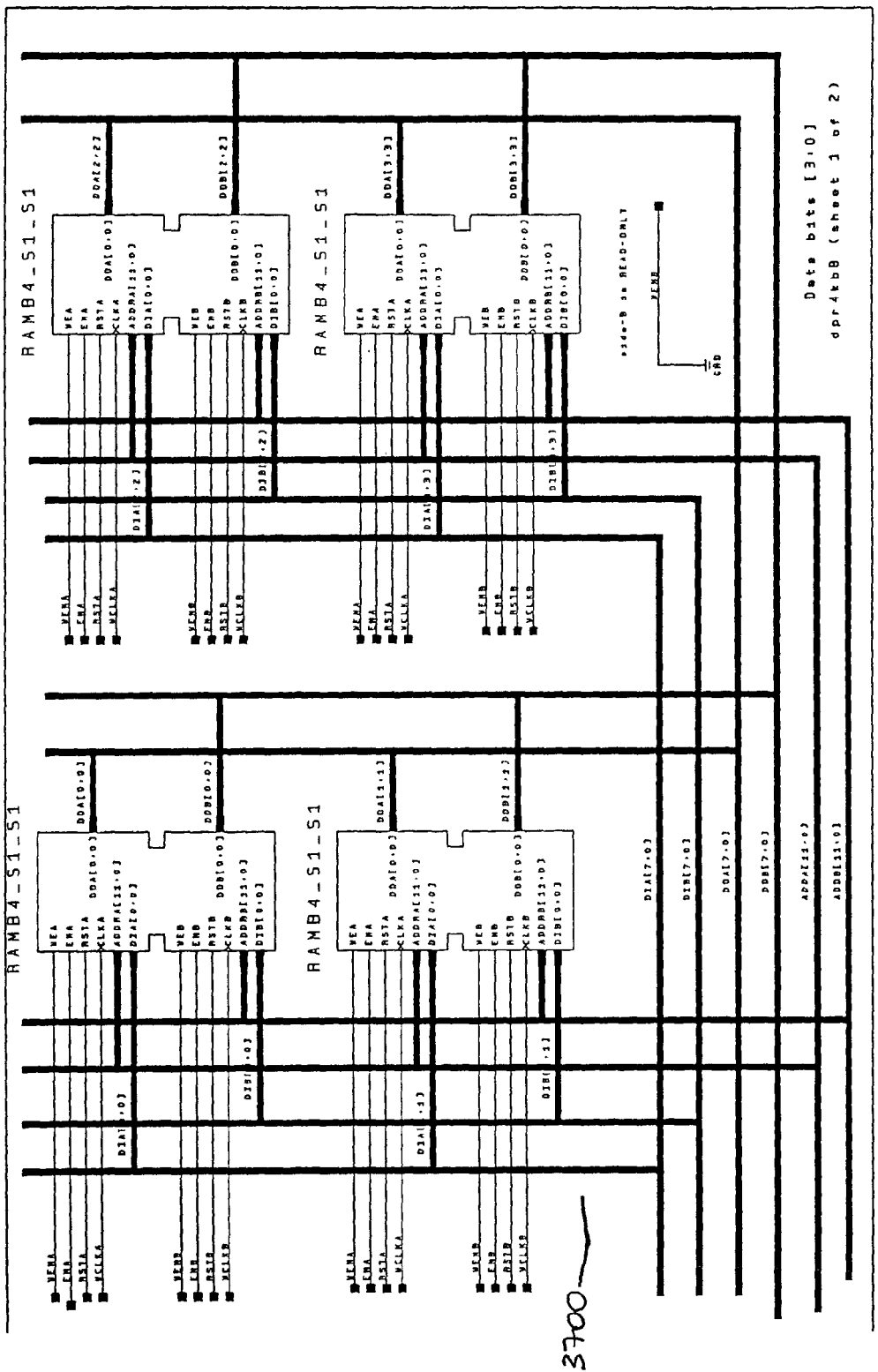
FIGS. 37 and 38 illustrate block diagrams of a dpr4kb8 (dual-port RAM) element, representing an embodiment of the invention.
Figure 38:
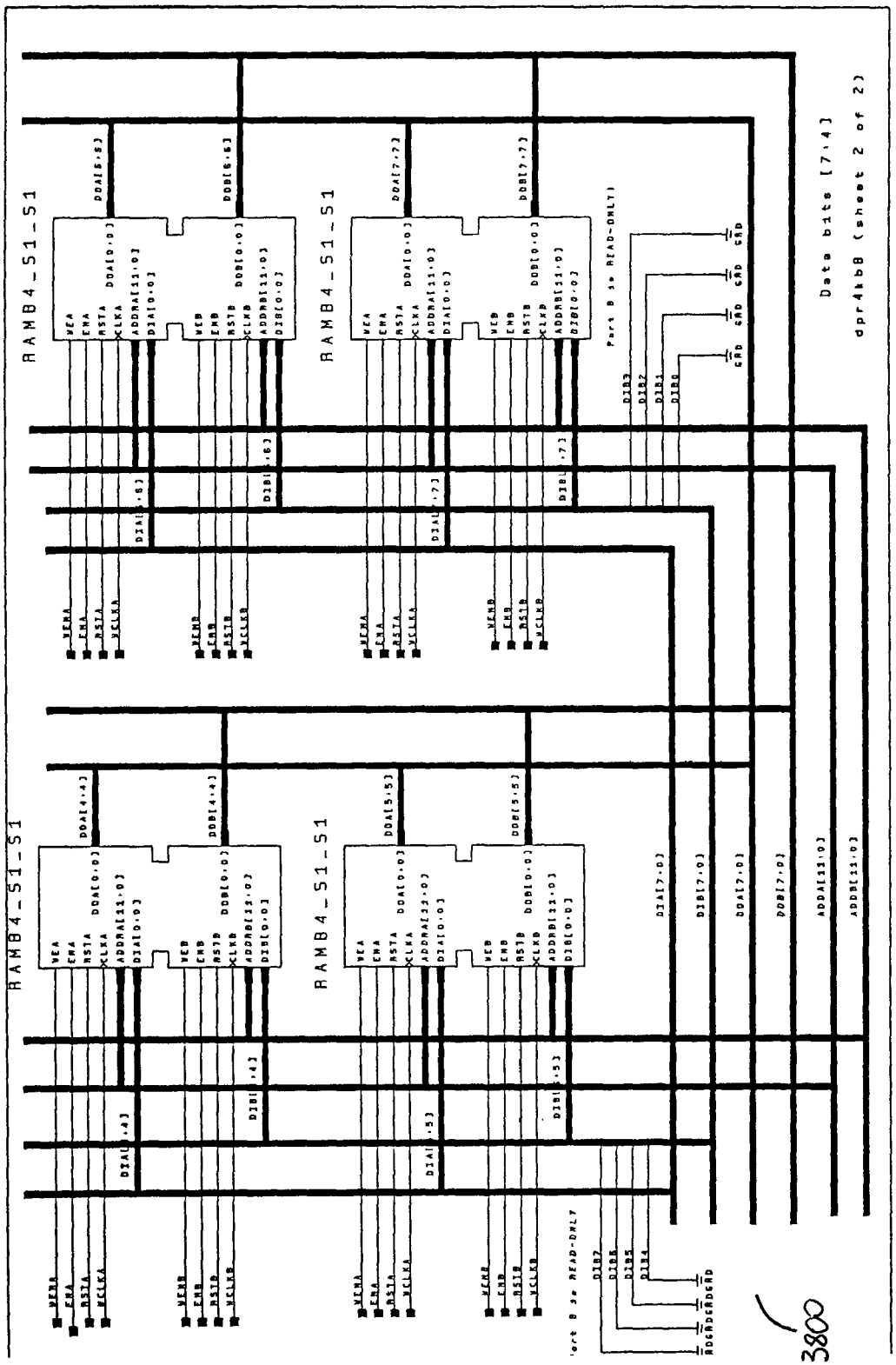

Referring to FIGS. 37 and 38, block diagrams of a dpr4kb8 (dual-port RAM) block (element) 3700, 3800 are depicted. A block dpr4kb8 appears twice in top-level schematics. In FIG. 21, for the high-speed to low-speed direction, and in FIG. 22, for the low-speed to high-speed direction. It can consist of a 4Kx8 memory array that can be accessed from two independent ports. It can be based on a Xilinx provided macro RAMB4_S1_S1, which is a 4Kx1 DPR cell.

Referring to FIG. 21, the LSREAD block 2150 can read out octets in the dual-port RAM block 2130 written by the HSWRITE block 2120. The structure of the data in the dual-port RAM block 2130 is in 48-octet bonded ATM format. When a cell request arrives from the utopia bus (as indicated by an enable LOUTA-L signal 2152), the LSREAD block 2150 creates the 53 octets that are put onto the utopia receive bus (note that the utopia convention implies that receive be an output of the bonding engine).

Header octets H1, H2 and H3 can be predetermined, since the VPI and the upper bits of the VCI can be prescribed. The 4 most significant bits of the H4 octet can contain the 4 least significant bits of the VCI, and may be of the form 0xxx, wherein the three bits denoted by xxx are provided by the NXTVCI block 2300 of FIG. 23 as an NVCI[2:0] signal 2301. The 4 least significant bits of the H4 octet can be set to 0000. Since the ATM switch does not need to examine a header-check-sum (HEC, or H5 octet), an H5 octet may be arbitrary.

Figure 39:
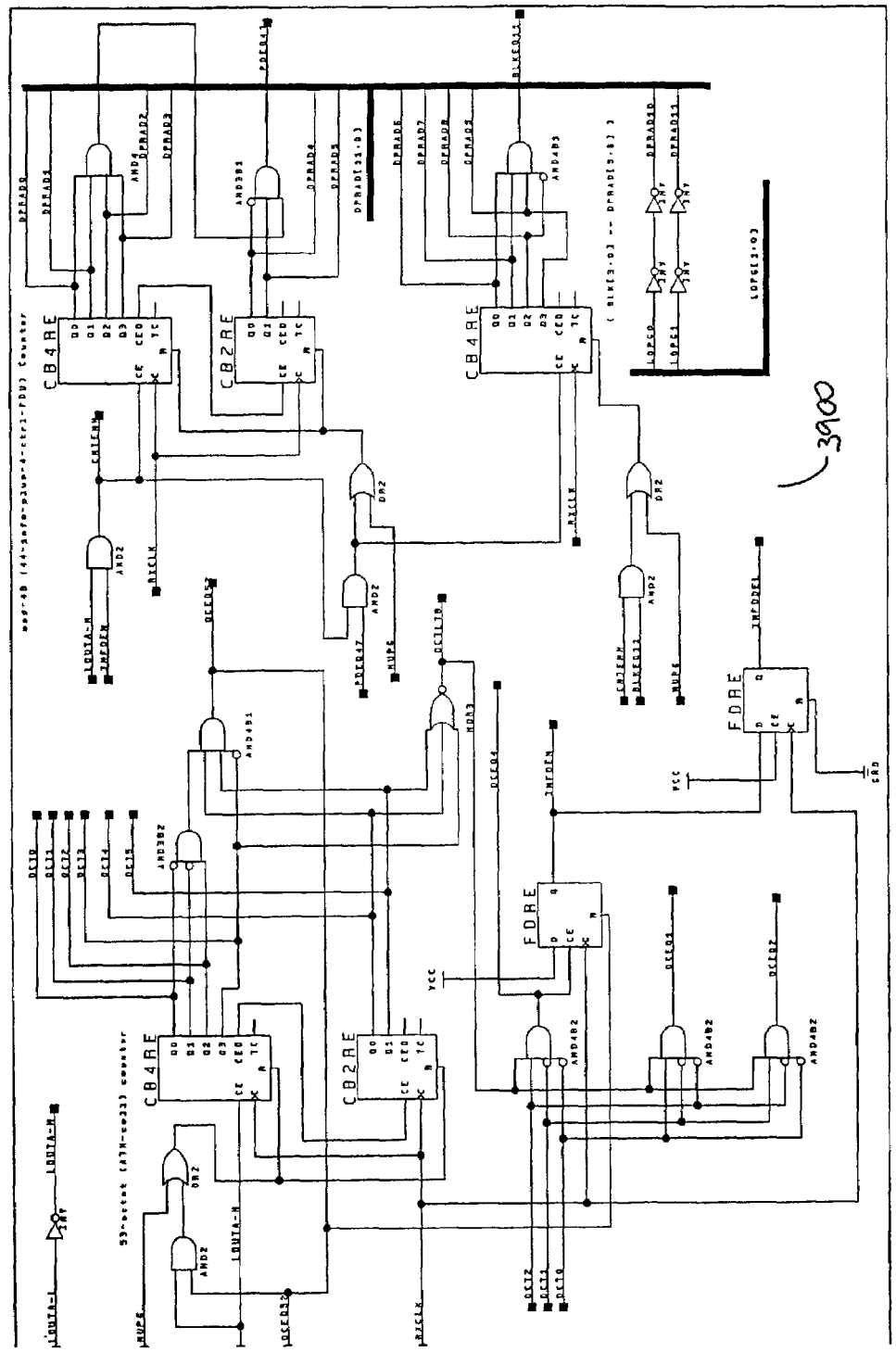
FIGS. 39 and 40 illustrate block diagrams of an LSREAD element, representing an embodiment of the invention.
Figure 40:
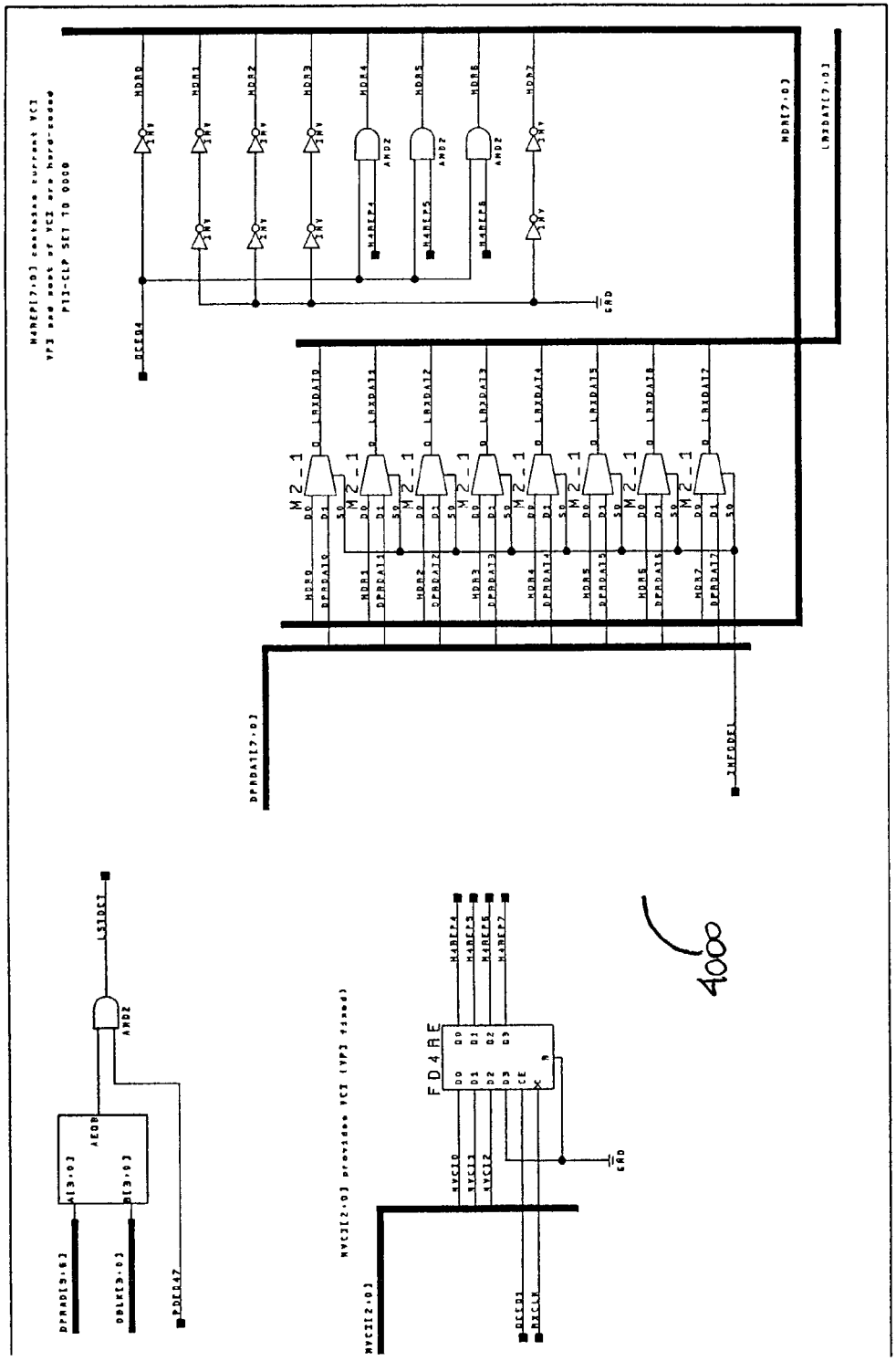

Referring to FIG. 21 and 23, the LSREAD block generates an OCEQ1 signal 2153 that can trigger a search for the next choice for low-speed VCI in the NXTVCI block 2300 of FIG. 23. It can also generates an LLSTOCT signal to indicate that it is reading out the last octet in the page, wherein the identity of the page can be provided by the AVAIL block 2350 as an LOPG[1:0] signal 2353. The number of blocks in the page being read out can be provided by the LOBLK[3:0] signal 2126. Referring to FIGS. 39 and 40, block diagrams of an LSREAD block 3900, 4000 are depicted.

Figure 42:
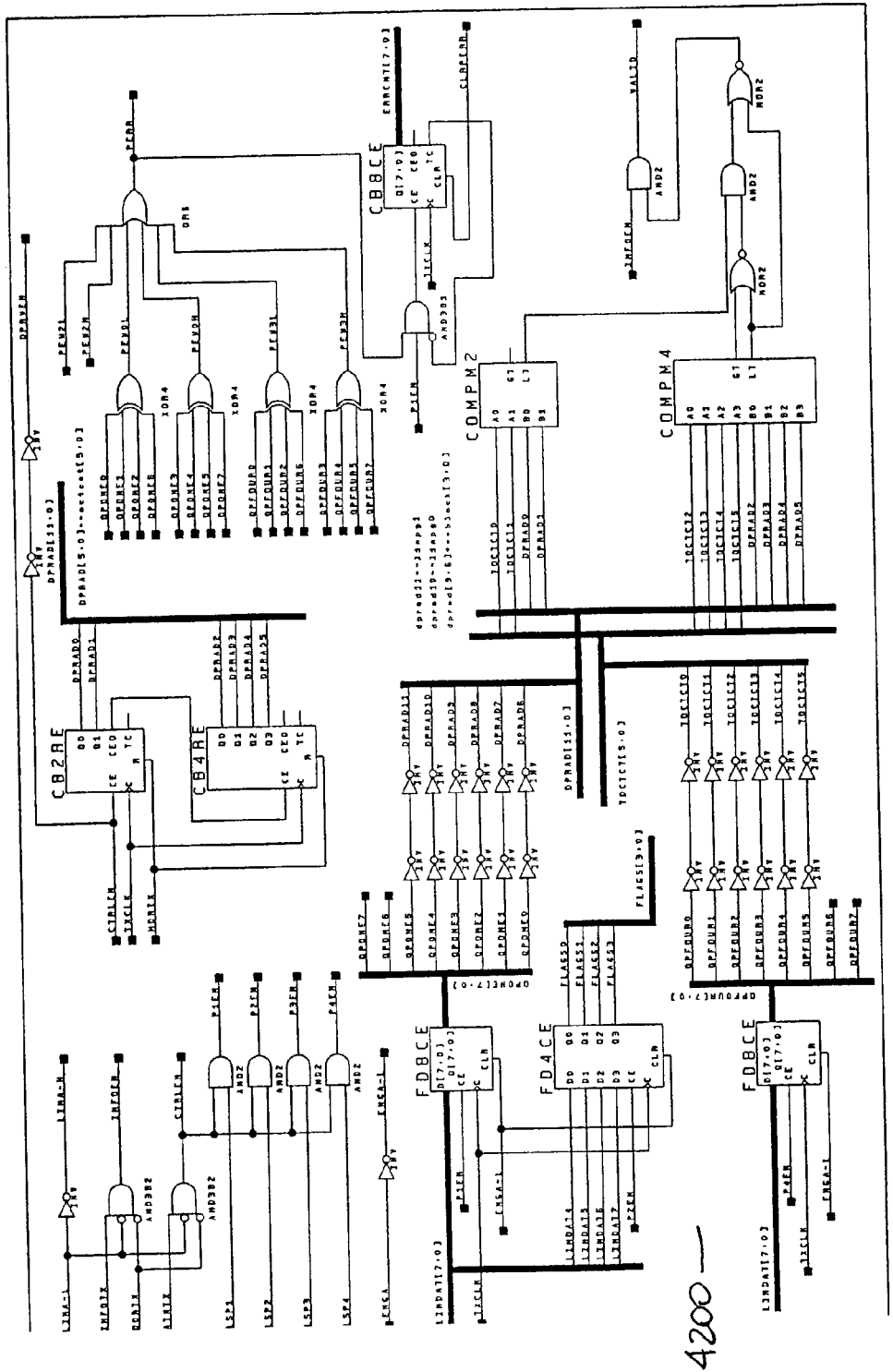
FIGS. 42–46 illustrate block diagrams of an LSWRITE element, representing an embodiment of the invention.
Figure 43:
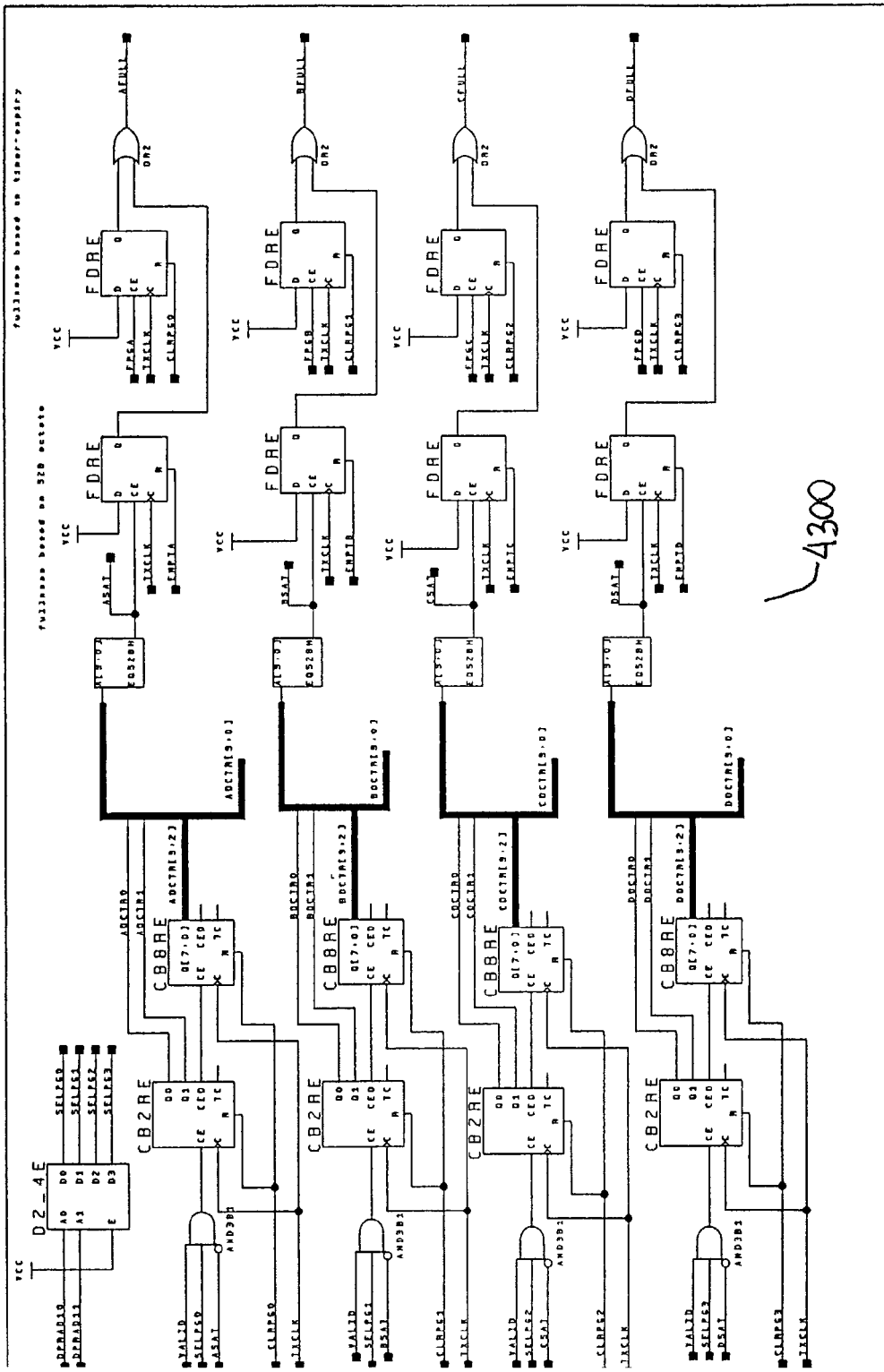
Figure 44:
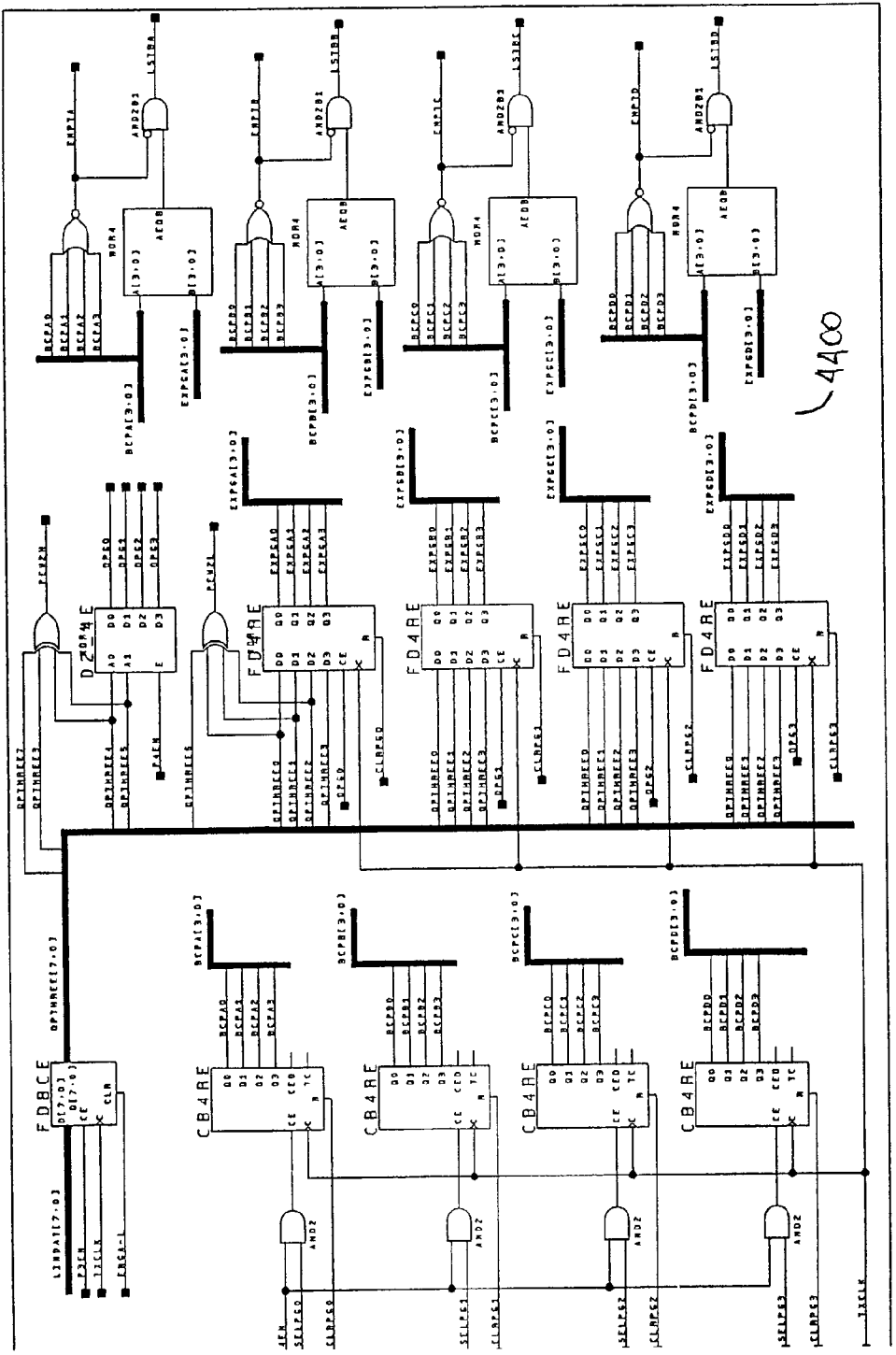
Figure 45:
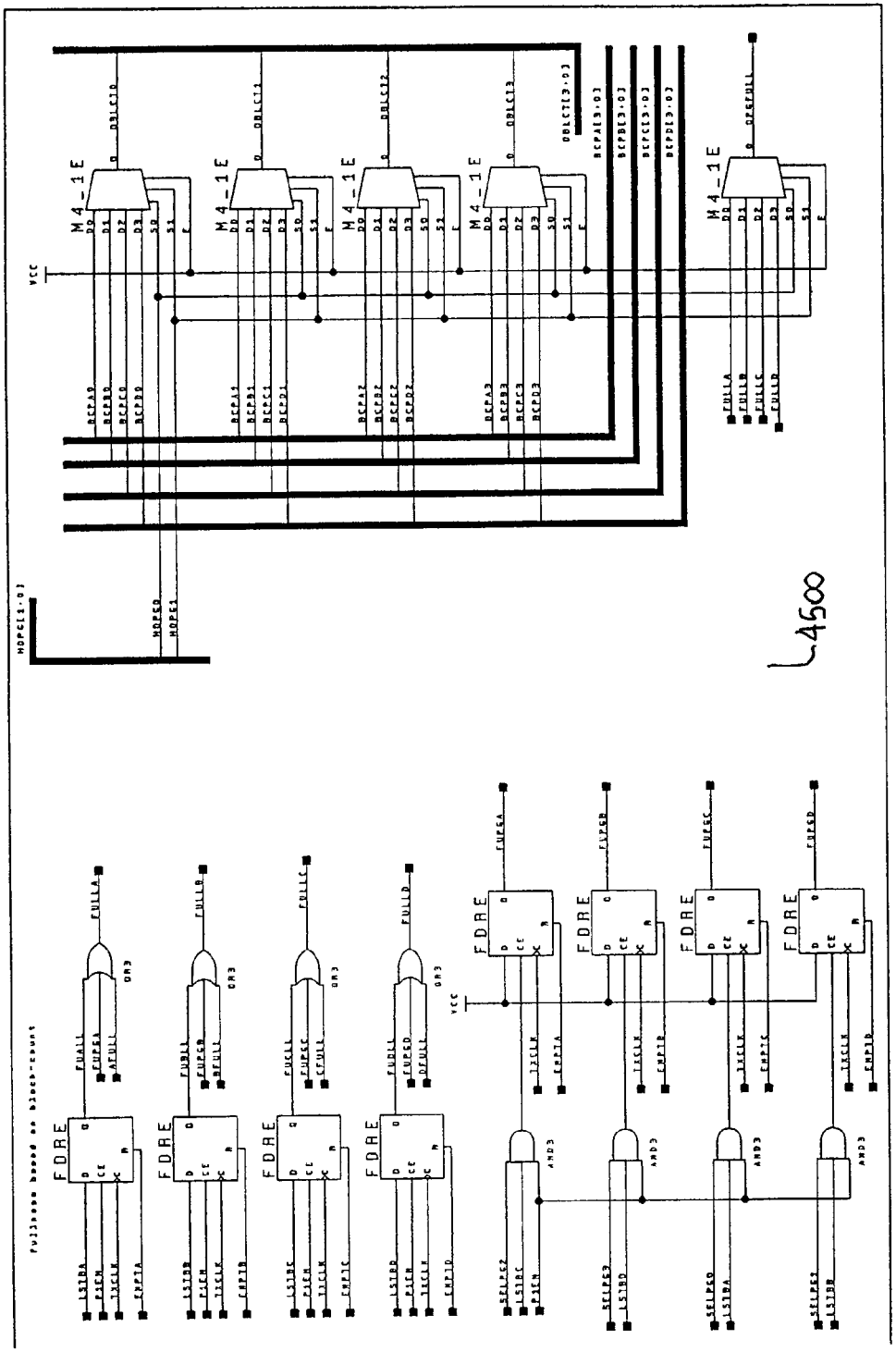
Figure 46:
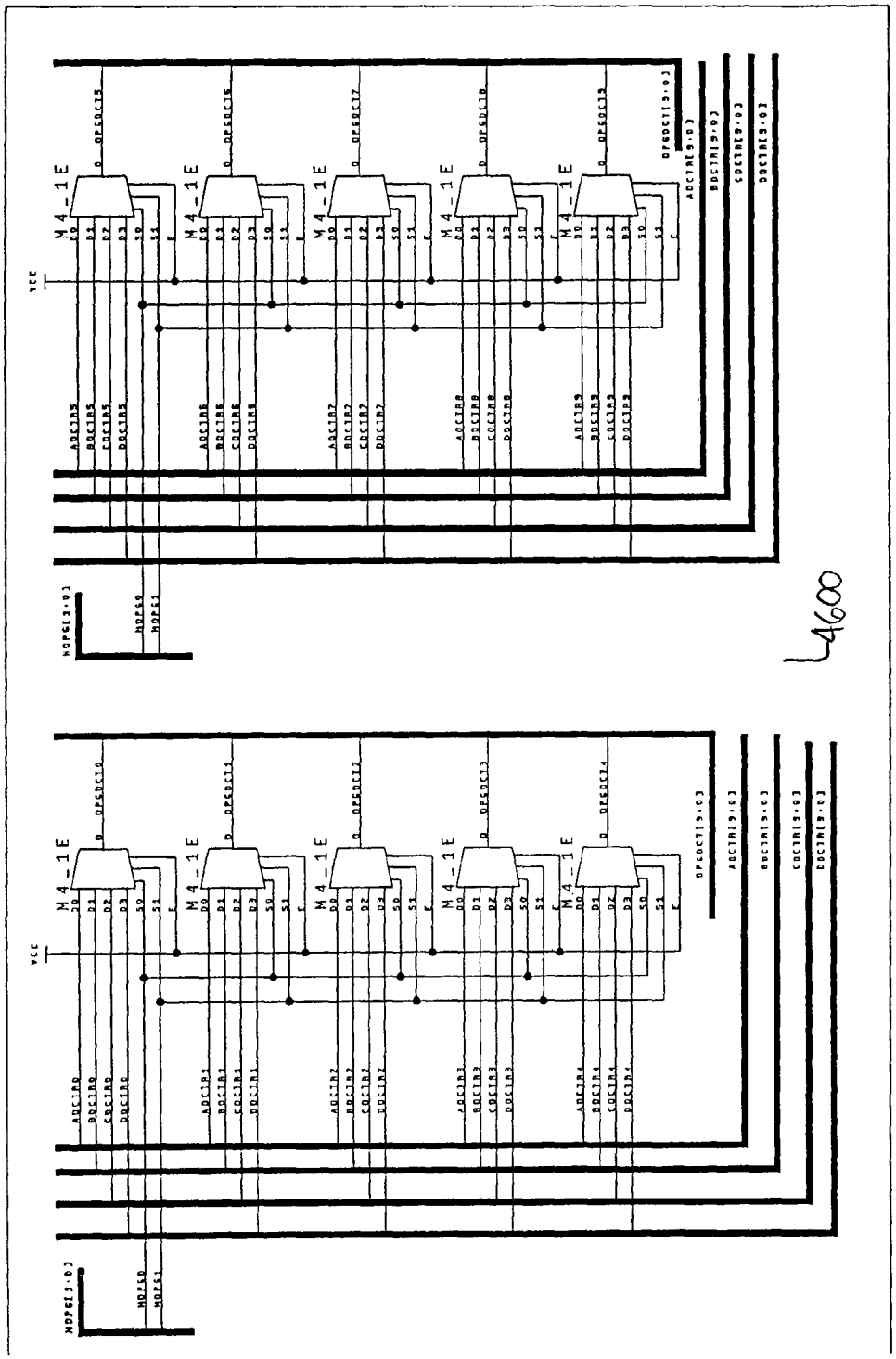

Referring to FIGS. 21 and 22, the LSWRITE block 2220 can accept incoming low-speed cells from the utopia data bus and extract the 4 control octets. These octets may determine the address (page and block) for the 44 (or fewer) information octets in a bonded ATM cell. This circuitry may be intended to recreate in the receiver an image of the memory in the transmitter. The control octets allow the LSWRITE block 2220 to write the information octets into memory in the same locations (address-wise) as used by the HSWRITE block 2120. One distinction, however, is that whereas the HSWRITE 2120 can write octets into memory in a sequential manner, the LSWRITE block 2220 operations may not be sequential, the order determined by the arrival of low-speed cells and the accompanying control octets. Numerous status conditions can be generated and control signals accepted to ensure the proper execution of a combination operation and the logical handling of exception conditions. Referring to FIGS. 42–43, block diagrams of an LSWRITE block 4200, 4300 are depicted.

Referring to FIG. 22, the control signals from the LIN53 block 2200 including: LTXHDR 2202, LTXATM 2203, LTXINFO 2204, LTXOOR 2205, LTXP1 2206, LTXP2 2207, LTXP3 2208, LTXP4 2209, and LTXH4 2210, can inform the LSWRITE block 2220 of the identity of the octet on the internal utopia data bus via a TXDATA[7:0] signal 2211. The LTXH4 signal 2210 can identify the header octet H4. The LTXP1 through LTXP4 signals 2206–2209 can identify 4 control octets. The LTXHDR signal 2202 can signify the presence on the bus of a header octet. The LTXATM signal 2203 signifies an ATM octet, of which there are 48. The LTXINFO signal 2204 can signify the 44 information octets within the bonded ATM cell. The LTXOOR signal 2205 can be a check signal similar to that provided by the HIN53 block 2100 of FIG. 21. For simplicity, the LSWRITE block 2220 may write all 48 octets (4 control and 44 information octets) into the dual-port RAM block 2230, but an HSREAD block 2250 may read out the information octets and use control octet 1 (PTI-CLP) in the generation of the H4 octet and control octet 3 (last valid address) to check if the last valid octet has been accessed.

Still referring to FIG. 22, while the LSWRITE block 2220 writes octets into the dual-port RAM 2230, the HSREAD block 2250 reads these out. The reading and writing can be in different pages to avoid address contention. The current output page is identified to the LSWRITE block 2220 via a HOPG[1:0] signal 2251, and the LSWRITE block 2220 can provides an OPGFULL signal 2221 (the HSREAD block 2250 may not start reading out until a page is full). Since the control octets within a Bonded-ATM cell provide the page and block where the 44 (or fewer) information octets must be written, they also indicate the number of full blocks in a previous page. Thus, the LSWRITE block 2220 can determine whether a page is full, i.e., completely resurrected to match what was transmitted out by a distant (remote) HSREAD block). For each page the LSWRITE block 2220 can maintain a counter reflecting the number of octets or valid octets written so far, the expected number of blocks that have valid information octets, and an indication of whether the page is full or empty. A second criterion for declaring a page full, for example, page A, which is not empty, is if page B is not empty and a bonded ATM cell is received that must be written into page C. That is, the pages are treated as a circular arrangement and waiting for a cell destined for the opposite page before declaring the page in question full allows for a differential cell transmission delay across the ATM network that is of the order of half the size of the buffer, 2 pages (24 cells) in a 4-page design.

Still referring to FIG. 22, when the HSREAD block 2250 is reading out from a page identified by the HOPG[1:0] signal 2251, the LSWRITE block 2220 can provide a HOBLK[3:0] signal 2222 to the HSREAD block 2250 from which it may determine how many valid information octets (i.e., the number of regular ATM cells) it must read out from that page to empty it. The LSWRITE block 2220 receives a signal to clear the page status as a CLHPGx signal 2223 for page x, wherein x can represent pages A, B, C, and D. In the event that a cell is lost in transmission, the LSWRITE block 2220 may be put in the position that it cannot declare a page as full. The AVAIL block 2350 of FIG. 23 can maintain a timer for this situation and provide control KSFPGx signals 2224 to force a full declaration of a page (meta-page) x, wherein x can represent pages A, B, C, or D, as appropriate. The LSWRITE block 2220 can generate LIEMTx signals 2225 that may be asserted when the associated page (x=A, B, C or D) has no valid bonded ATM cells.

Still referring to FIG. 22, the control octets have embedded parity information. When a parity error occurs, an ERRCNT[7:0] counter 2226 is incremented. The count can saturate at a count of 255. The microprocessor can read this error count and clear it if necessary (via a CLRPERR signal 2227).

Still referring to FIG. 22, the HSREAD block 2250 is the module that reads cells out of the dual-port RAM 2230 in the low-speed-to-high-speed direction. It is the companion to the LSWRITE block 2220 in the same way that the LSREAD block 2150 of FIG. 21 is companion to the HSWRITE block 2120. While the LSWRITE block 2220 writes bonded ATM cells (modulo-44 information), when the HSREAD block 2250 reads from dual-port RAM 2230 it reads out cells modulo-48 (information) in the regular ATM fashion. The reading out can be performed in a sequential manner. The HSREAD block 2250 can append the header octets (H1, H2, H3, H4 and H5) for transmission over the utopia bus. The CRC-check octet (H5) may be moot since the ATM switch may ignore the significance of this octet. The H1, H2, H3, and the 4 most significant bits of H4 can be predetermined. The 4 least significant bits of H4 can be obtained from control octet 1 (PTI-CLP indicator). The HSREAD block 2250 can use control octet 3 as a means to verify the last octet in an incomplete cell.

Figure 47:
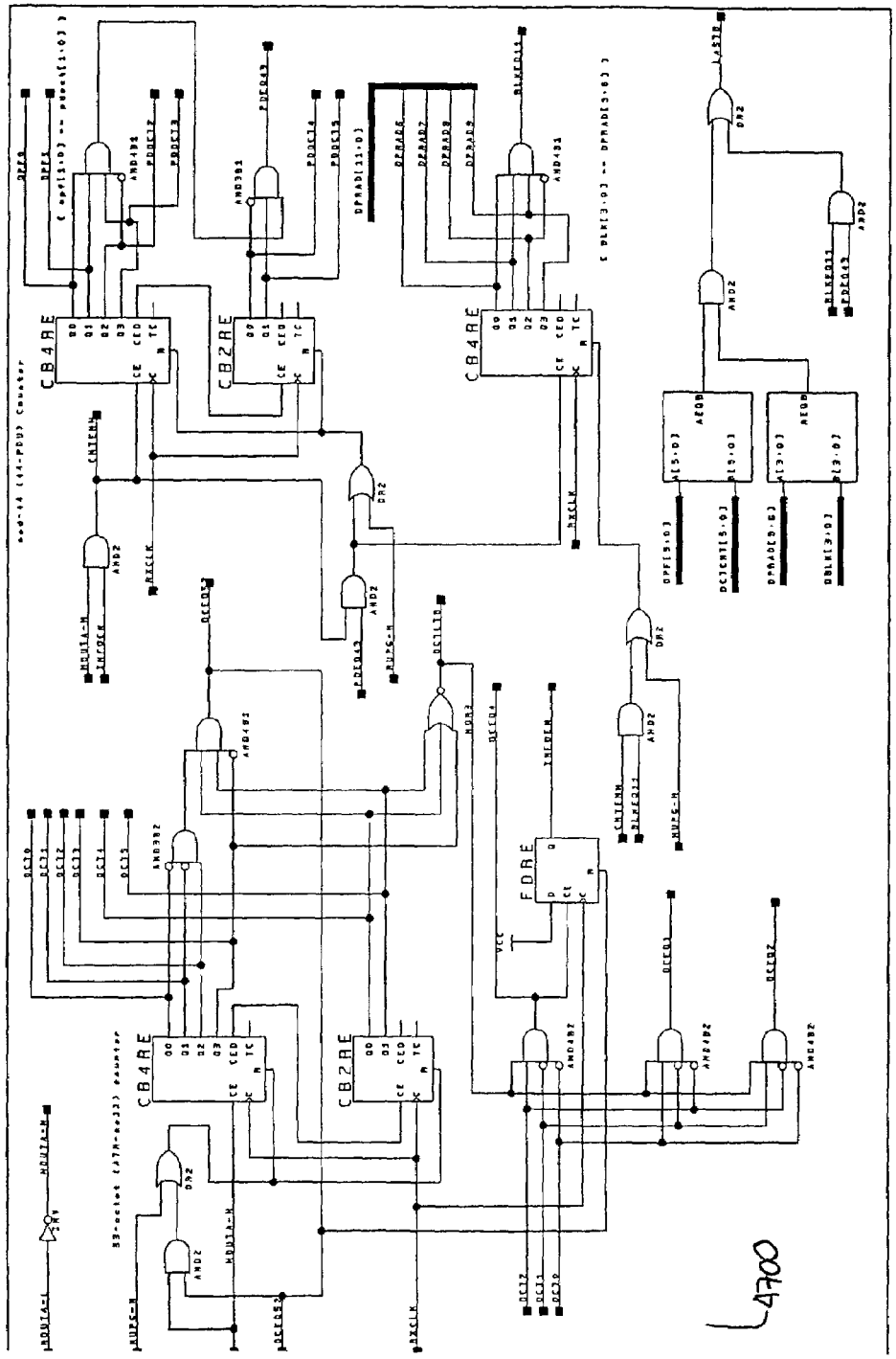
FIGS. 47 and 48 illustrate block diagrams of an HSREAD element, representing an embodiment of the invention.
Figure 48:
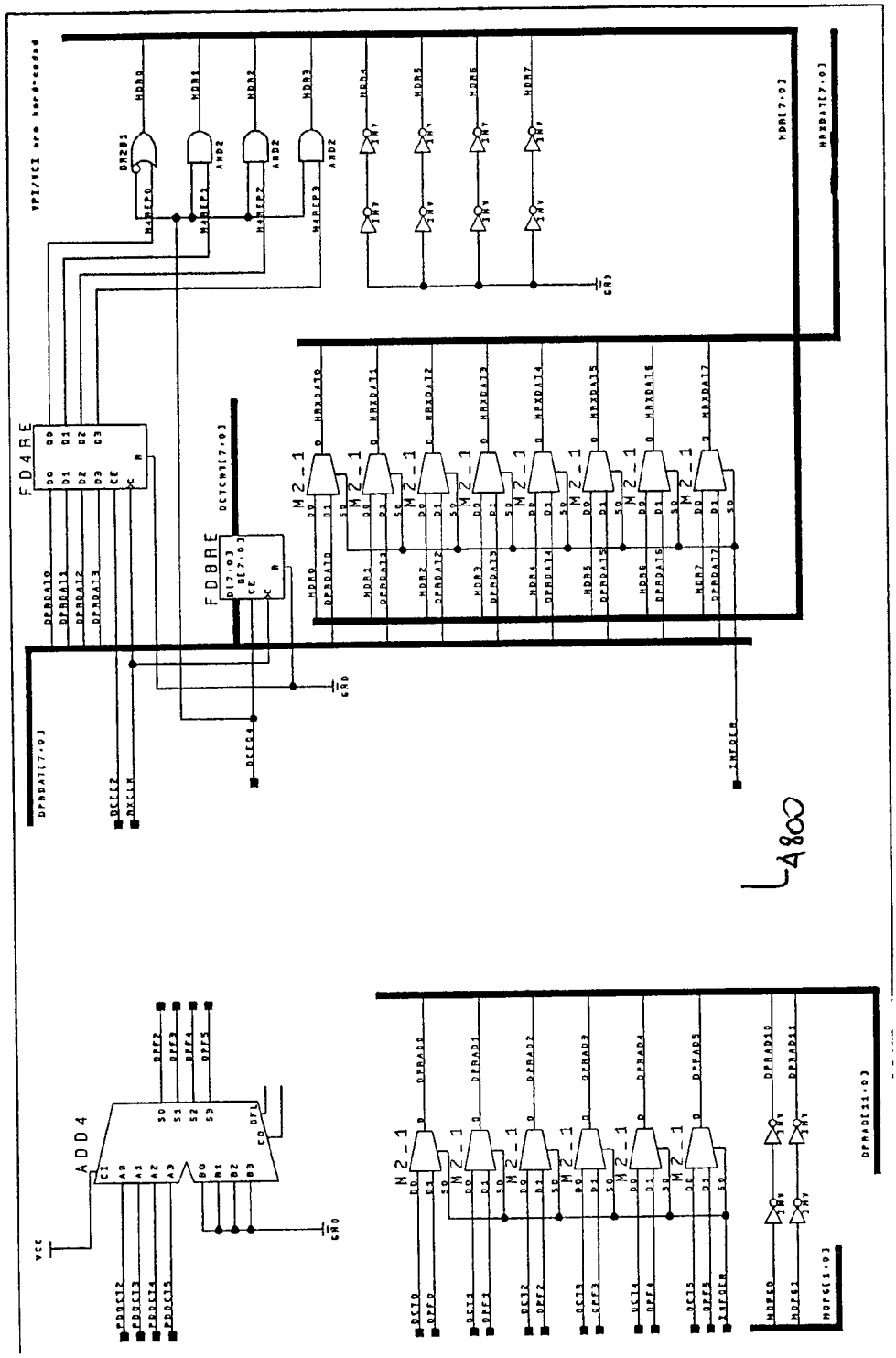
Figure 49:
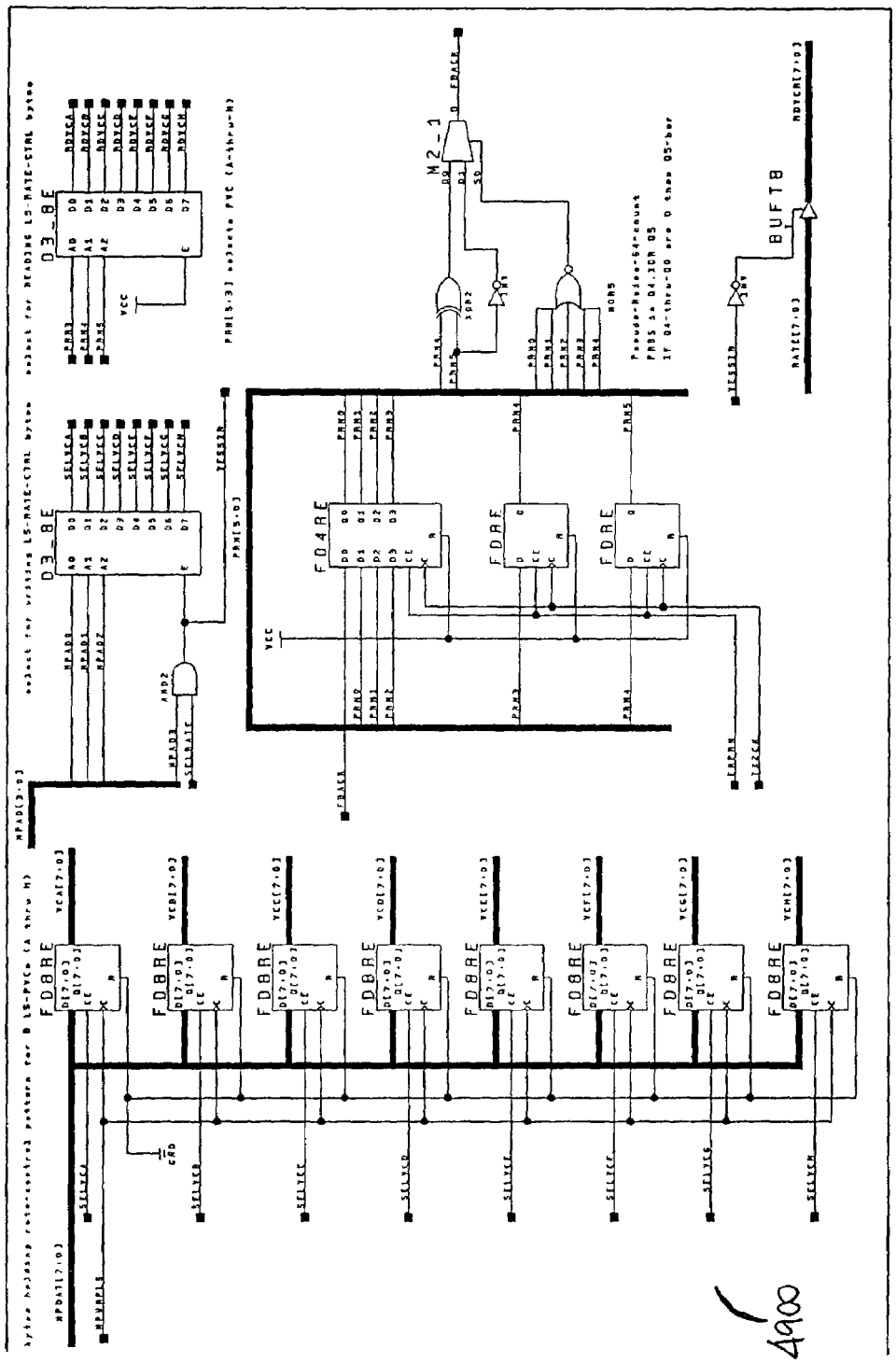
FIGS. 49–52 illustrate block diagrams of a NXTVCI element, representing an embodiment of the invention.
Figure 50:
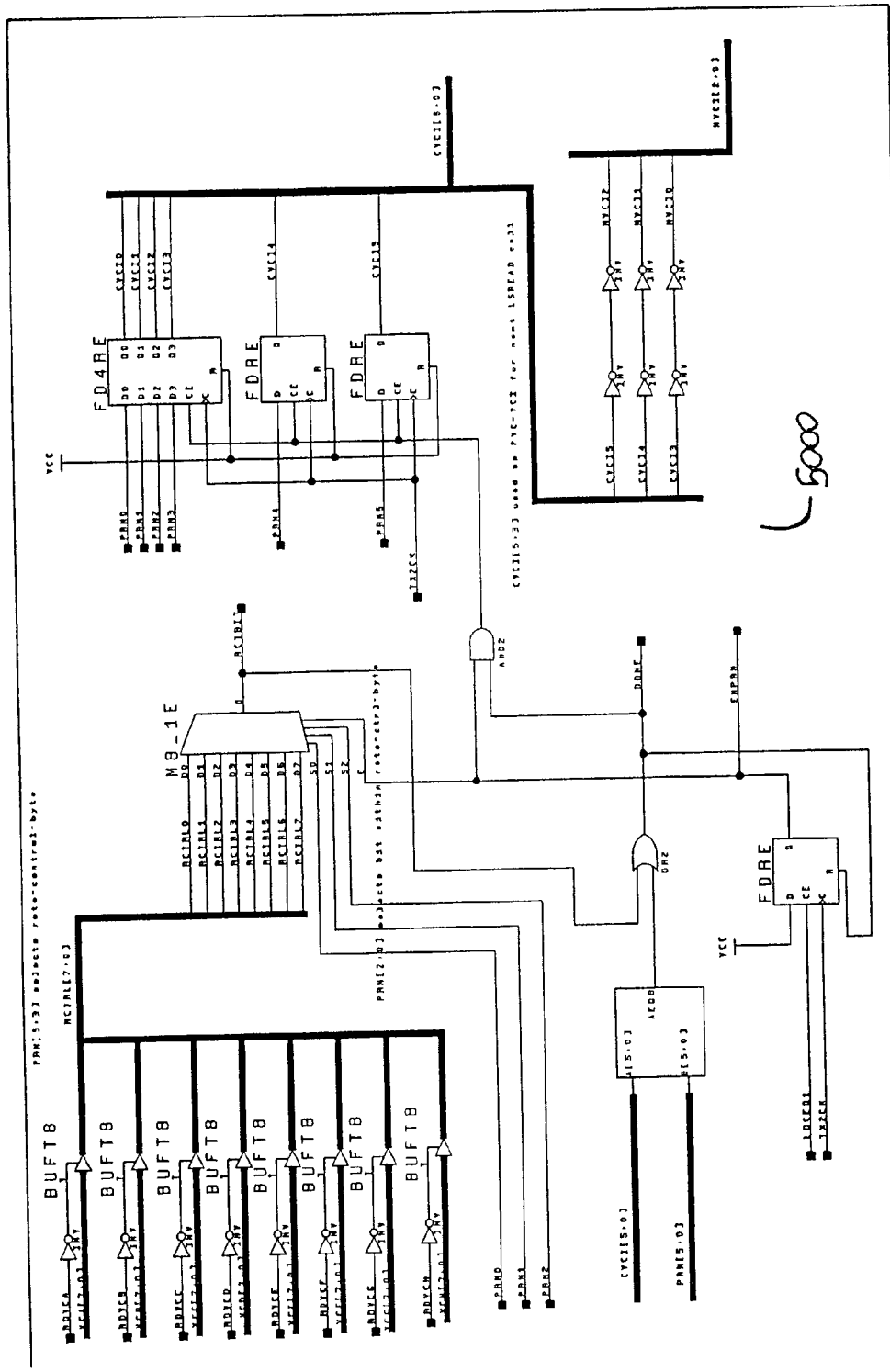
Figure 51:
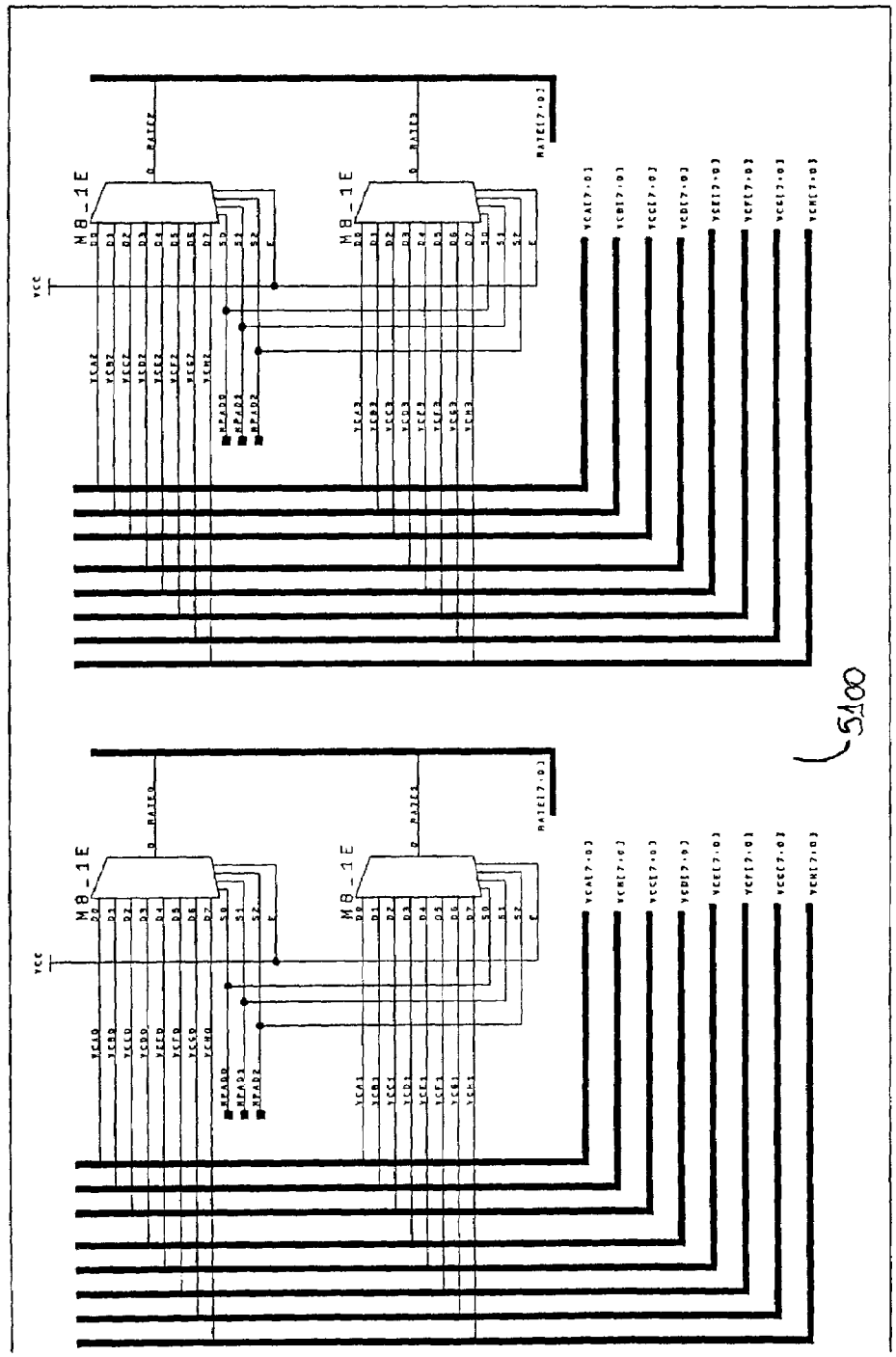
Figure 52:
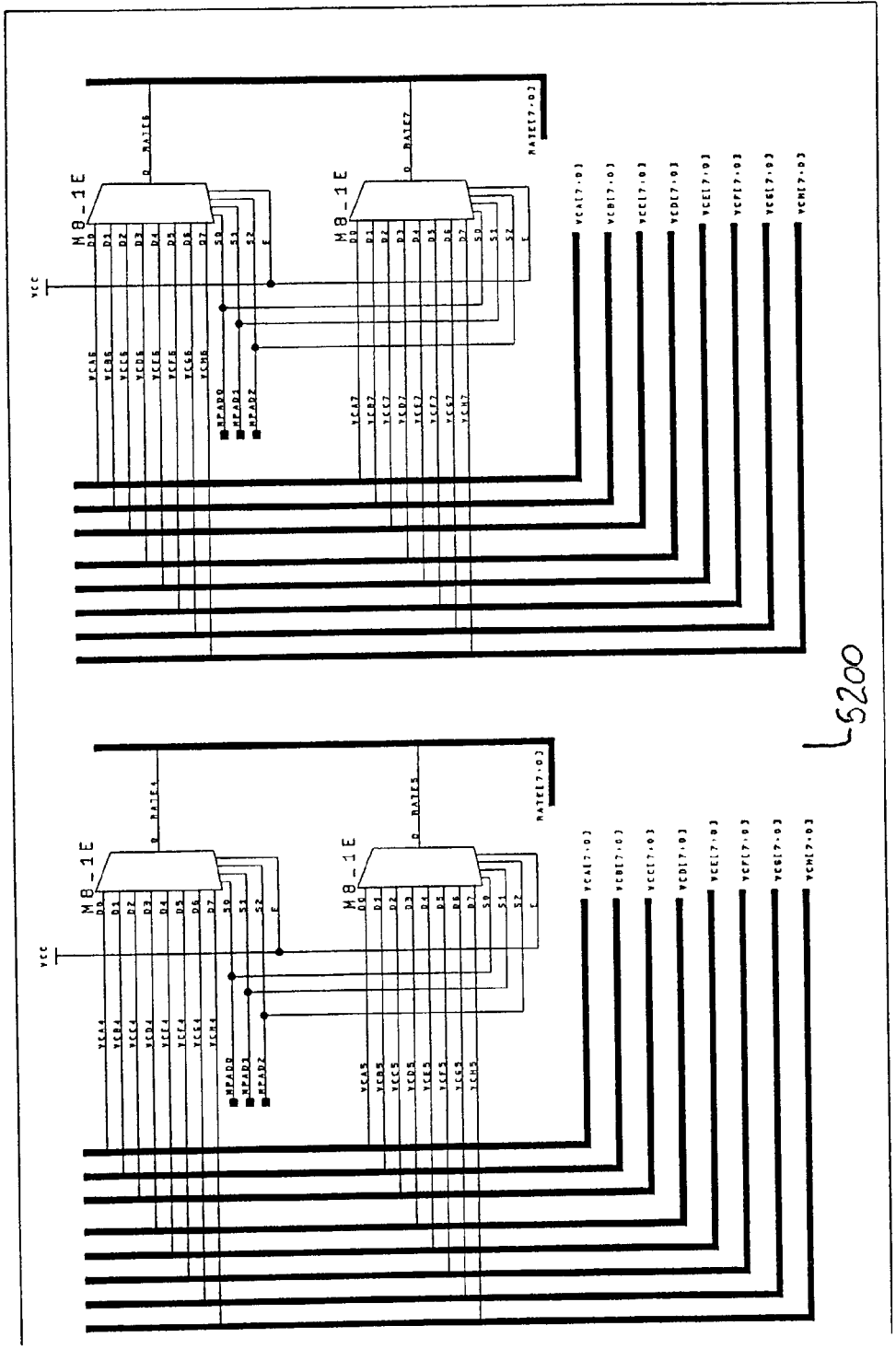

Still referring to FIG. 22, the HSREAD block 2250 can operate when a HOUTA-L signal 2252 is asserted, indicating that there is an utopia bus request for a cell. The AVAIL block 2350 of FIG. 23 can control the page accessed by the HSREAD block 2250 via the HOPG[1:0] signal 2251. The HSREAD block 2250 can indicate it is reading the last octet in a page via the signal an HLSTOCT signal 2253. It can be forced to the next page via assertion of an HONUPG signal 2254. Referring to FIGS. 47 and 48, block diagrams of an HSREAD block 4700, 4800 are depicted.

Referring to FIG. 23, the NXTVCI block 2300 includes functions to establish the next choice of VCI for a bonded ATM cell stream. The NXTVCI block 2300 can establish the next VCI as the 3 most-significant bits (MSB) of a six-bit value. The 6-bit value can be viewed as $[B_2B_1B_0b_2b_1b_0]$. The 8 possible VCI (for eight low-speed PVCs) can be selected by choosing one bit out of an array organized as 8 (identified with $[B_2B_1B_0]$) words of 8 bits each (the bits are identified with $[b_2b_1b_0]$). A microprocessor can write the eight octets, for the speed control of the 8 PVCs, with the number of ones indicative of the cell-rate. These can be read back by the microprocessor.

Still referring to FIG. 23, the NXTVCI block 2300 can implement a 64-state PRN counter which starts at the state (6-bit) corresponding to one higher than the current choice of VCI. The PRN counter can be clocked by a TX2CK signal 2302 which is twice the rate of the utopia clock. The count-enable can be triggered by a LOCEQ1 signal 2303. The counter value is used as a memory address, treating the 8 octets as a 64-bit RAM. The counter stops when the data bit read out is one or 64 clocks have gone by and the counter-state is back to the starting point. The counter state at this point provides the 6-bit representation of the next VCI (actually only the 3 MSBs are used for the actual VCI used in the bonded ATM cell) and can be provided as the NVCI[2:0] signal 2301.

Still referring to FIG. 23, the AVAIL block 2350 can perform the various control functions required for the operation of the bonding algorithms. It may accept various status signals, such as the HIEMTx signals 2351 and generate various control signals such as CLHPGx signals 2354. It can control which page the HSREAD block 2250 of FIG. 22 and the LSREAD block 2150 of FIG. 21 operate out of. It may include timers to ascertain when pages should be deemed full. It can also provide the utopia blocks with a cell available information. Referring to FIGS. 49–52, block diagrams of a NXTVCI block 4900, 5000, 5100, 5200 are depicted.

Figure 53:
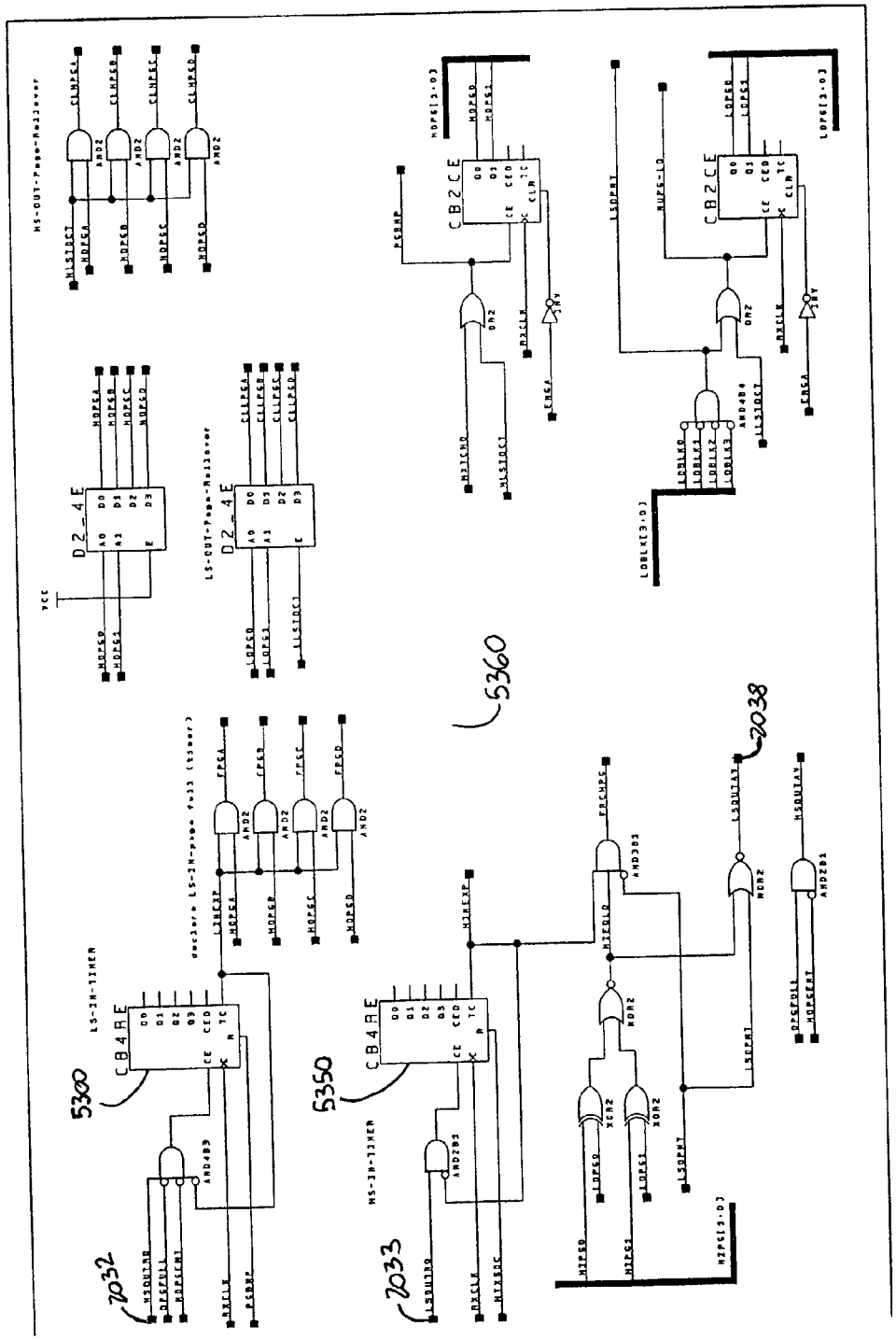
FIGS. 53 and 54 illustrate block diagrams of an AVAIL element, representing an embodiment of the invention.
Figure 54:
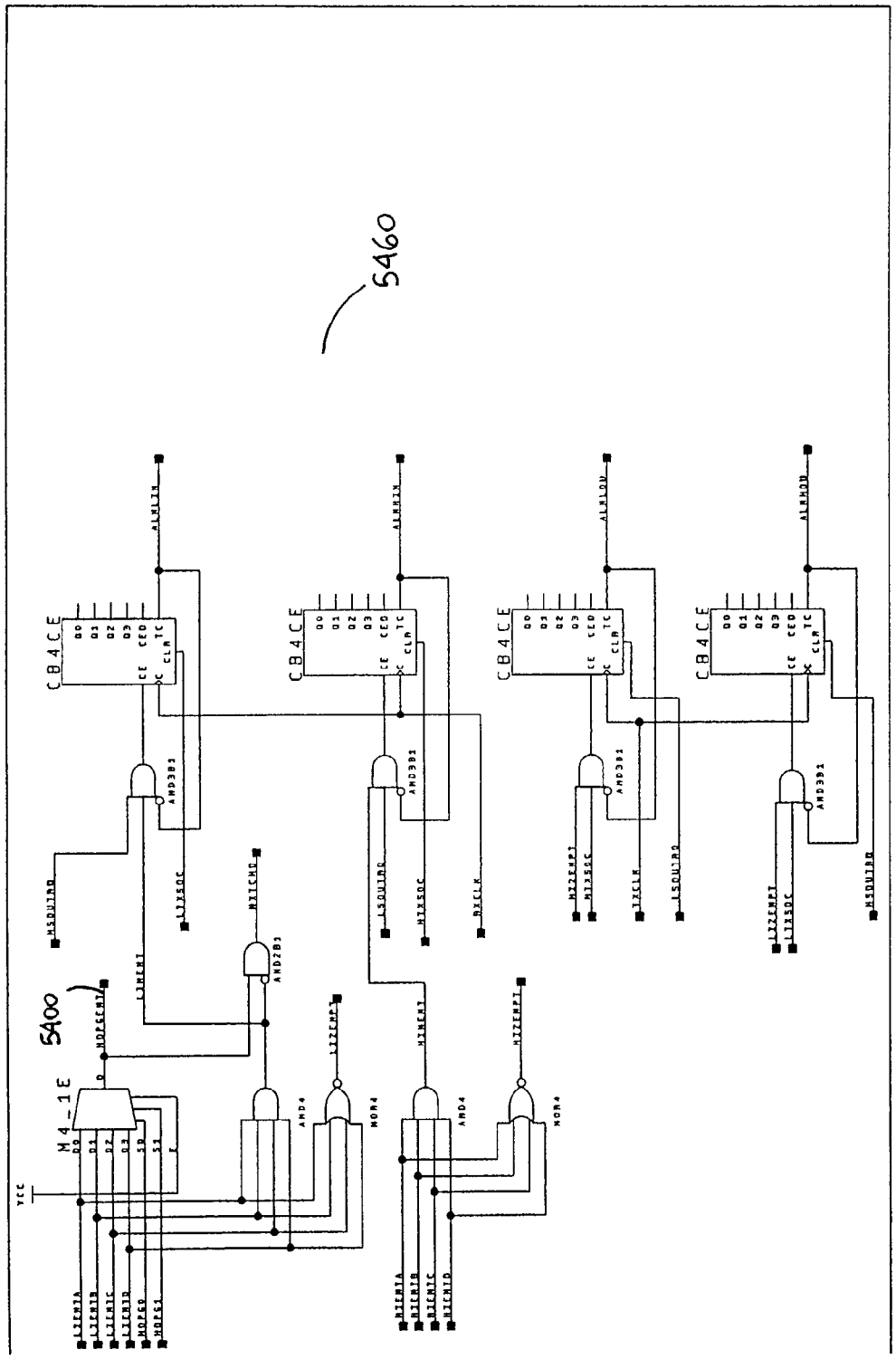

Referring to FIGS. 53 and 54, block diagrams of an AVAIL block 5360, 5460 are depicted. Referring to FIGS. 20–22, 53, 54, a plurality of algorithms can be implemented. These algorithms can include, but are not limited to, the following seven possibilities.

A plurality of inputs can be made always available: whenever the utopia bus (transmit) signals the bonding engine, it responds with a cell available asserted.

A high-speed output cell can be deemed available by the assertion of the HSOUTAV signal 2037 if the HOPG[1:0] signal 2251 points to a page that is full (the OPGFULL signal 2221 asserted) and is not empty (a HOPGEMT signal 5400 is not asserted), which can simplify the logic design.

A low-speed output cell can be deemed available by the assertion of the LSOUTAV signal 2038 the output page, the LOPG[1:0] signal 2150 is different from the page being accessed by an HINPG[1:0] signal 2355, and the page is not empty. A page can be deemed empty if the number of blocks (bonded ATM cells) written into that page shows as zero.

One timer maintained by the AVAIL block 2350 is the LS-IN-TIMER block 5300. It can be incremented when the HSOUTRQ signal 2032 is asserted, i.e., when there is an utopia request for a high-speed cell to be output by the bonding engine. It may be cleared by the LTXSOC signal 2201, which is asserted when a low-speed cell is input (LTXSOC signifies the start-of-cell for the low-speed input). If too many high-speed out requests are received, and there is a paucity of low-speed inputs, the timer can expires (conveniently set at a count of 16) and the current (low-speed input) page is forced full so that a cell can be made available for the high-speed output. An anomalous condition may arise if the page is empty and forced full, since the page registers as being both full and empty, and this condition can be guarded against in other blocks.

A second timer maintained by the AVAIL block 2350 is the HS-IN-TIMER block 5350. It can be incremented when the LSOUTRQ signal 2033 is asserted, i.e., when there is an utopia request for a low-speed cell to be output by the bonding engine. It is cleared by the HTXSOC signal 2104, which is asserted when a high-speed cell is input (HTXSOC signifies the start-of-cell for the high-speed input). If too many low-speed out requests are received, and there is a paucity of high-speed inputs, the timer expires (conveniently set at a count of 16) and the current (high-speed input) page is forced full so that a cell can be made available for the low-speed output. An anomalous condition may arise if the page is empty and forced full, since the page registers as being both full and empty, and this condition can be guarded against in other blocks.

If all the low-speed input pages are empty, 16 requests for high-speed output will generate an ALMLIN indicator 2356, which is cleared when a low-speed cell does arrive (indicated by the LTXSOC signal 2201). The ALMLIN indicator 2356 is asserted when there are an insufficient number of incoming low-speed bonded ATM cells. Similarly, if all the high-speed input pages are empty, 16 requests for low-speed output can generate an ALMHIN indicator 2357, which is cleared when a high-speed cell does arrive (indicated by the HTXSOC signal 2104). The ALMHIN indicator 2357 is asserted when there are an insufficient number of incoming high-speed regular ATM cells.

The AVAIL block 2350 can declare that, for utopia inputs, there is always a cell available. If none of the low-speed input pages are empty, 16 low-speed input cells (indicated by the LTXSOC signal 2201) can generate an ALMHOU indicator 2358, which is cleared when a high-speed cell request does arrive (indicated by the LSOUTRQ signal 2033). The ALMHOU indicator 2358 is asserted when there are an insufficient number of output requests for high-speed regular ATM cells. Similarly, if none of the high-speed input pages are empty, 16 high-speed input cells (indicated by the HTXSOC signal 2104) can generate an ALMLOU indicator 2359, which is cleared when a low-speed cell request does arrive (indicated by the LSOUTRQ signal 2033). The ALMLOU indicator 2033 is asserted when there is an insufficient number of output requests for low-speed bonded ATM cells.

The invention can provide a method and/or apparatus which may allow the transmittal of a high-speed ATM cell stream over an ATM network as a multiplicity of low-speed ATM cell streams. Such a method can be of particular value when the access method to the network has limited capacity per access link but multiple access links are available. By encapsulating the control information in the 48-octet ATM PDU, the network itself does not need to know that the multiplicity of PVCs is being utilized in a bonded manner; just the end points are involved in the segregation and aggregation processes.

In a preferred embodiment, an FPGA implementation may allow for a general interface such as an utopia bus. A bonding engine can operate with a microprocessor based controller which may control the operation (on/off) and also provide a pattern of bytes to represent relative cell-rates (bit-rates) of a plurality of low-speed PVCs. Once initialized, the operation of the bonding engine can be autonomous, and the controller function can become one of status monitoring (for abnormal conditions, parity errors, and so on).

The use of multiple pages, can be an efficient method for buffering information octets. As described, a multiple page dual-port-RAM method can be used to: (i) implement a modulo-48 to/from modulo-44 conversion; (ii) provide a buffer to accommodate bursty cell transfers; (iii) provide a mechanism whereby address contention can be avoided; (iv) provide the buffer necessary to accommodate differential delays between the various low-speed PVCs; (iv) accommodate a large differential delay proportionally to the number of pages; (v) provide a mechanism, based on a page being full, or empty, to control the flow of cells across the utopia bus; (vi) minimize the latency of the bonding engine by using small pages (a page comprising 12 bonded ATM cells is a preferred size for an MLSAR implementation that uses 44 information octets and 4 control octets). For larger buffer sizes, it may be preferable to increase the number of pages rather than the number of cells per page; and (vii) provide a mechanism for re-ordering or re-sequencing cells. Replicating DPR images can ensure that the input high-speed cell-stream at a transmit end matches the output high-speed cell-stream at a receive end, even if the low-speed cells traverse the network and appear out-of-order.

The invention can provide a method and/or apparatus which can include a selection mechanism for a next VCI for a low-speed cell utilizing a pseudo-random (or PRN) counter and eight speed-control octets that can be provided by a controller. Advantages of using a PRN counter rather than a regular (sequential) counter include absolving the controller of the responsibility to structure the contents of the speed-control octets in any particular manner. It suffices that the controller provide a correct number of ones in a speed-control octet and that the number of ones be proportional to a (relative) speed of a PVC.

It can be advantageous to keep the number of control octets to a minimum. On the other hand, control octets are desirable to allow the receiver to replicate a transmitter's DPR. The particular choice of the number of control octets can also impact the organization of the DPR. A choice of four control octets allow the use of a page size of 12 bonded ATM cells (equivalent to 11 regular ATM cells). A choice of 2 control octets, while feasible, may make the control aspect more difficult and, further, require a page size of 24 bonded ATM cells (equivalent to 23 Regular-ATM cells). Considering that a larger page size increases latency, an implementation utilizing four control octets can provide a simpler circuit (hardware). The bonding engine described herein can also be implemented as a software program on a general purpose processor.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely, but not necessarily wholly, that which is specified. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Practical Applications of the Invention

A practical application of the invention that has value within the technological arts is a multi-link segmentation and reassembly sublayer for bonding asynchronous transfer mode permanent virtual circuits. Further, the invention is useful in conjunction with asynchronous transfer mode networks. There are virtually innumerable uses for the invention, all of which need not be detailed here.

Advantages of the Invention

A multi-link segmentation and reassembly sublayer for bonding asynchronous transfer mode permanent virtual circuit, representing an embodiment of the invention, can be cost effective and advantageous for at least the following reasons. The invention can provide a method and/or apparatus for efficiently bonding a plurality of physical links of different bit-rate capacities to emulate a high-speed logical link. The invention can improve the utilization of existing network resources. The invention reduces costs compared to previous approaches.

All the disclosed embodiments of the invention disclosed herein can be made and used without undue experimentation in light of the disclosure. The invention is not limited by theoretical statements recited herein. Although the best mode of carrying out the invention contemplated by the inventors is disclosed, practice of the invention is not limited thereto. Accordingly, it will be appreciated by those skilled in the art that the invention may be practiced otherwise than as specifically described herein.

Further, although the multi-link segmentation and reassembly sublayer for bonding asynchronous transfer mode permanent virtual circuit described herein can be a separate module, it will be manifest that the multi-link segmentation and reassembly sublayer for bonding asynchronous transfer mode permanent virtual circuit may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

[1] Introduction to ATM Networking, Walter J. Goralski, McGraw-Hill Series on Computer Communications, 1995. ISBN 0-07-024043-4.
[2] UTOPIA Specification, Level 1, Version 2.01, Mar. 21, 1994. The ATM Forum Technical Committee, af-phy-0017.000, currently available at www.atmforum.com.
[3] UTOPIA Specification Level 2, Version 1.0, June 1995, The ATM Forum Technical Committee, af-phy-0039.000, currently available at http://www.atmforum.com.
[4] "Inverse Multiplexing for ATM (IMA, Specification Version 1.1", the ATM Forum Technical committee, af-phy-0086.001, currently available at: http://www.atmforum.com.
[5] "the PPP Multilink Protocol (MP)", frc 1990, currently available at: http://cis.ohio-state.edu/htbin/rfc/rfc1990.html, from the Internet Engineering Task Force (IETF).

What is claimed is:

1. A method, comprising:
    transforming a stream of asynchronous transfer mode cells into a stream of bonded asynchronous transfer mode cells, wherein transforming the stream of asynchronous transfer mode cells into the stream of bonded asynchronous transfer mode cells includes converting an asynchronous transfer mode cell into a partial bonded asynchronous transfer mode cell;
    demultiplexing the stream of bonded asynchronous transfer mode cells into a plurality of streams of inverse multiplexed bonded asynchronous transfer mode cells; and
    transmitting the plurality of streams of inverse multiplexed bonded asynchronous transfer mode cells to a remote location via a plurality of permanent virtual circuits;
    characterized in that the transmitted plurality of streams of inverse multiplexed bonded asynchronous transfer mode cells being multiplexed into a multiplexed stream of asynchronous transfer mode cells after transmission via at least two permanent virtual circuits, which include the plurality of permanent virtual circuits, that do not have identical bit-rate.

2. The method of claim 1, wherein at least two of the plurality of permanent virtual circuits are characterized by different bit-rates.

3. The method of claim 1, further comprising monitoring a bit-rate capacity for each of the plurality of permanent virtual circuits.

4. The method of claim 3, wherein demultiplexing includes allocating bonded asynchronous transfer mode cells to the plurality of permanent virtual circuits as a function of their respective bit-rates.

5. The method of claim 1, wherein transforming the stream of asynchronous transfer mode cells into the stream of bonded asynchronous transfer mode cells includes adding a plurality of control octets to each cell of the stream of asynchronous transfer mode cells.

6. A computer program, comprising computer or machine readable program elements translatable for implementing the method of claim 1.

7. A field programmable gate array programmed to perform the method of claim 1.

8. A circuit board comprising the field programmable gate array of claim 7.

9. An integrated circuit, comprising the field programmable gate array of claim 7.

10. A circuit board, comprising the integrated circuit of claim 9.

11. A network, comprising the circuit board of claim 10.

12. A method, comprising:
    transforming a stream of asynchronous transfer mode cells into a stream of bonded asynchronous transfer mode cells;
    demultiplexing the stream of bonded asynchronous transfer mode cells into a plurality of streams of inverse multiplexed bonded asynchronous transfer mode cells; and
    transmitting the plurality of streams of inverse multiplexed bonded asynchronous transfer mode cells to a remote location via a plurality of permanent virtual circuits, wherein the plurality of streams of inverse multiplexed bonded asynchronous transfer mode cells includes a partial page of a memory;
    characterized in that the transmitted plurality of streams of inverse multiplexed bonded asynchronous transfer mode cells being multiplexed into a multiplexed stream of asynchronous transfer mode cells after transmission via at least two permanent virtual circuits, which include the plurality of permanent virtual circuits, that do not have identical bit-rate.

13. A method, comprising:
    multiplexing a plurality of streams of inverse multiplexed bonded asynchronous transfer mode cells received from a plurality of permanent virtual circuits, into a stream of bonded asynchronous transfer mode cells; and
    transforming the stream of bonded asynchronous transfer mode cells into a stream of asynchronous transfer mode cells, wherein transforming the stream of bonded asynchronous transfer mode cells includes converting a partial bonded asynchronous transfer mode cell into an asynchronous transfer mode cell,
    characterized in that the received plurality of streams of inverse multiplexed bonded asynchronous transfer mode cells being multiplexed into the stream of bonded asynchronous transfer mode cells after reception via at least two permanent virtual circuits, which include the plurality of permanent virtual circuits, that do not have an identical bit-rate.

14. The method of claim 13, where transforming includes re-sequencing the stream of asynchronous transfer mode cells.

15. The method of claim 14, wherein re-sequencing includes utilizing a plurality of control octets.

16. The method of claim 13, wherein transforming the stream of bonded asynchronous transfer mode cells includes removing a plurality of control octets from each cell of the stream of bonded asynchronous transfer mode cells.

17. A computer program, comprising computer or machine readable program elements translatable for implementing the method of claim 13.

18. A field programmable gate array programmed to perform the method of claim 13.

19. A circuit board comprising the field programmable gate array of claim 18.

20. An integrated circuit, comprising the field programmable gate array of claim 18.

21. A circuit board, comprising the integrated circuit of claim 20.

22. A network, comprising the circuit board of claim 21.

23. A method, comprising:

multiplexing a plurality of streams of inverse multiplexed bonded asynchronous transfer mode cells received from a plurality of permanent virtual circuits, into a stream of bonded asynchronous transfer mode cells; and transforming the stream of bonded asynchronous transfer mode cells into a stream of asynchronous transfer mode cells, wherein transforming the stream of bonded asynchronous transfer mode cells includes transforming a partial page of a memory, characterized in that the received plurality of streams of inverse multiplexed bonded asynchronous transfer mode cells being multiplexed into the stream of bonded asynchronous transfer mode cells after reception via at least two permanent virtual circuits, which include the plurality of permanent virtual circuits, that do not have an identical bit-rate.

* * * * *